United States Patent [19]

Takaragi et al.

[11] Patent Number: 5,731,880
[45] Date of Patent: Mar. 24, 1998

[54] IMAGE PROCESSING APPARATUS FOR DISCRIMINATING AN ORIGINAL HAVING A PREDETERMINED PATTERN

[75] Inventors: Yoichi Takaragi, Yokohama; Masanori Yamada, Kawasaki; Yoshinobu Sato, Yokohama; Yasumichi Suzuki, Yokohama; Yasuhiro Yamada, Yokohama; Akiko Kanno, Yokohama; Yoshiki Uchida, Kawasaki, all of Japan

[73] Assignee: Canon Kabushiki Kaisha, Tokyo, Japan

[21] Appl. No.: 679,562

[22] Filed: Jul. 15, 1996

Related U.S. Application Data

[63] Continuation of Ser. No. 183,401, Jan. 19, 1994, abandoned.

[30] Foreign Application Priority Data

| Jan. 19, 1993 | [JP] | Japan | 5-006926 |
| Jan. 19, 1993 | [JP] | Japan | 5-006927 |
| Jan. 19, 1993 | [JP] | Japan | 5-006929 |
| Jan. 19, 1993 | [JP] | Japan | 5-006930 |
| Jan. 19, 1993 | [JP] | Japan | 5-006976 |
| Jan. 19, 1993 | [JP] | Japan | 5-006978 |

[51] Int. Cl.⁶ .............. H04N 1/44; H04N 1/46; G03G 21/00; G06K 9/00; H01L 31/09
[52] U.S. Cl. .............. 358/296; 358/501; 382/135; 399/366; 250/330
[58] Field of Search ............... 358/296, 501; 283/901, 902; 399/366; 250/330; 382/135, 137, 139, 140

[56] References Cited

U.S. PATENT DOCUMENTS

| 4,739,377 | 4/1988 | Allen | 355/133 |
| 4,748,480 | 5/1988 | Jacobs et al. | 355/133 |
| 5,216,724 | 6/1993 | Suzuki et al. | 382/135 |
| 5,227,871 | 7/1993 | Funada et al. | 358/75 |
| 5,266,805 | 11/1993 | Edgar | 350/330 |
| 5,321,470 | 6/1994 | Hasuo et al. | 399/366 |
| 5,426,710 | 6/1995 | Suzuki et al. | 382/135 |
| 5,475,468 | 12/1995 | Natsudaira | 399/366 |
| 5,621,503 | 4/1997 | Kamaki et al. | 399/366 |
| 5,621,810 | 4/1997 | Suzuki et al. | 382/135 |

FOREIGN PATENT DOCUMENTS

| 0342772 | 11/1989 | European Pat. Off. |  |
| 3900056 | 7/1989 | Germany |  |
| A1534403 | 12/1978 | United Kingdom | B42D 15/00 |

*Primary Examiner*—Eric Frahm
*Attorney, Agent, or Firm*—Fitzpatrick, Cella, Harper & Scinto

[57] ABSTRACT

An apparatus and a method for processing images, with which a specific original can be discriminated from others with a high accuracy. An image processing apparatus includes an input unit (210) for producing visible information and invisible information, a detecting unit for detecting a line image portion of an image represented by the visible information, and a discriminating unit (3) for discriminating an original having a predetermined pattern in accordance with the detection by the detecting unit and the visible information.

20 Claims, 75 Drawing Sheets

COLOR DISTRIBUTION OF YELLOW THIN LINE (OBLIQUE-LINE PORTION)

(a) COLOR DISTRIBUTION OF YELLOW THIN LINE OF ORDINARY RECORDING MATERIAL (b) COLOR DISTRIBUTION OF YELLOW THIN LINE OF RECORDING MATERIAL INCLUDING INFRARED ABSORPTION MATERIAL

YELLOW THIN LINE $$H = \max(A_0, A_1, A_2, A_3) - \min(A_0, A_1, A_2, A_4)$$

$$\begin{pmatrix} A_0 = g + a + f \\ A_1 = b + a + c \\ A_2 = i + a + h \\ A_3 = d + a + e \end{pmatrix}$$

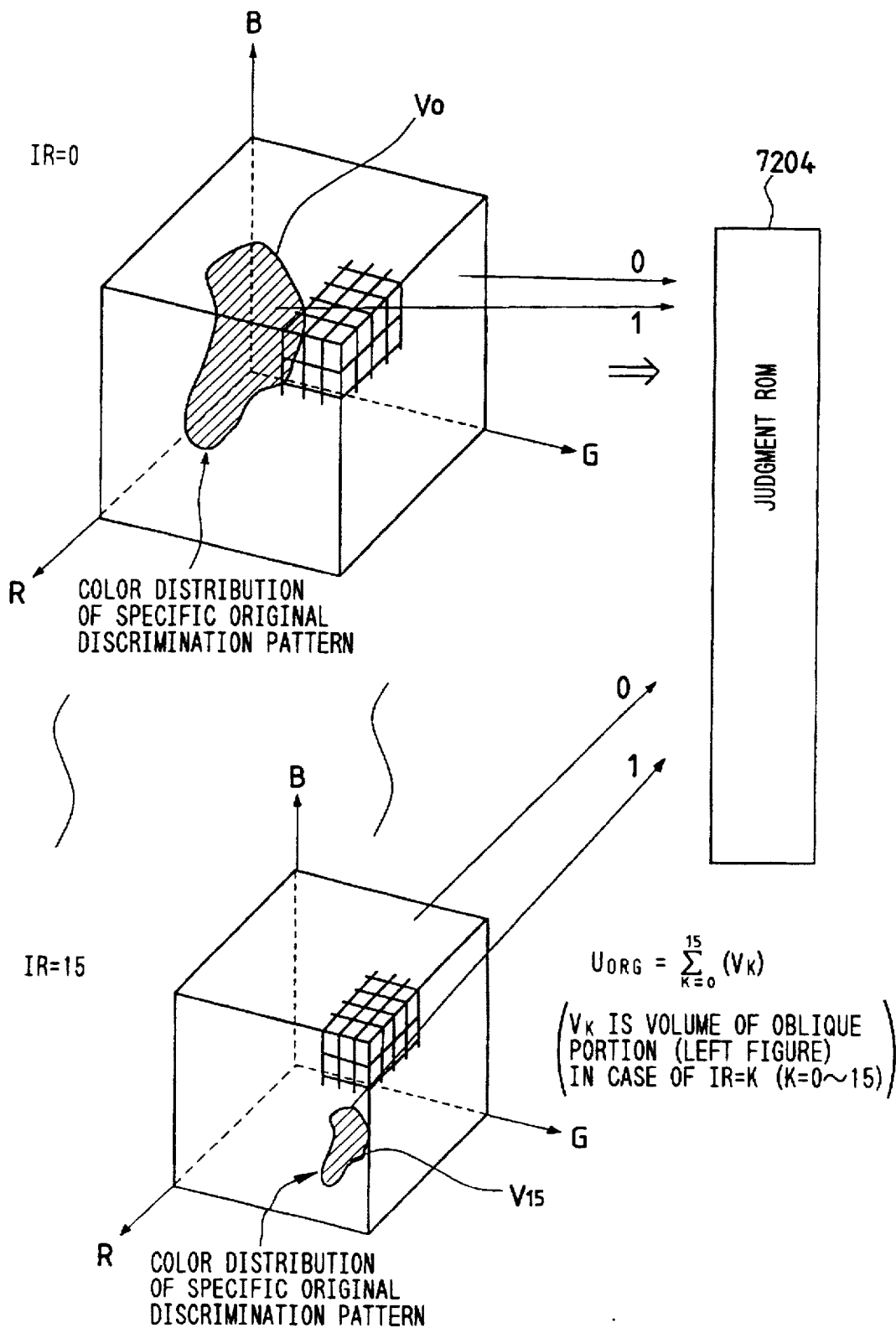

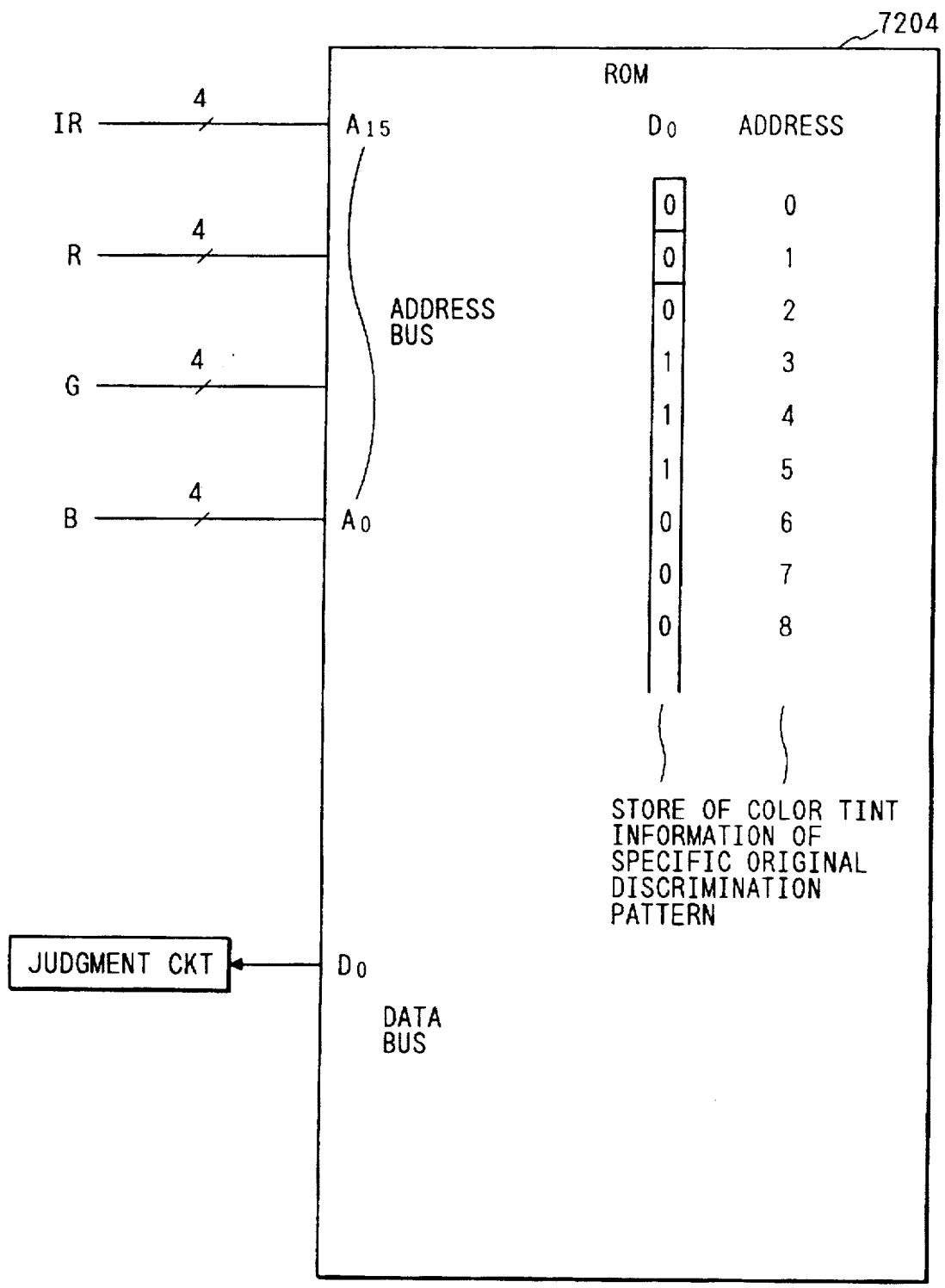

YELLOW THIN LINE OF ORDINARY INK

1mm

YELLOW THIN LINE OF INK INCLUDING INFRARED ABSORPTION MATERIAL

YELLOW THIN LINE OF ORDINARY INK

TRANSPARENT THIN LINE OF INFRARED ABSORPTION MATERIAL

SIR-159

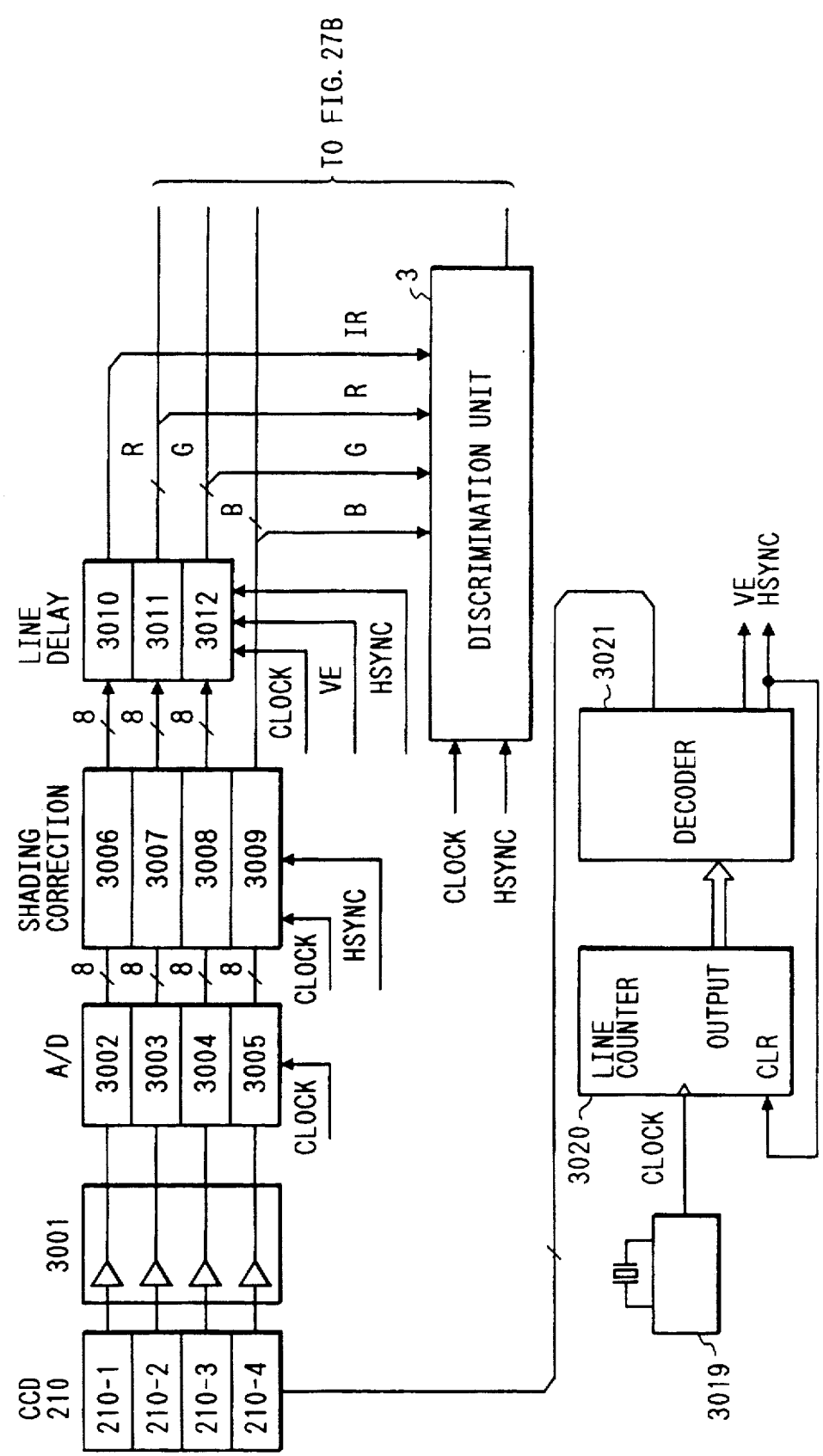

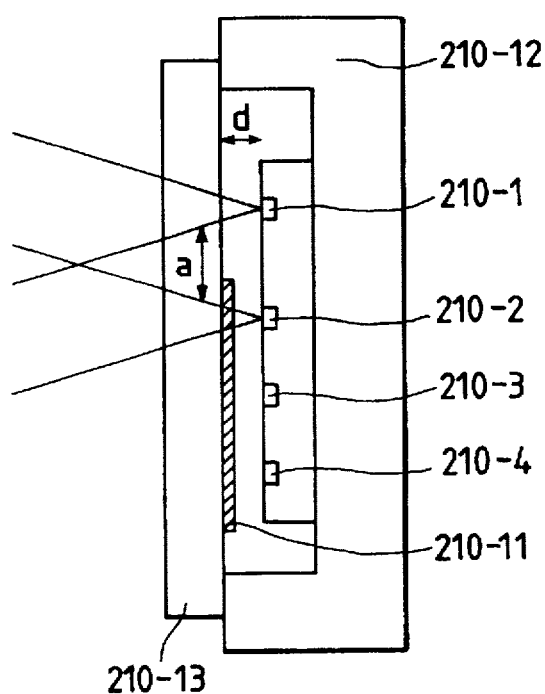

4 PIXELS   4 PIXELS   4 PIXELS   4 PIXELS

| A | B | C | D |
|---|---|---|---|
| E | F | G | H |
| I | J | K | L |
| M | N | O | P |

REMARK LINE

OUTPUT 517

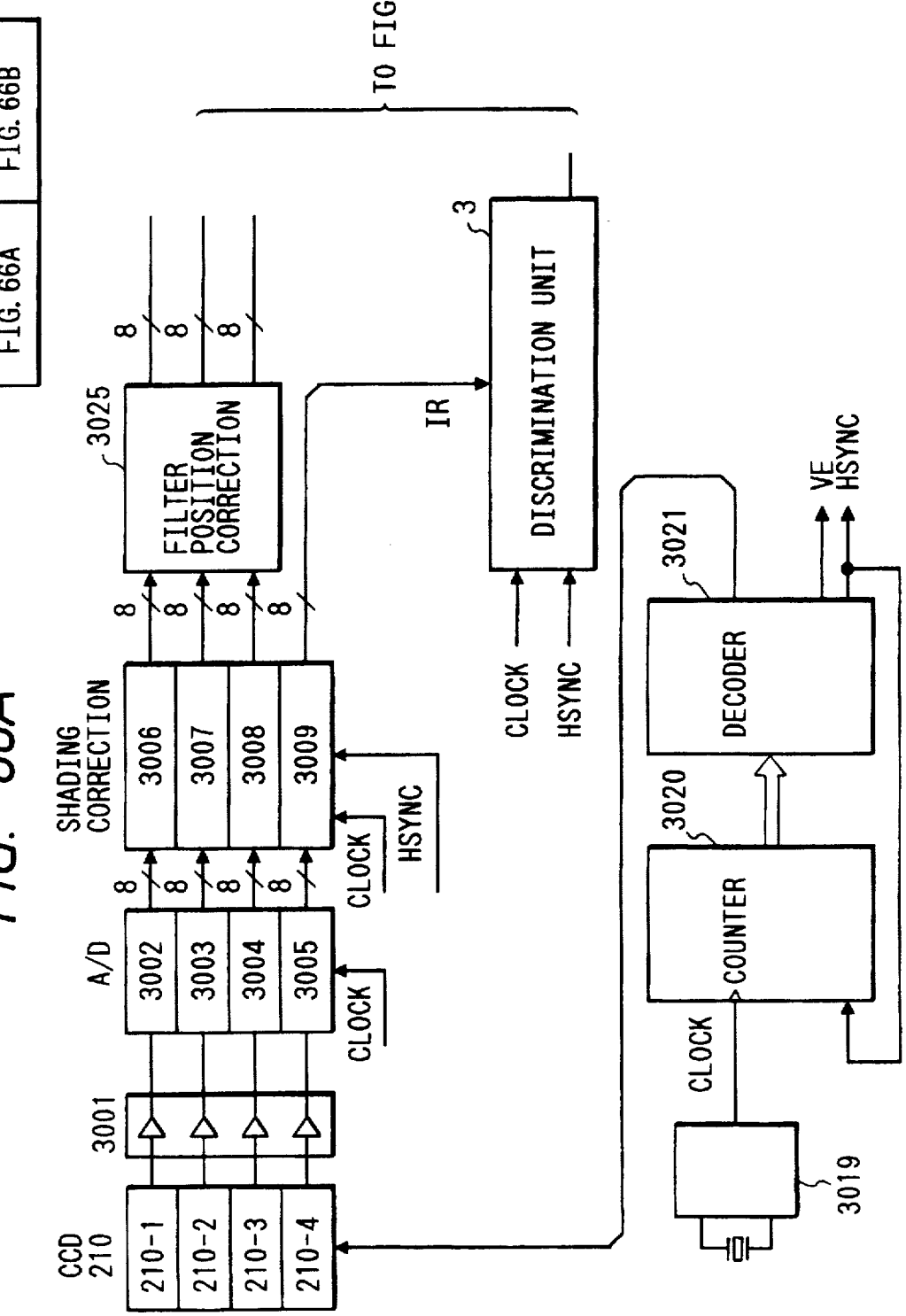

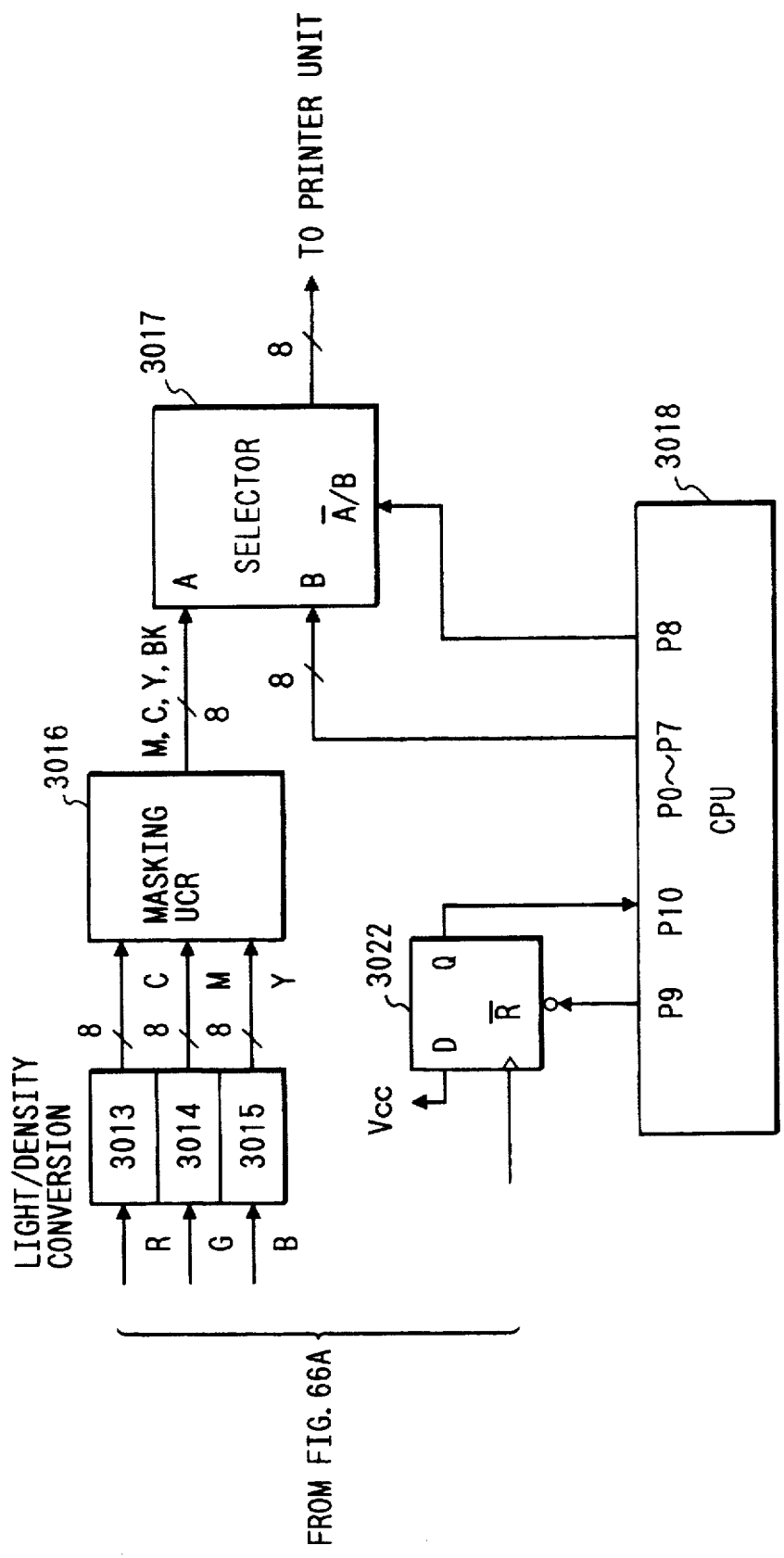

| Pa | Pb | Pc | Pd | Pe |
|----|----|----|----|----|
| Pf | Pg | Ph | Pi | Pj |
| Pk | Pl | Pm | Pn | Po |
| Pp | Pq | Pr | Ps | Pt |
| Pu | Pv | Pw | Px | Py |

| 0 | 0 | 0 | 0 | 0 |
|---|---|---|---|---|
| 0 |   |   |   | 0 |
| 0 |   | 1 |   | 0 |
| 0 |   |   |   | 0 |
| 0 | 0 | 0 | 0 | 0 |

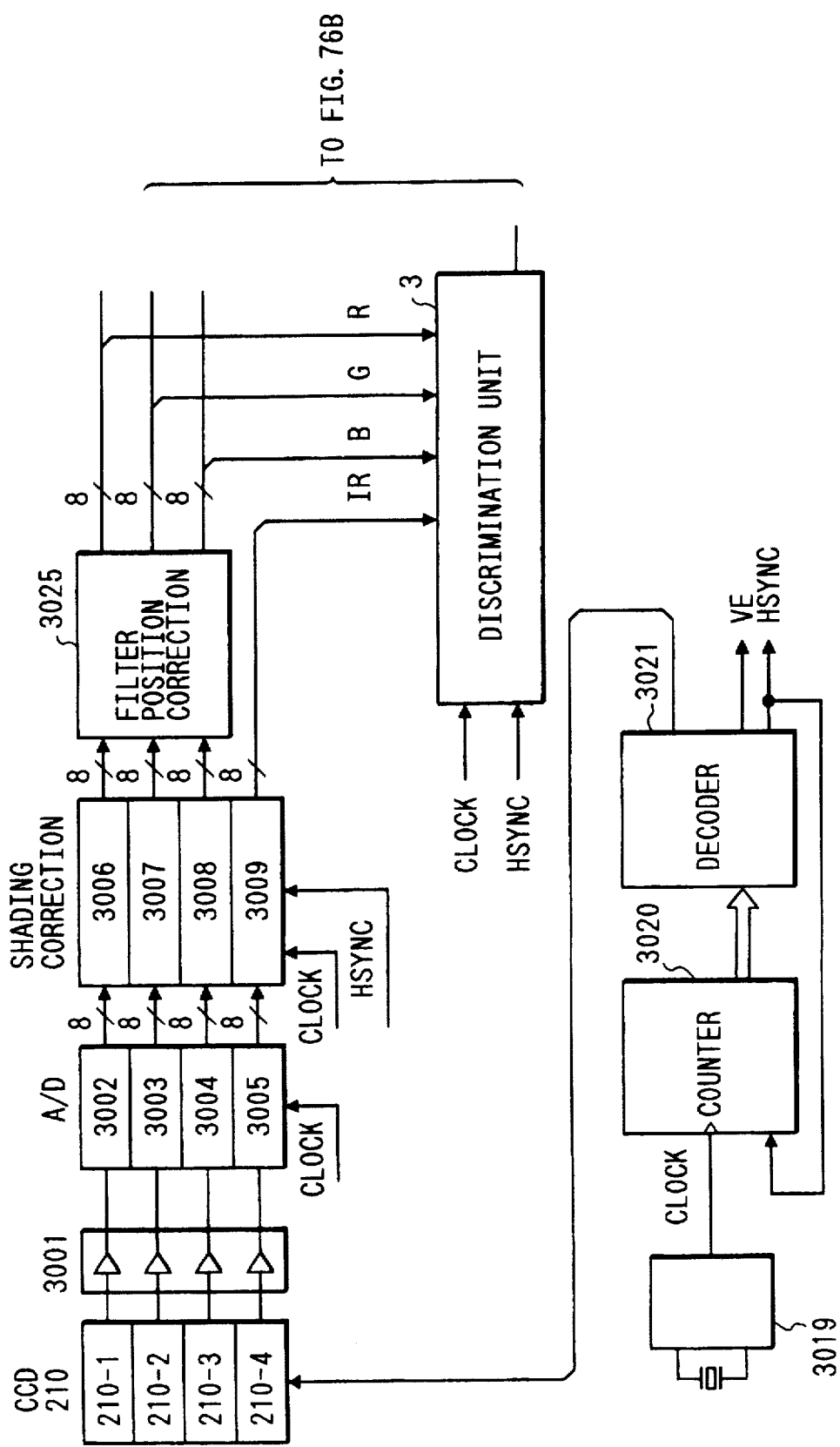

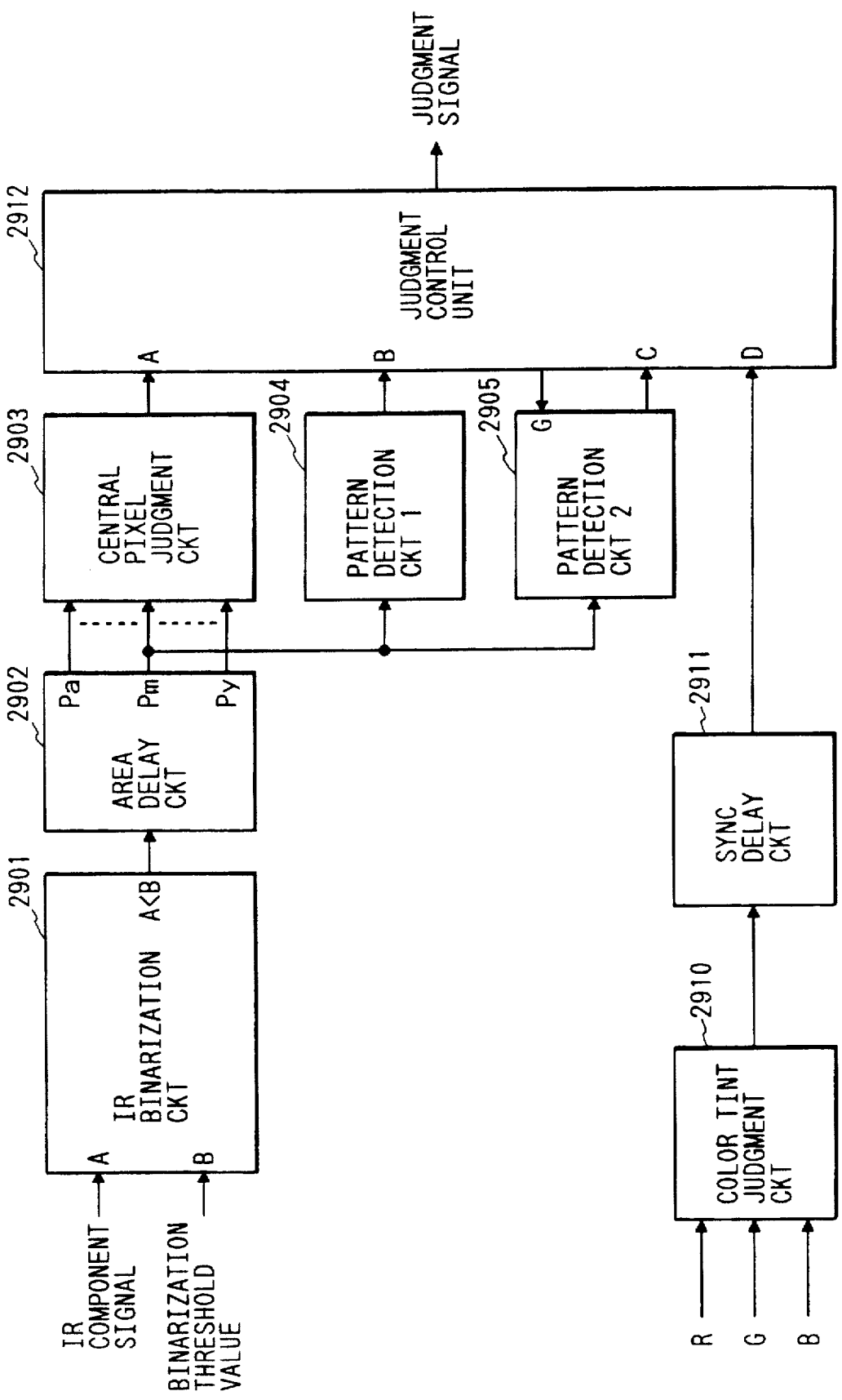

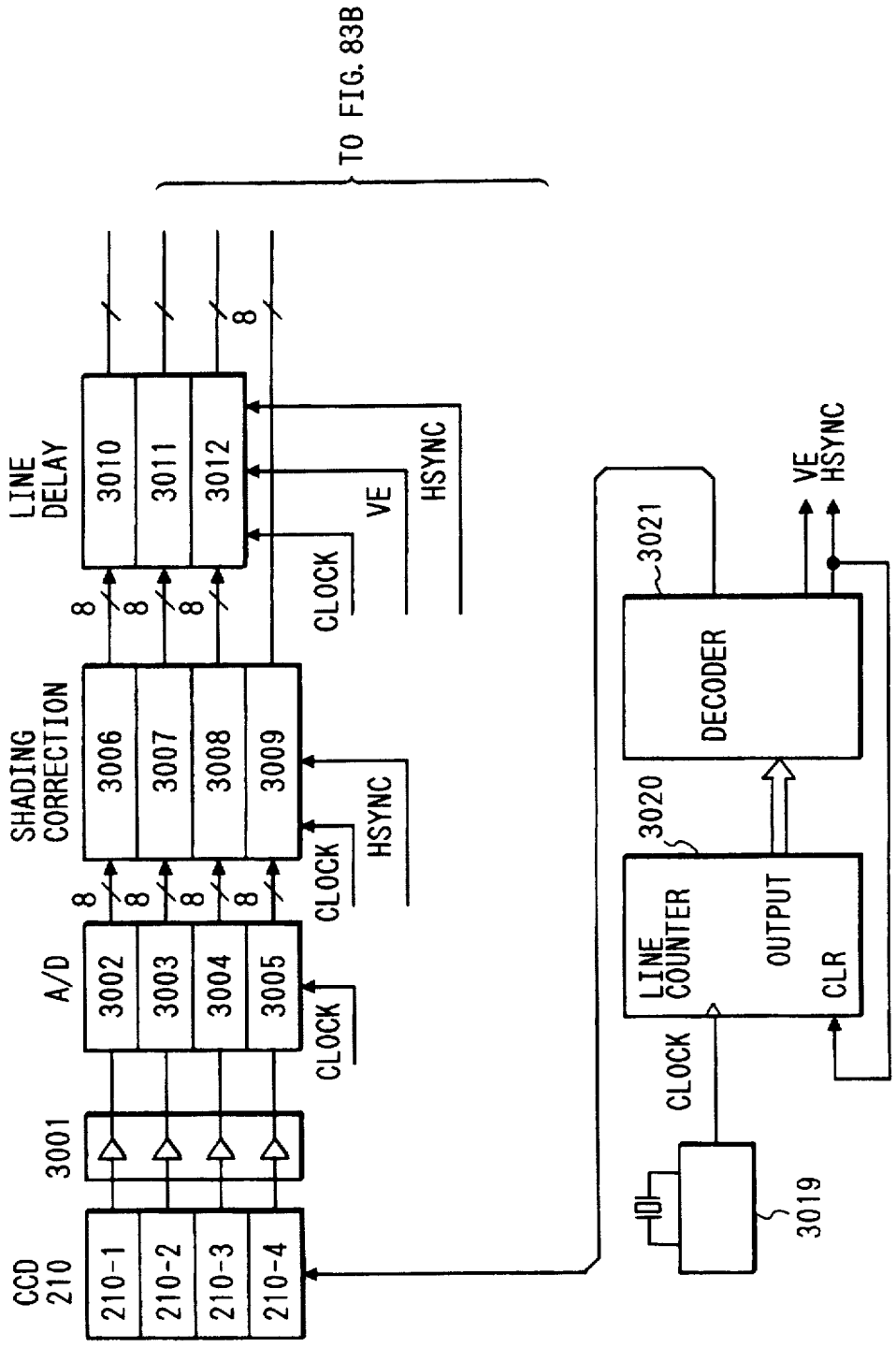

IMAGE PROCESSING APPARATUS FOR DISCRIMINATING AN ORIGINAL HAVING A PREDETERMINED PATTERN

This application is a continuation of application Ser. No. 08/183,401 filed Jan. 19, 1994, now abandoned.

BACKGROUND OF THE INVENTION

1. Field of the Invention

This invention relates to an apparatus and a method for processing images that are applicable to copying machines, image scanners for scanning images on an original and even to host computers directed to image processing.

2. Related Background Art

Conventionally, any papers that should be protected from duplication, such as secret documents, have been labelled with a stamp clearly showing no copying. Alternatively, the papers have been printed with an indication that no part of it should be reproduced. Such stamp and indication can catch people's attention but will not be the sufficient protection against abused copying or counterfeiting.

In this respect, various methods have been proposed to print a particular stamp on an original as a "specific original discriminating pattern", allowing interruption of copying operation in response to detection of this specific original discriminating pattern during scanning or so on.

There are, however, many disadvantages in the method relying on a particular stamp printed as the specific original discrimination pattern. First, an original may be excluded from the object to be copied if it contains by accident the same pattern as the particular stamp, which otherwise can be copied normally.

Second, the protection against copying requires that the specific original discriminating pattern is clear. Thus, the original with the specific original discrimination pattern can be copied when the pattern is printed at a limited area on the original and covered with something such as a seal.

In recent years, copying machines have been improved to reproduce a color image of higher quality as close as an original one. Such improvement results in an increased chance for the copying machine to be abused to counterfeit banknotes or valuable securities. With respect to these, various systems have been developed. For example, a seal impression on the banknote is detected to discriminate genuine banknotes or the like from the counterfeit ones.

In addition, the present applicant has proposed a system for discriminating the banknotes or the like by according to the specific tint unique for the original. This method is based on a fact that the banknotes or valuable securities have patterns printed thereon with inks of limited tints.

However, such feature recognition of the pattern cannot be a counter-measurement against the abuse of copying machine because of a tremendously huge amount of printed matter is and will be in circulation. Besides, a visible pattern used as the discriminating pattern stands out, which spoils the appearance of the printed matter itself.

This has necessitated development of a method of forming a pattern that is less visible or invisible to the naked eyes but can be detected by a device with a high accuracy.

To this end, the present applicant has proposed to print the specific mark with an ink having an infrared absorption characteristic. A device designed to detect such infrared is disclosed in Japanese Patent Application No. 4-286350 which comprises a reading sensor for infrared detection along with a reading sensor that is similar to those provided in typical devices for reproducing color images. These sensors share a common optical system to reduce the dimension of the entire apparatus. Optical adjustability of the apparatus has also been improved by using the single optical system as compared with an apparatus having two or more optical systems for individual sensors.

Various materials are known that have the infrared absorption characteristic. Of these, some are used as a transparent ink for printing the specific mark on banknotes and valuable securities. The transparent ink of the type described is invisible to the human eyes and no one can find the specific mark printed on a region filled in one color. However, the ink absorbs the light involving wavelengths corresponding to the infrared ray. Accordingly, a device can discriminate from the background the specific mark printed on the region appeared as the single-colored region to the human eye.

When the infrared is used as a basis for discriminating a specific stamp, an erroneous detection may be made due to the presence of some infrared absorbing materials on the back of the original. More specifically, the infrared ray reaches the deep inside of a paper as well as being reflected from the face of the paper because it involves wavelengths longer than those of visible light. A portion of the infrared ray reached to the deep inside is reflected therefrom in an amount depending on the infrared absorbing materials, if any, present there. Carbon black, which is often contained in black inks and pigments for printing, is one of the infrared absorbing materials. Thus, if the carbon black is present on the back of the original, the infrared ray reached to there is absorbed by this carbon black. As a result, there is a disadvantage of erroneously detecting the infrared absorbing materials on the back of the original.

The method relying upon the detection of infrared absorbing material has another disadvantage. The apparatus is so controlled that it copies the infrared-absorbing specific mark printed on the banknotes or valuable securities in a somewhat modified form (by painting all over the paper and so on). Alternatively, the apparatus may interrupt the printing operation when it detects the presence of the infrared absorbing materials. As mentioned above, the infrared absorbing materials are used for printing various patterns on papers other than banknotes and valuable securities. Such papers may be duplicated for justified or authorized purpose. For example, a receipt with a revenue stamp on it is sometimes required to be copied. If the paper to be copied has a certain mark printed on it with the ink containing the infrared absorbing materials, the mark may be lost from the resultant product due to detection of the infrared absorption. In other words, the erroneous detection of the infrared absorbing materials even results in unnecessary loss of important data.

SUMMARY OF THE INVENTION

Accordingly, an object of the present invention is to overcome the above mentioned conventional problems.

More particularly, the present invention is directed to provide an image processing apparatus and a method of forming patterns applicable thereto, with which a specific original can be discriminated from others with a high accuracy.

To achieve the above mentioned object, according to the present invention, it is provided with an image processing apparatus comprising input means for producing visible information and invisible information; detecting means for detecting a line image portion of an image represented by the visible information; and discriminating means for discriminating an original having a predetermined pattern in accordance with the detection by the detecting means and the visible information.

According to the present invention, it is also provided with a method of forming patterns comprising the steps of forming on a recording medium iterative patterns capable of providing visible information; and forming on the recording medium other iterative patterns capable of providing invisible information, whereby allowing determination of the recording medium as a specific original.

On describing another aspect of the present invention, it is provided with an image processing apparatus comprising input means for producing invisible image information; and detecting means for detecting an original having a predetermined pattern in accordance with the amount of the invisible image information in a unit area.

According to another aspect of the present invention, it is provided with an image reading apparatus comprising first reading means for reading visible information from an original; second reading means for reading invisible information from the original; detecting means for detecting a predetermined pattern on the original in accordance with the visible and invisible information obtained by the first and the second reading means, respectively; counting means for counting, in a predetermined region, the detection result obtained by the detecting means; and determining means for determining the original as a specific original in accordance with the count result obtained by the counting means, or provided with an image reading apparatus comprising first reading means for reading visible information from an original; second reading means for reading invisible information from the original; detecting means for detecting a predetermined mark on the original in accordance with the visible and invisible information obtained by the first and the second reading means, respectively; first counting means for counting, in a predetermined region, the detection result obtained by the detecting means; processing means for processing the count result obtained by the first counting means; second counting means for counting the processing result obtained by the processing means; and determining means for determining the original as a specific original in accordance with the count result obtained by the second counting means, or provided with an image reading apparatus comprising first reading means for reading visible information from an original; second reading means for reading invisible information from the original; detecting means for detecting a predetermined mark on the original in accordance with the visible and invisible information obtained by the first and the second reading means, respectively; counting means for counting, in a predetermined region, the detection result obtained by the detecting means; processing means for processing the count result obtained by the counting means; a matching means for carrying out pattern matching operation on the processing result obtained by the processing means; and determining means for determining the original as a specific original in accordance with the result of pattern matching carried out by the matching means, or provided with an image reading apparatus comprising first reading means for reading visible information from an original; second reading means for reading invisible information from the original; detecting means for detecting a predetermined mark on the original in accordance with the visible and invisible information obtained by the first and the second reading means, respectively; distribution amount deciding means for deciding amount of the specific marks distributed in a unit area; and determining means for determining the original as a specific original in accordance with the decision result obtained by the distribution amount deciding means, or provided with an image reading apparatus comprising first reading means for reading visible information from an original; second reading means for reading invisible information from the original; detecting means for detecting a predetermined mark on the original in accordance with the visible and invisible information obtained by the first and the second reading means, respectively; alignment deciding means for deciding alignment of the specific marks in a unit area; and determining means for determining the original as a specific original in accordance with the decision result obtained by the alignment deciding means.

In addition, according to yet another aspect of the present invention, it is provided with an image processing apparatus comprising input means for producing visible information and invisible information; first detecting means for detecting a change of the visible information and an unchange of the invisible information in a predetermined region; second detecting means for detecting the unchange of the visible information and the unchange of the invisible information in a predetermined region; and discriminating means for discriminating an original having a predetermined pattern in accordance with the detection by the first and second detecting means.

It is another object of the present invention to provide a simple structured image processing apparatus that is capable of discriminating a specific original including a geometric pattern (such as a polygon or concentric circles) as a specific pattern from others with a high accuracy.

To achieve this object, according to the present invention, it is provided with an image processing apparatus comprising pixel detecting means for detecting a pixel forming an original image, the pixel having a predetermined feature; and pattern determining means for determining whether a predetermined pattern is formed in an original in accordance with the detection result obtained by the pixel detecting means.

Yet another object of the present invention is to provide a generalized method of forming a pattern less visible or invisible to the human eyes, the pattern being for use in discriminating a specific original from others.

To achieve this object, according to the present invention, it is provided with a method of forming patterns comprising the step of forming on a recording medium patterns by using a recording material capable of providing invisible information in such a manner that the patterns are contained at a predetermined amount in a unit area, whereby allowing discrimination of the specific original from others.

In addition, the present invention is directed to form on a recording medium iterative patterns having a shape of concentric circles by using a recording material capable of providing invisible information, whereby allowing discrimination of the specific original from others with a high accuracy.

Further object of the present invention is to provide an image processing apparatus capable of visualize a pattern formed by using a recording material that absorbs a spectrum of light involving predetermined wavelengths in the invisible region.

To achieve the above mentioned object, according to the present invention, it is provided with an image processing apparatus comprising detecting means for detecting a pattern formed by using a recording material that absorbs a spectrum of light involving predetermined wavelengths in the invisible region; and producing means for visualizing the pattern to produce the same.

These and other objects and features of the present invention will become more fully apparent from the following description and appended claims taken in conjunction with the accompanying drawings.

BRIEF DESCRIPTION OF THE DRAWINGS

FIG. 12 is a view for use in describing a relation between color distribution of a specific original discrimination pattern and a judgment read-only memory (ROM) 7204;

FIG. 13 is a view for use in describing operation of the judgment ROM 7204;

FIG. 49 is a view corresponding to FIG. 25 except that a far infrared-cutoff glass is placed on a CCD cover glass;

FIG. 66 is comprised of FIGS. 66A and 66B showing block diagrams for use in describing a flow of image signals in the image scanner 201 according to a fifteenth embodiment of the present invention;

FIG. 77 is a block diagram showing a discrimination of the sixteenth embodiment;

DETAILED DESCRIPTION OF THE PREFERRED EMBODIMENTS

<First Embodiment>

Figure 3:
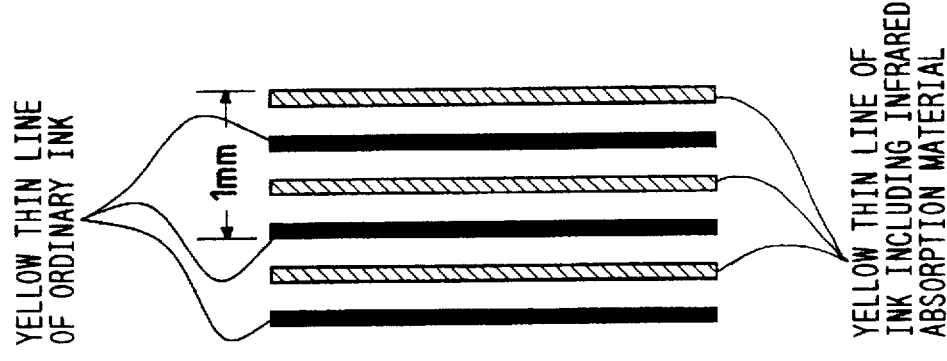
FIG. 3 is a view showing an exemplified specific original discrimination pattern in accordance with the first embodiment of the present invention.

Preferred embodiments of the present invention are described with reference to the drawing.

In the following embodiments, an exemplified copying machine is described and illustrated to which the present invention is applied. However, the present invention is not limited to those illustrative embodiments and may be applicable to various other devices including a single image scanner and a sensor.

Figure 2:
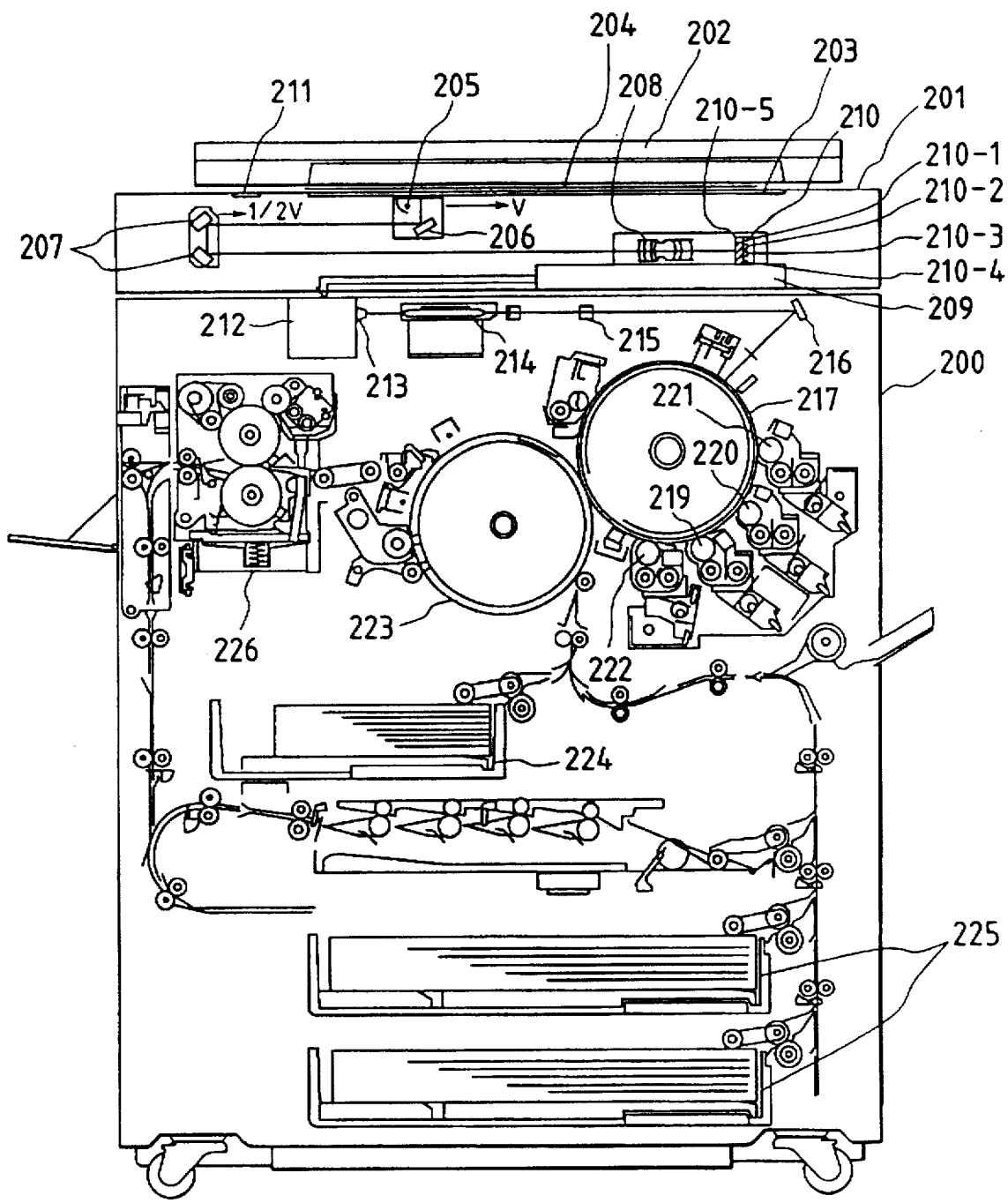
FIG. 2 is a schematic view showing a structure of a color copying machine to which the present invention is applied.

FIG. 2 is an outside view of an apparatus according to a first embodiment of the present invention.

In FIG. 2, the apparatus comprises an image scanner unit 201 and a printer unit 200. The image scanner unit 201 is for picking up an original image and digitizes it into an electrical signal. The printer unit 200 is for printing on a paper a full-color image corresponding to the original image picked up by the image scanner unit 201.

The image scanner unit 201 comprises a pressing plate 202. An original 204 carried on an original carrier glass plate (hereinafter, referred to as a platen) 203 is illuminated with light produced by a halogen lamp 205. The light reflected from the surface of the original is guided to mirrors 206 and 207 and is focused by a lens 208 on a four-line sensor (hereinafter, referred to as a CCD) 210. The CCD 210 separates colors of the optical information obtained from the original. The separated colors are supplied to a signal processing unit 209 as full-color information consisting of red (R), green (G) and blue (B) components and an infrared (IR) component. The entire area of the original is scanned by mechanical movement of the lamp 205 and the mirror 206 at a velocity v, and of the mirrors 207 at a velocity v/2, in a direction perpendicular (hereinafter, referred to as a sub scan direction) to the electrical scanning direction (hereinafter, referred to as a main scan direction) of the CCD 210.

A standard white plate 211 generates a correction data for correcting shading of read data obtained through line sensors 201-1, 201-2, 201-3, 201-4. The line sensors 201-1 through 201-4 corresponds to sensors for IR, R, G and B components, respectively. Details of these line sensors will be described later.

Figure 20:
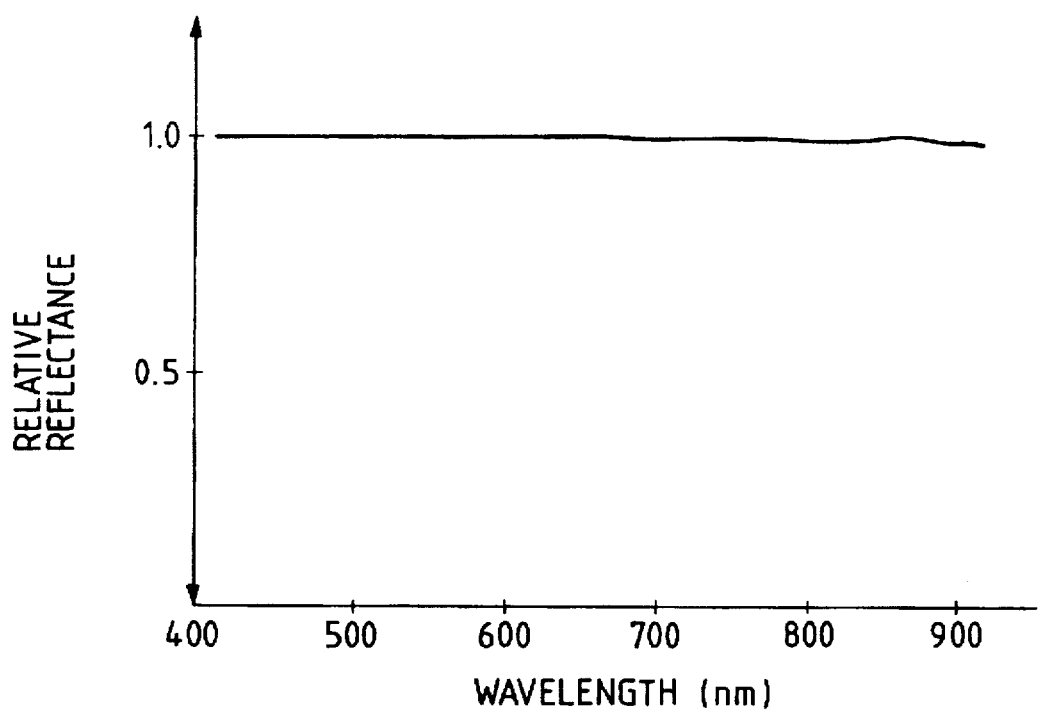
FIG. 20 shows spectral reflectance of a standard white plate.

The standard white plate 211 reflects light that is relatively balanced in all visible and infrared wavelengths. In other words, the standard white plate 211 reflects light at substantially uniform reflectance, as shown in FIG. 20, and appears white to the eyes.

This standard white plate 211 is adapted to generate data used for shading correction on the output data of the IR sensor 210-1 and of the visible sensor 210-2 through 210-4.

The signal processing unit 209 electrically processes the signals obtained by the scanning operation to divide it into components of magenta (M), cyan (C), yellow (Y) and black (BK), which are sent to the printer unit 200. Either one of the components M, C, Y, and BK is supplied to the printer unit 200 at every one scanning operation of the image scanner unit 201, so that a complete color image corresponding to one original is obtained through four-time scanning operation.

The image signals representing the respective components M, C, Y and BK supplied from the image scanner unit 201 are sent to a laser driver 212. The laser driver 212 drives a semiconductor laser 213 in response to the image signal supplied from the image scanner unit 201. The semiconductor laser 213 emits a laser beam and the emitted beam scans a photosensitive drum 217 through a polygon mirror 214, an f-θ lens 215, and a mirror 216.

A developing unit is composed of a magenta developing station 219, a cyan developing station 220, a yellow developing station 221 and a black developing station 222. These four developing stations are successively brought into contact with the photosensitive drum 217, thereby developing electrostatic latent images of M, C, Y and BK formed on the photosensitive drum 217 with toners corresponding to the respective colors.

A sheet fed from a sheet cassette 224 or 225 is wound on a transfer drum 223, and receives the transfer of the image developed on the photosensitive drum 217.

After completion of transferring each of four color images of M, C, Y and BK, the sheet is discharged through a fixing unit 226.

The halogen lamp 205 is commonly used for visible and infrared information readings. It produces light composed of frequency bands required for these readings. Such common source of light contributes to effective illumination of light with different wavelengths to the original that are required for visible and infrared information readings.

Figure 19A:
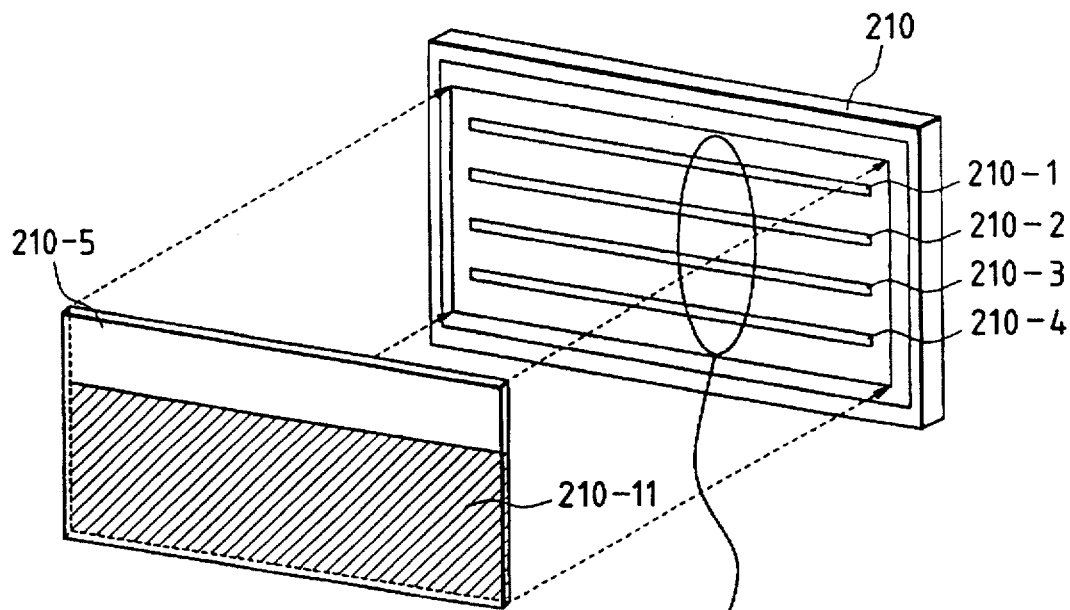
FIGS. 19A and 19B are views illustrating a structure of the CCD according to the first embodiment of the present invention.

FIGS. 19A illustrates the CCD 210 applied to the present embodiment.

The infrared sensor 210-1 is a photosensitive element line (CCD line sensor) used for sensing infrared radiation. The photosensitive element lines 210-2, 210-3, and 210-4 are for sensing R, G, and B waveform components (visible spectra), respectively.

Each of the IR, R, G and B sensors 210-1 through 210-4 has openings of 10 μm in width and in length along the main and sub scan directions, respectively.

These photosensitive element lines are different in optical characteristics from each other and are arranged monolithically on a single silicon chip such that the IR, R, G and B sensors are arranged in parallel to each other to sense the same line on the original.

The above mentioned structure of the CCD allows common usage of optical system such as a lens for visible and infrared readings.

This makes it possible to improve the accuracy of optical adjustment or the like and facilitate the adjustment as well.

A reference numeral 210-5 represents a glass plate of approximately 300 μm in thick.

Figure 23:
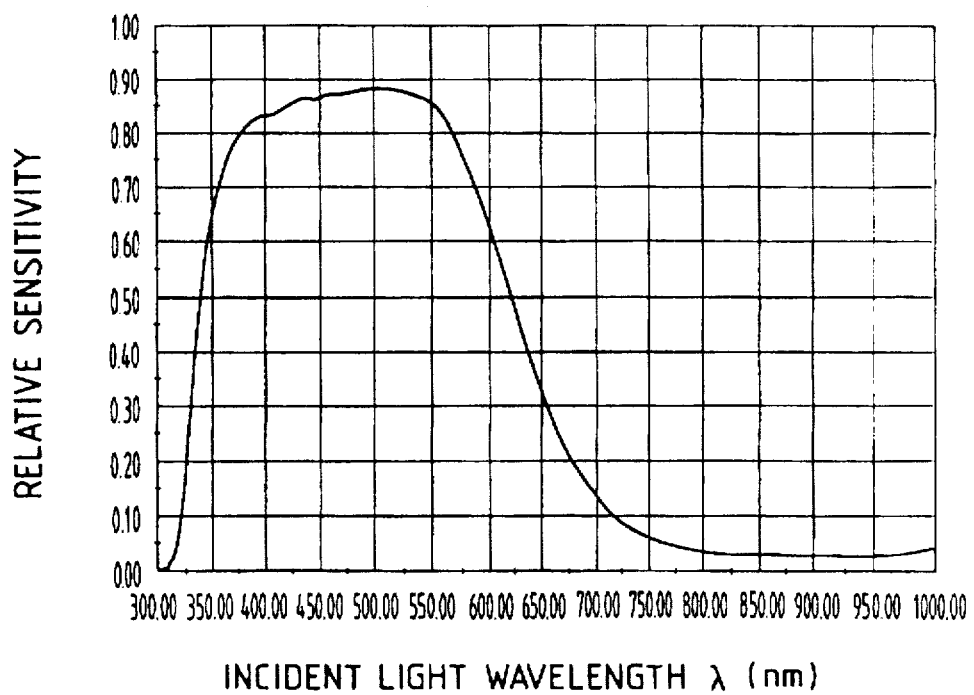
FIG. 23 shows spectral response of an infrared cutoff dichroic filter.

The hatched portion of the glass is treated to have an infrared cutoff characteristic. For this purpose, the glass plate 210-5 is provided with a dichroic mirror 210-11 formed of a deposition film. In this event, the glass plate 210-5 is adhered to the surface of the chip with the deposited region facing to the sensors. The characteristic of this infrared cutoff region is shown in FIG. 23.

An ordinate represents a relative sensitivity while an abscissa represents wavelengths of the incident light.

Figure 19B:
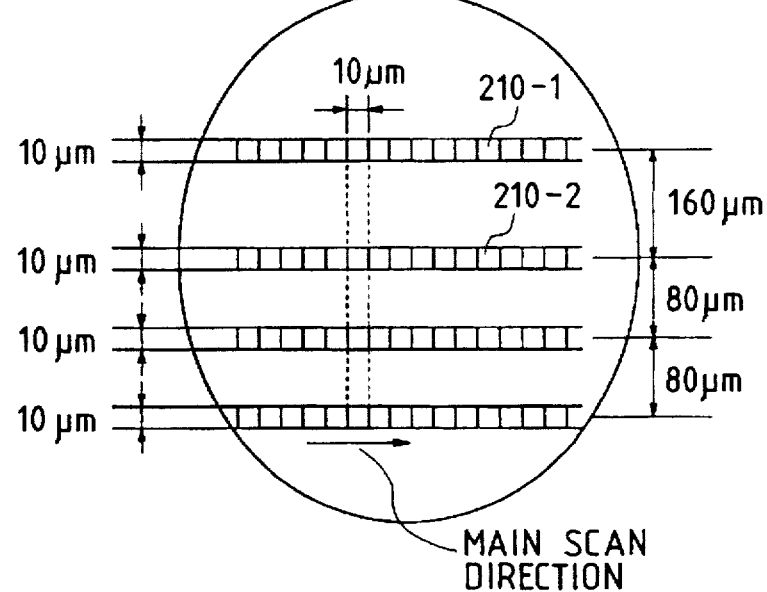

FIG. 19B is an enlarged illustration of the photosensitive elements. Each sensor is 10 μm in length for every one pixel along the main scan direction. Five thousand sensors are aligned along the main scan direction for each CCD line sensor to read the width (297 mm) of an A3-paper at a resolution of 40 dpi. In addition, the R, G, and B line sensors are away from each other at a distance of 80 μm, which corresponds to an eight-line distance relative to a sub scan resolution of 400 lpi (line per inch).

The IR sensor 210-1 is away from the R sensor 210-2 at a distance of 160 μm (16 lines), a double of other line distance. The distance between the IR sensor 210-1 and the R sensor 210-2 is larger than the distance between other sensors. Thus, the glass plate 210-5 can be mounted on the surface of the chip without the higher accuracy. The only requirement is that the deposited surface 210-11 of the glass plate 210-5 faces to the sensors 210-2 through 210-4 and the deposition free region of the glass plate faces to the sensor 210-1.

Figure 1:
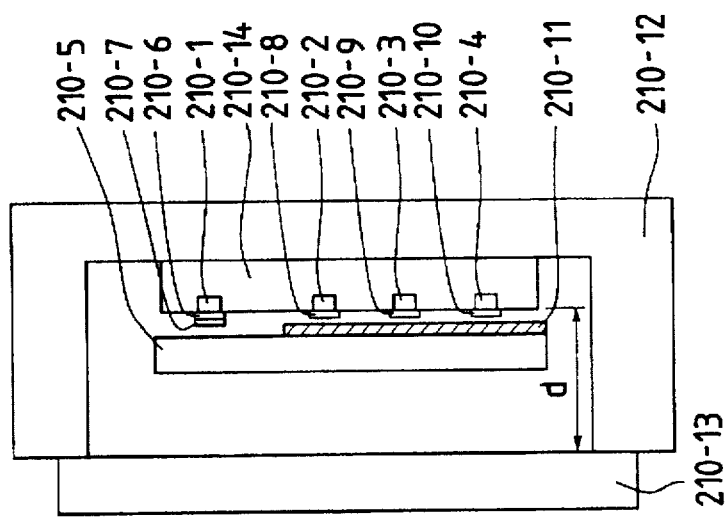
FIG. 1 is a schematic view showing a structure of a charged coupled device (CCD) applicable to a first embodiment of the present invention.

Referring to FIG. 1, the CCD 210 is described more in detail. The sensors 210-1 through 210-4 are arranged on a common silicon chip 210-14. These sensors are provided with optical filters 210-6 through 210-10 for obtaining predetermined spectral characteristics corresponding to IR, R, G and B spectra. More particularly, the sensor 210-2 is provided with a pigment filter 210-8. The filter 210-8 permits a substantial part of the red spectrum of light to transmit it and is relatively opaque to other spectra. Likewise, the sensors 210-3 and 210-4 are provided with pigment filters 210-9 and 210-10, respectively. The filter 210-9 transmits a substantial part of the green spectrum of the light while filter 210-10 transmits a substantial part of the blue spectrum of the light. Accordingly, reading signals for R, G and B components can be obtained by using these sensors. A filter 210-6 attached to the IR sensor 210-1 has a characteristic similar to that of the filter 210-8. The IR sensor 210-1 is provided with additional filter 210-7. The filter 210-7 has a characteristic similar to that of the filter 210-10. The IR sensor 210-1 is thus sensitive only to the infrared radiation having wavelengths of higher than 750 nm.

Figure 25:
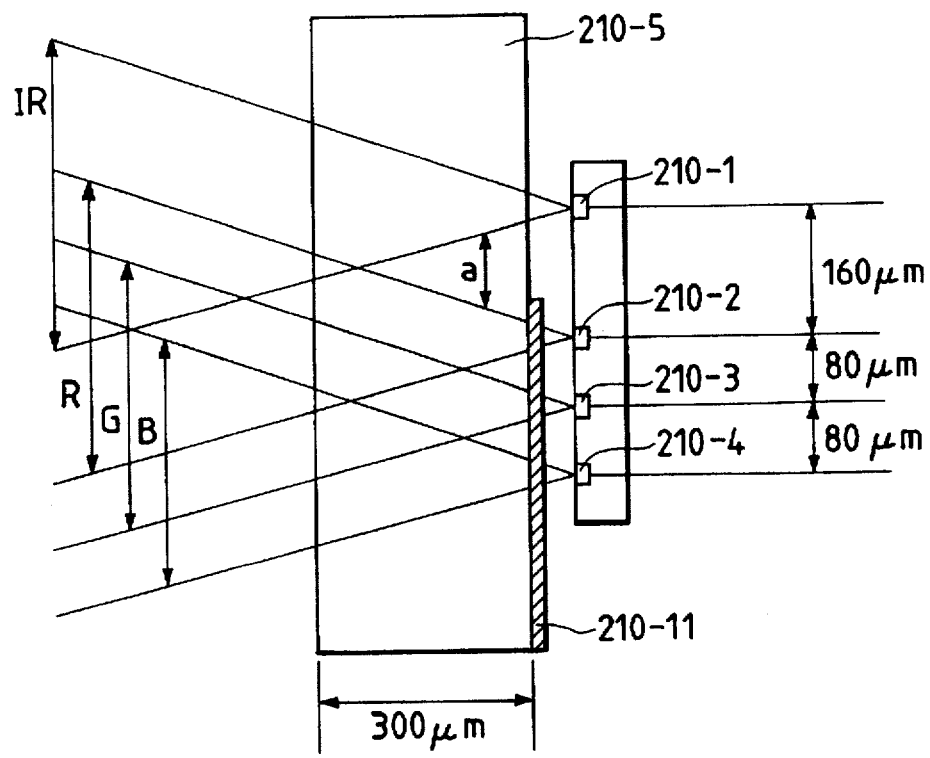
FIG. 25 is a view illustrating an orientation of an infrared-cutoff glass relative to the CCD sensors.

The glass plate 210-5 is located at a closer position to the sensor surfaces. The deposition film 210-11 for blocking the infrared ray is faced to the sensors. This is because the light beams directed to the sensors are overlapped with each other at a position away from the sensor surface as shown in FIG. 25. More particularly, the light beams directed to the sensors are those passed through the lens 208. In other words, the light beams are focused by the lens 208 on the surfaces of the respective sensors. Accordingly, to function the infrared-cutoff filter 210-11 only for the light beams directed to the sensors 210-2 through 210-4, the infrared-cutoff filter 210-11 should be provided at the position closer to the sensors where the infrared spectrum is not overlapped with the red spectrum.

By means of arranging the infrared-cutoff filter 210-11 at the position closer to the sensor surfaces, it becomes possible to elongate an allowable width a for setting the IR filter between the paths of the infrared and red beams. Accordingly, the glass plate 210-5 can be attached to the sensor chip with a lower accuracy.

If the infrared-cutoff filter is attached to the surface of the glass 210-5 opposing to the sensors, the significant portion of the infrared beam focused on the IR sensor 210-1 are blocked when the infrared-cutoff filter is disposed with some spaces from the path of the red beam. As a result, a signal level corresponding to the infrared radiation will be deteriorated.

Figure 26:
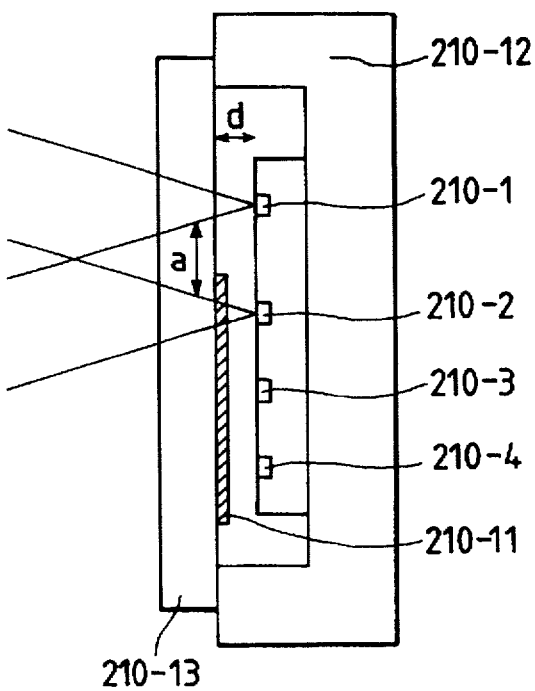
FIG. 26 is a view corresponding to FIG. 25 except that a far infrared-cutoff glass is placed on a CCD cover glass.

In place of the glass plate 210-5, the infrared-cutoff filter 210-11 may be provided on the surface facing to the sensors of a cover glass 210-13 as shown in FIG. 26. In this event, a ceramic package 210-12 of the CCD sensor should be so formed that a distance d is sufficiently short between the sensor surface and the inner surface of the cover glass. In this way, it is ensured that the infrared-cutoff filter 210-11 formed on the inner surface of the cover glass less affects on the infrared radiation.

Figure 22:
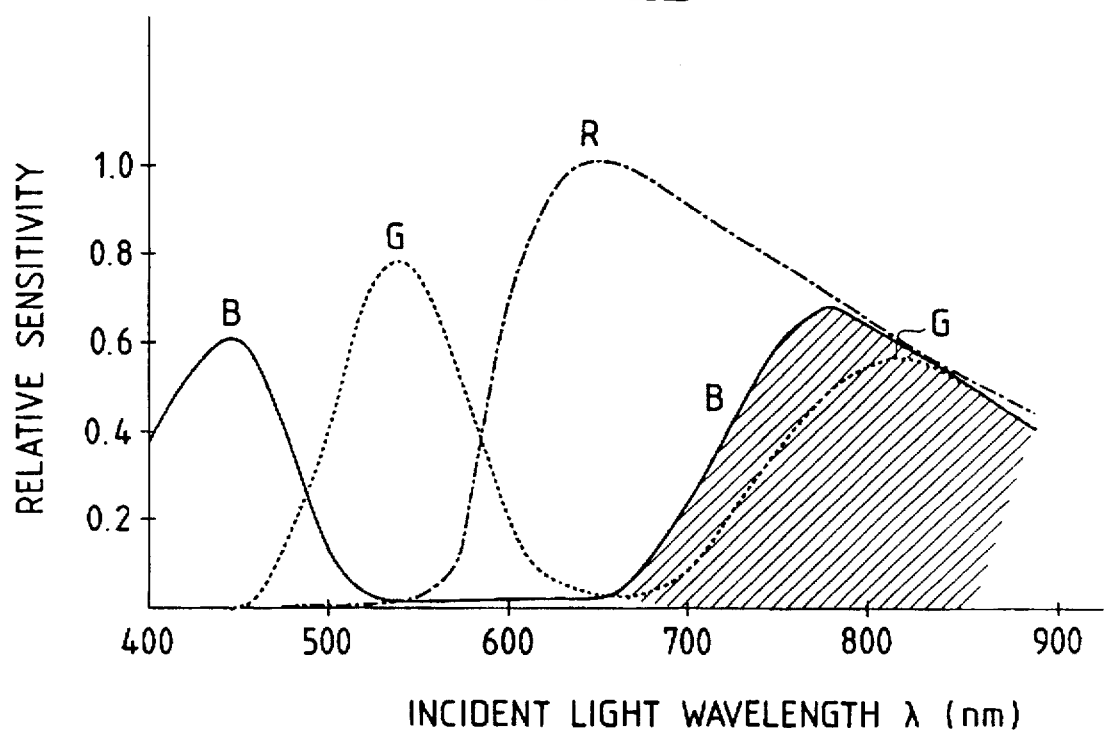
FIG. 22 shows spectral response of a visible line sensor and that of an infrared reading sensor, both in accordance with the embodiment of the present invention.

Referring to FIG. 22, described is a filter spectral characteristic of each of the line sensors IR, R, G and B in the CCD 210.

A characteristic indicated by R corresponds to that of the sensor outputs due to the filters 210-8 and 210-6. This represents the sensitivity to light of red and infrared spectra. Likewise, a characteristic indicated by G corresponds to that of the sensor outputs due to the filter 210-9. This represents the sensitivity to light of green and infrared spectra. A characteristic indicated by B corresponds to that of the sensor outputs due to the filters 210-10 and 210-7. This represents the sensitivity to light of blue and infrared spectra.

The IR sensor 210-1 is provided with the filters 210-6 and 210-7 overlapped with each other, so that it is sensitive only to the infrared radiation corresponding to the region represented by crosshatched portion in FIG. 22.

As apparent from the figure, the filters 210-8 through 210-10 are sensitive to the infrared radiation having a wavelength of 700 nm or more. Accordingly, the infrared cutoff filter 210-11 used has the characteristic shown in FIG. 23.

Figure 21:
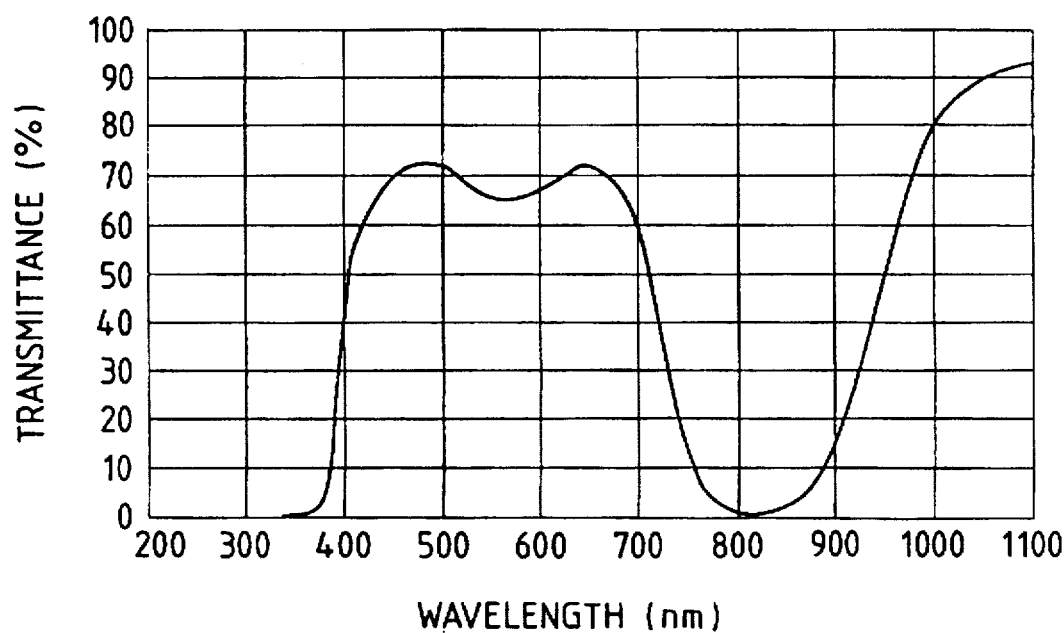
FIG. 21 shows spectral transmittance of a given pattern.

FIG. 21 shows spectral response of an infrared absorber SIR-159 (sold by Mitsui Toatsu Chemicals Inc., Chiyoda-ku, Tokyo, Japan) used in this embodiment as a detected mark on a specific original. In this embodiment, the IR sensor 210-1 is directed to sense the infrared with wavelength ranging between 750 and 850 nm to detect presence of this infrared absorber.

Figure 24:
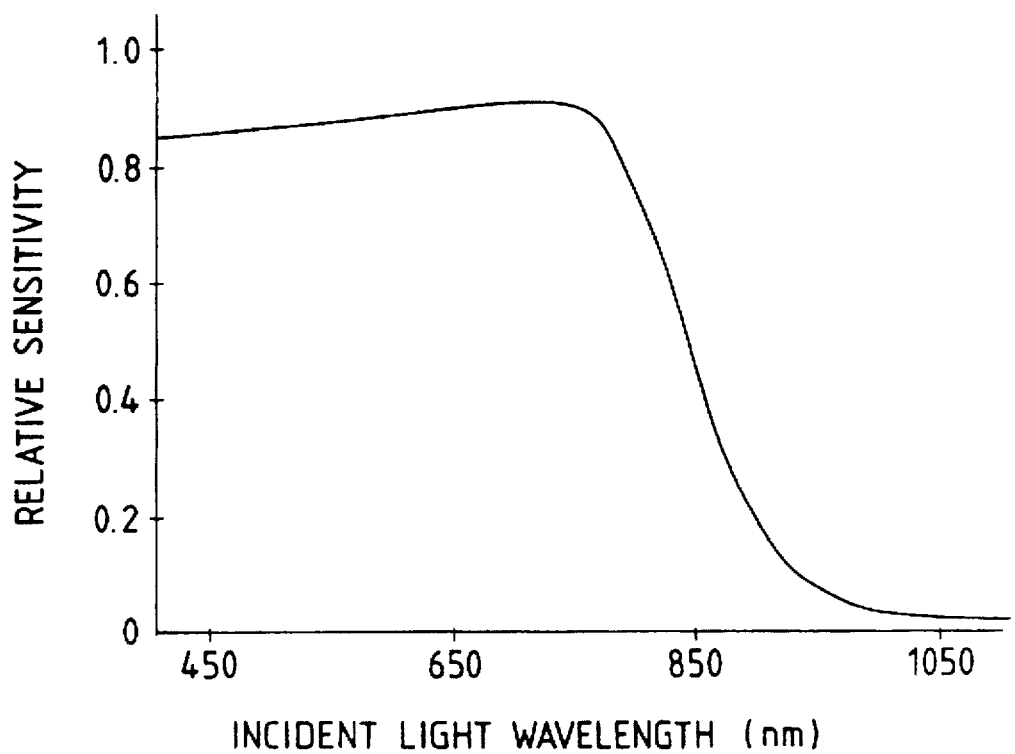
FIG. 24 shows spectral response of a far infrared-cutoff filter.

To this end, the lens 208 is provided with a far infrared cutoff filter formed of a dichroic mirror having spectral response as illustrated in FIG. 24. This filter has no deteriorating effect on the R, G and B sensors 210-2 through 210-4 as well as for the IR sensor 210-1, so that it is provided with a common lens unit, the lens 208. This allows a design for the filter provided for the lens 208 to be determined only by the consideration of the far infrared cutoff characteristic. As a result, superior far infrared cutoff characteristic can be achieved with a simple interference fringe structure.

Figure 27B:
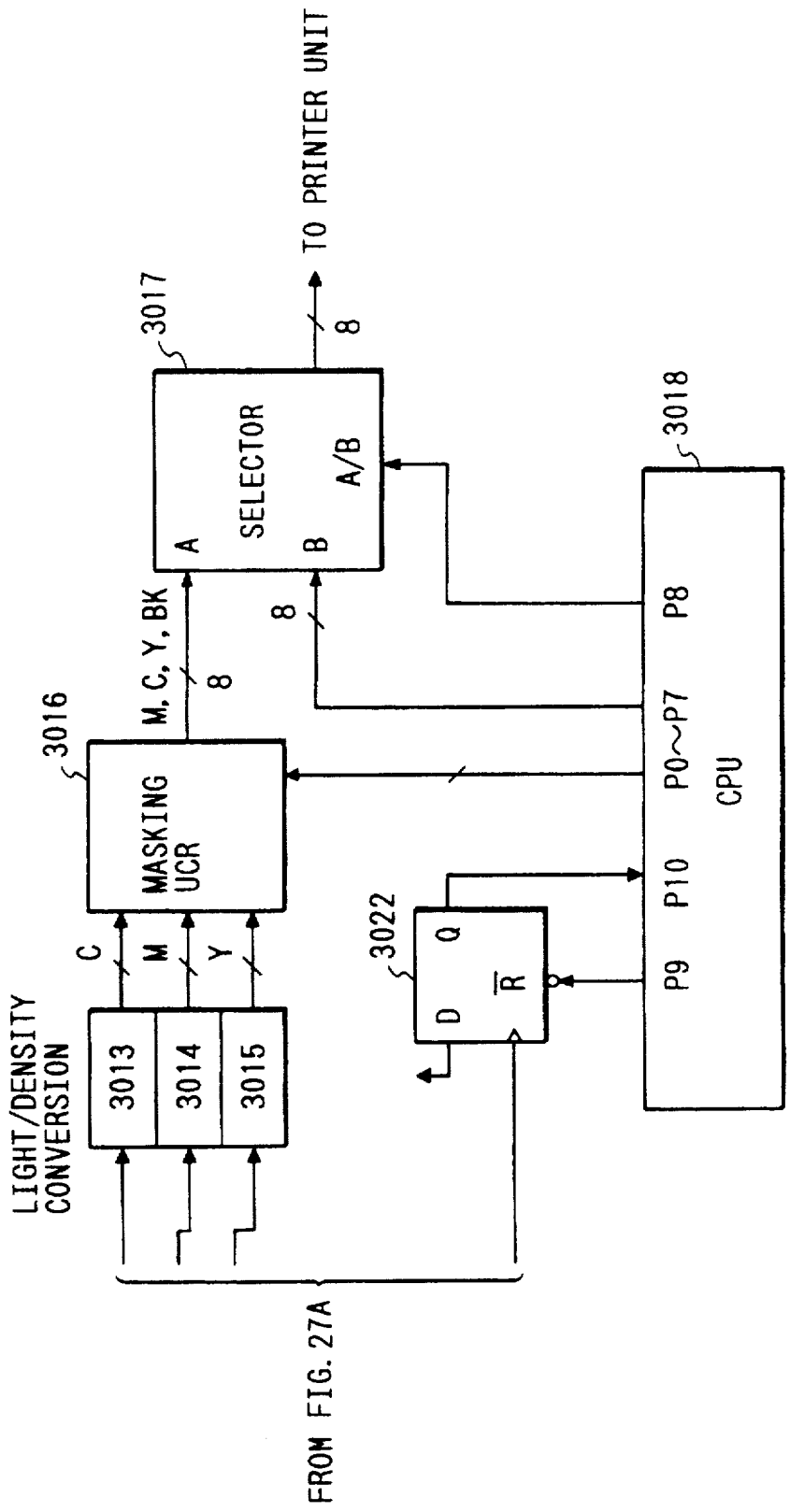
FIG. 27 is comprised of FIGS. 27A and 27B showing block diagrams of an image signal controlling unit.

FIGS. 27A and 27B are block diagrams for use in describing flow of the image signals in the image scanner unit 201. Each of the image signals is supplied from the CCD 210 to an analog signal processing unit 3001. The analog signal processing unit 3001 changes the magnitude of the image signal with a gain constant. The offset is also adjusted in the analog signal processing unit 3001. The image signals for the respective colors (including IR) are then supplied from the analog signal processing unit 3001 to respective A/D converters 3002 through 3005. Each of the A/D converters 3002 through 3005 converts the analog image signal into a digital image signal of 8 bits. The digital image signal is supplied to corresponding one of shading correction units 3006 through 3009 where it is subjected to known shading correction using a reading signal obtained for the standard white plate 211.

A clock generator 3019 generates a clock signal at a speed corresponding to data of one pixel carried by the digital image signal. The clock signal is supplied to a line counter (a main scan address counter) 3020 that counts the number of clock signals to produce a pixel address output for one line. A decoder 3021 decodes a main scan address supplied from the main scan address counter 3020 to generate a CCD driving signal, a VE signal and a line synchronization signal HSYNC. The CCD driving signal may be shift pulses or reset pulses for every one line while the VE signal indicates a valid section in a one line reading signal supplied from the CCD.

As shown in FIG. 1, the line sensors 210-1, 210-2, 210-3 and 210-4 in the CCD 210 are spaced from each other at a predetermined distance. Accordingly, line delay elements 3010, 3011 and 3012 are provided for correcting the spatial displacement. More specifically, the image signals obtained from the IR, R and G sensors 210-1, 210-2 and 210-3 proceed the image signal out of the B sensor 210-4 in the sub scan direction. With this respect, the line delay elements 3010, 3011 and 3012 line-delay the IR, R and G signal in the sub scan direction relative to the B signal.

Light-to-density conversion units 3013, 3014, 3015 are composed of look-up table ROMs and convert luminance signals of R, G and B into density signals of C, M and Y. A masking and undercolor removal (UCR) circuit 3016 generates, from input signals Y, M and C representing three primary colors, output signals of Y, M, C, and BK with a predetermined number of bits (for example, 8 bits), at each scanning operation carried out by the image scanner unit 201. Since the masking and UCR circuit 3016 used is the one well known in the art, a detailed description thereof is omitted.

A discrimination unit 3 detects a specific pattern on the original, which is a feature of the present invention.

A CPU 3018 carries out sequence control involving, for example, control to the original reading optical systems and ON/OFF control of the original illumination lamp 205. The CPU 3018 produces a pixel section signal VSYNC in the sub scan direction. The CPU 3018 also serves to control a selector 3017 in response to a result of judgment supplied from the discrimination unit 3 such that a port output rather than the reading signal is supplied to the printer, thereby effectively prohibiting copying operation for a specific original.

Figure 28:
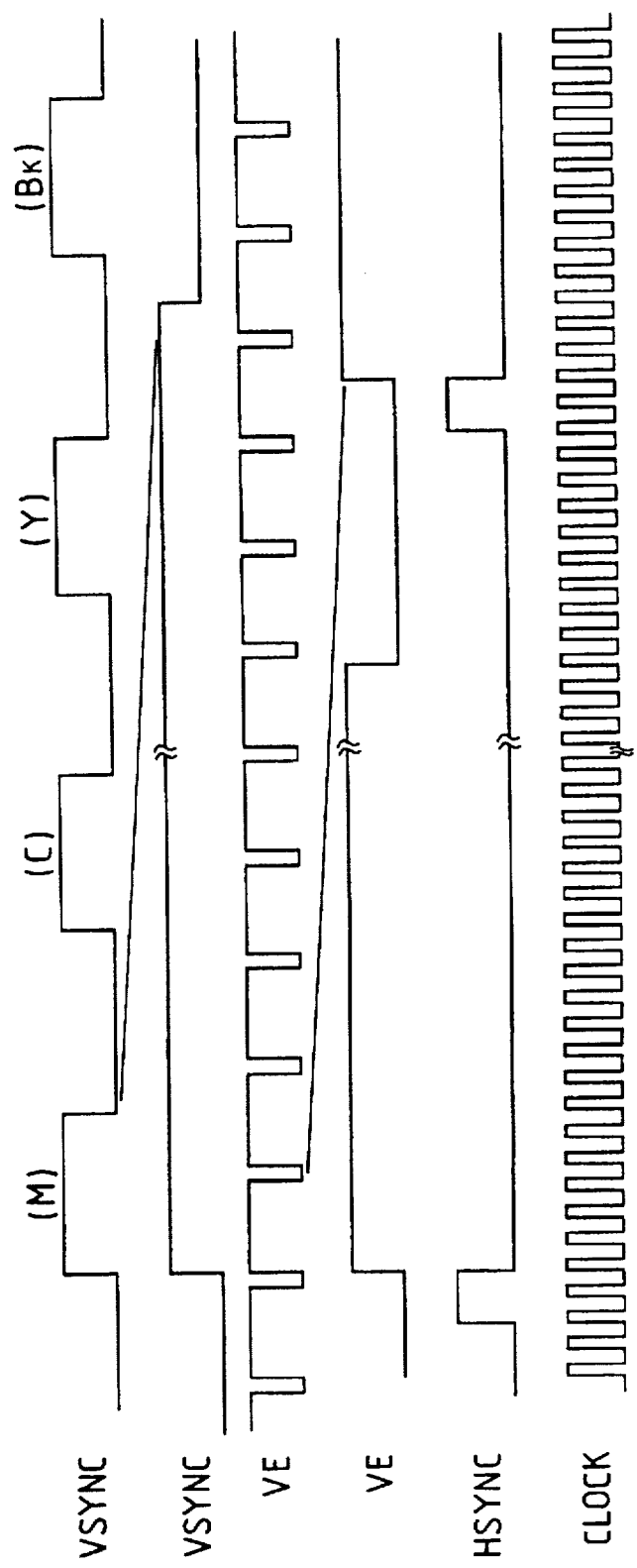
FIG. 28 is a timing chart of image control signals.

FIG. 28 is a timing chart for each control signal.

The VSYNC signal indicates the image valid section in the sub scan direction and assumes a level "1" in the entries for scanning the image to successively produce the output signals of (M), (C), (Y) and (BK). VE is a signal indicating the image valid section in the main scan direction and takes, in the section of level "1", timing at the start position of the main scanning operation. A CLOCK signal is a pixel synchronization signal which causes the transfer of the image data at the leading edge from "0" to "1".

An image pattern (discrimination mark) to be detected by the apparatus according to the present invention is described with reference to FIG. 3

FIG. 3 is a view showing an exemplified "specific original discrimination pattern" formed on an original. The specific original discrimination pattern consists of yellow thin lines. The yellow thin lines indicated by the solid lines are printed using an ordinary yellow recording material (ink or toner). The yellow thin lines indicated by the hatched lines are printed using a yellow ink containing the infrared absorbing material. These ordinary and infrared absorbing lines are alternatively printed in this embodiment.

The infrared absorber SIR-159 used in the present embodiment has the spectral response as shown in FIG. 21. This infrared absorber is capable of attenuating the amount of light in the infrared region less or without changing the color balance in the visible region. (It is almost transparent in the visible region.)

It is considered that the infrared absorbing ink is not used along with the ink having no infrared absorbing characteristic for the same color. Accordingly, the copy prohibition can be provided with high accuracy by means of printing the "specific original discrimination pattern" shown in this figure on the original that should prevented from being copied. In addition, yellow is selected as the color of the specific pattern to make it less visible to the human eyes.

Figure 4:
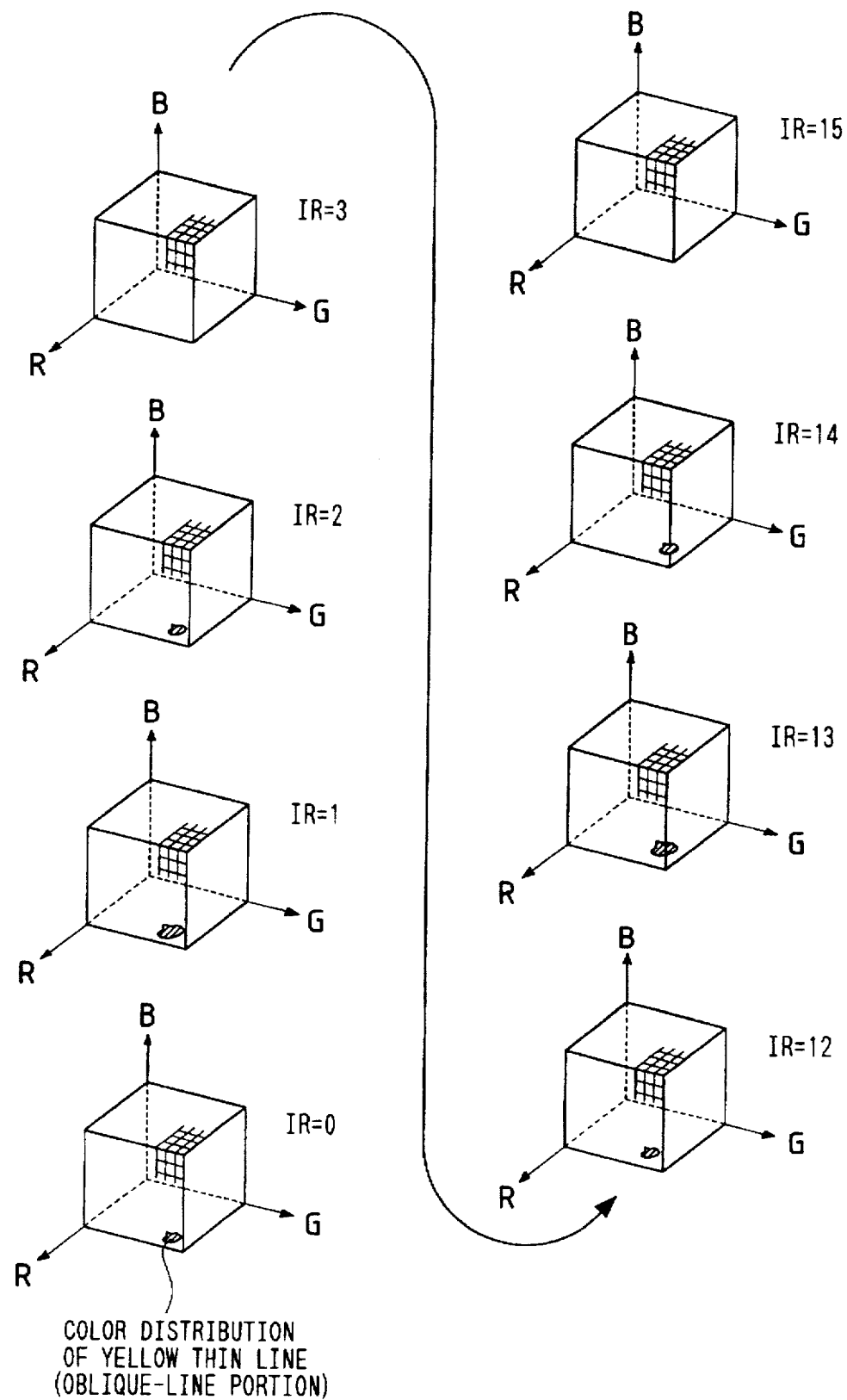
FIG. 4 is a view for use in describing color distribution of the specific original discrimination pattern in accordance with the first embodiment of the present invention.

FIG. 4 is a view for use in describing color distribution of the yellow thin lines shown in FIG. 3. As well known in the art, in the RGB model, each color appears in its primary spectral components of red, green, and blue. This model is based on a Cartesian coordinate system. The color subspace of interest is the cube, in which RGB values are at three corners. The RGB color cubes indicate that the color distribution in the RGB space is varied depending on output values (IR=0, 1, 2, 3, . . . . 12, 13, 14, 15) obtained by the IR sensor 210-1.

Figure 5:
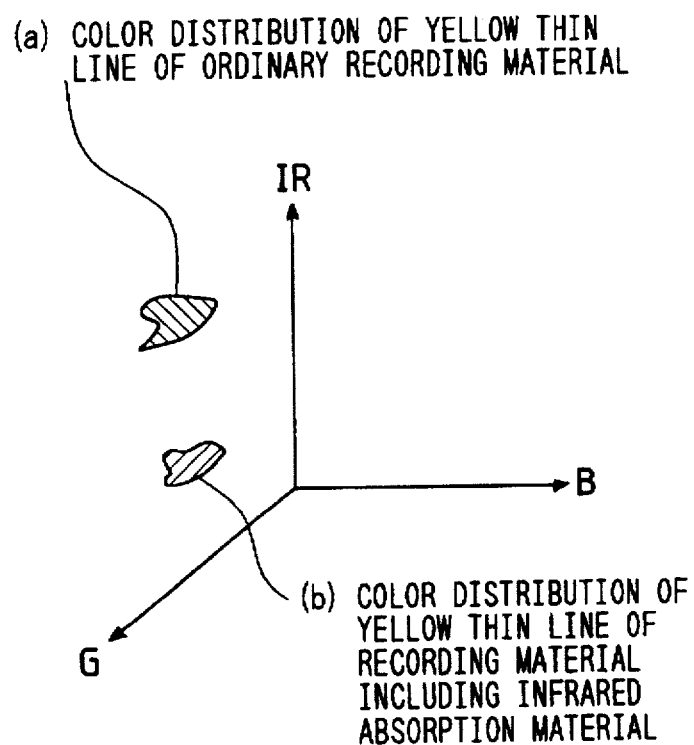
FIG. 5 is a view illustrating color distribution of the specific original discrimination pattern in an IR-G-B coordinate space.

FIG. 5 is a view illustrating color distribution of the yellow thin line in an IR-G-R coordinate space. In this figure, (a) represents color distribution of the yellow thin lines printed using an ordinary recording material while (b) represents color distribution of the yellow thin lines printed using a recording material containing the infrared absorber. The value of the IR component is smaller for (b) due to the infrared absorber.

Figure 6:
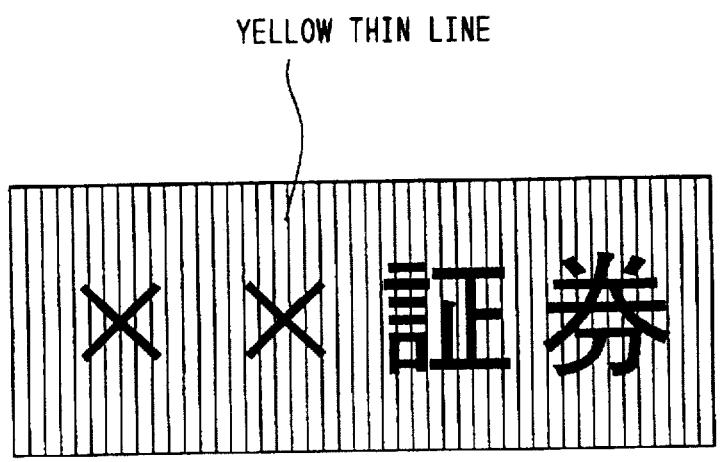
FIG. 6 is a view for use in describing a case where specific patterns are printed on almost entire length of a specific original.

FIG. 6 is a view for use in describing a case where "specific original discrimination patterns" are printed on almost entire length of the original such as the valuable securities.

Figure 7:
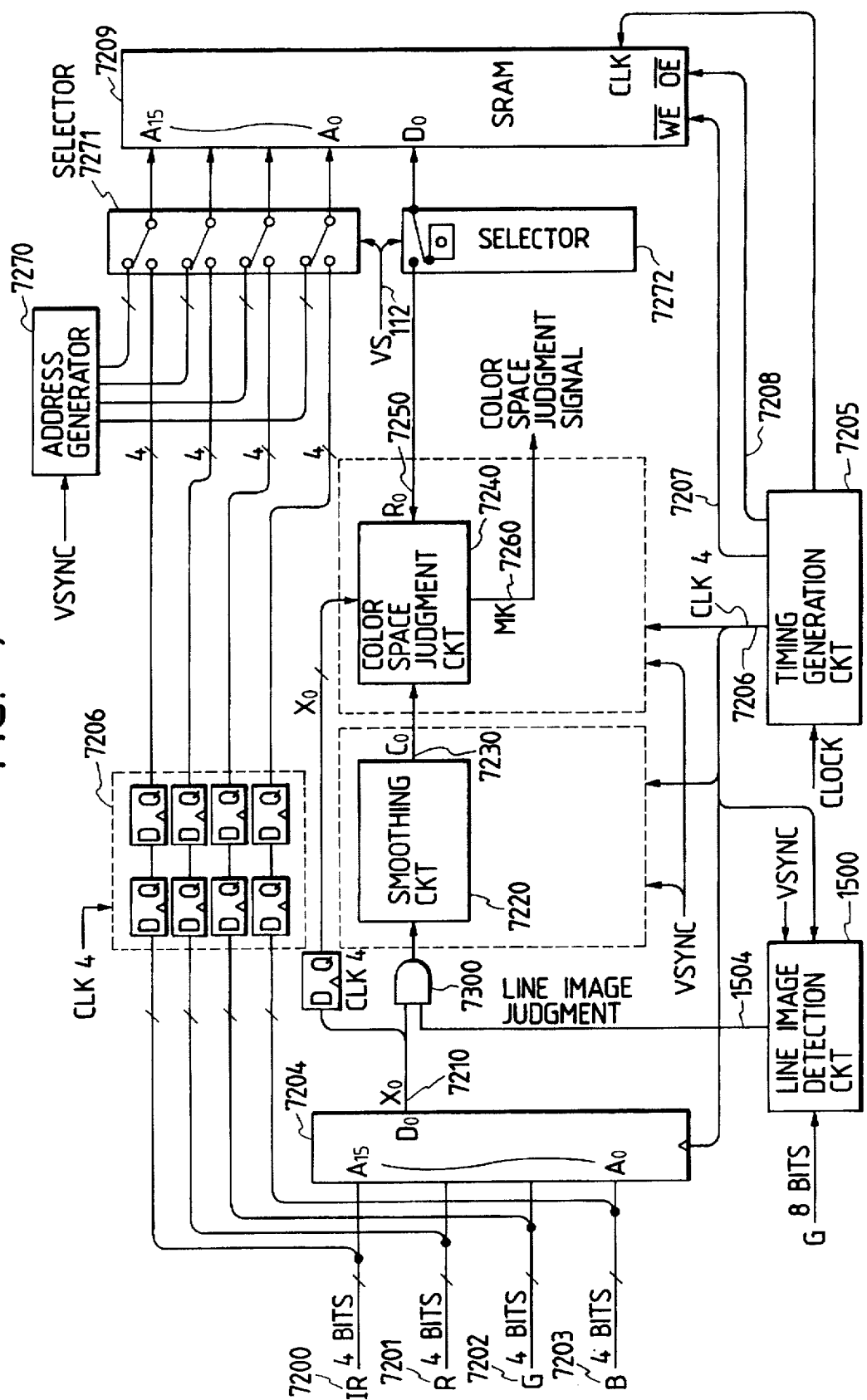
FIG. 7 is a block diagram illustrating a discrimination unit 3.

FIG. 7 is a block diagram illustrating a discrimination unit 3 shown in FIGS. 27A and 27B.

In the figure, IR data 7200 represents four high order bits of the eight-bit infrared signal supplied from the line delay element 3010. Likewise, R data 7201 represents four high order bits of the eight-bit red signal supplied from the line delay element 3011 and G data 7202 represents four high order bits of the eight-bit green signal supplied from the line delay element 3012. In addition, B data 7203 represents four high order bits of the eight-bit blue signal supplied from the shading correction unit 3009. The reason only the four high order bits of each signal are used is to simplify the discrimination circuit, especially a read-only memory 7204.

The ROM (judgment ROM) 7204 stores information regarding to tints of the color (yellow) thin lines. Four bits of the IR, R, G and B data are stored in addresses $A_0$ through $A_{15}$. The judgment ROM 7204 judges whether each tint of the IR, R, G and B data is matched with a predetermined tint (including the IR information). If the tint is matched with the predetermined one, the judgment ROM 7204 produces "1" from $D_0$ and, otherwise, it produces "0" therefrom.

A smoothing circuit 7220 is for carrying out smoothing operation, which will be described later in conjunction with FIGS. 10 and 11.

A color space judgment circuit 7240 calculates in real time a similarity between the specific original discrimination pattern and the supplied color signal in the IR-R-G-B color cube shown in FIGS. 4 and 5. The color space judgment circuit 7240 produces a color space similarity judgment signal $MK_0$.

Selectors 7271 and 7272 are for clearing a static random-access memory (SRAM) 7209 when the sub scan section signal VSYNC is in 0 (LOW) level. An address generator 7270 is a circuit for generating successively all addresses for the SRAM 7209. When the VSYNC is in the LOW level, the SRAM 7209 is cleared into zero according to an address signal generated by the address generator 7270.

Figure 9:
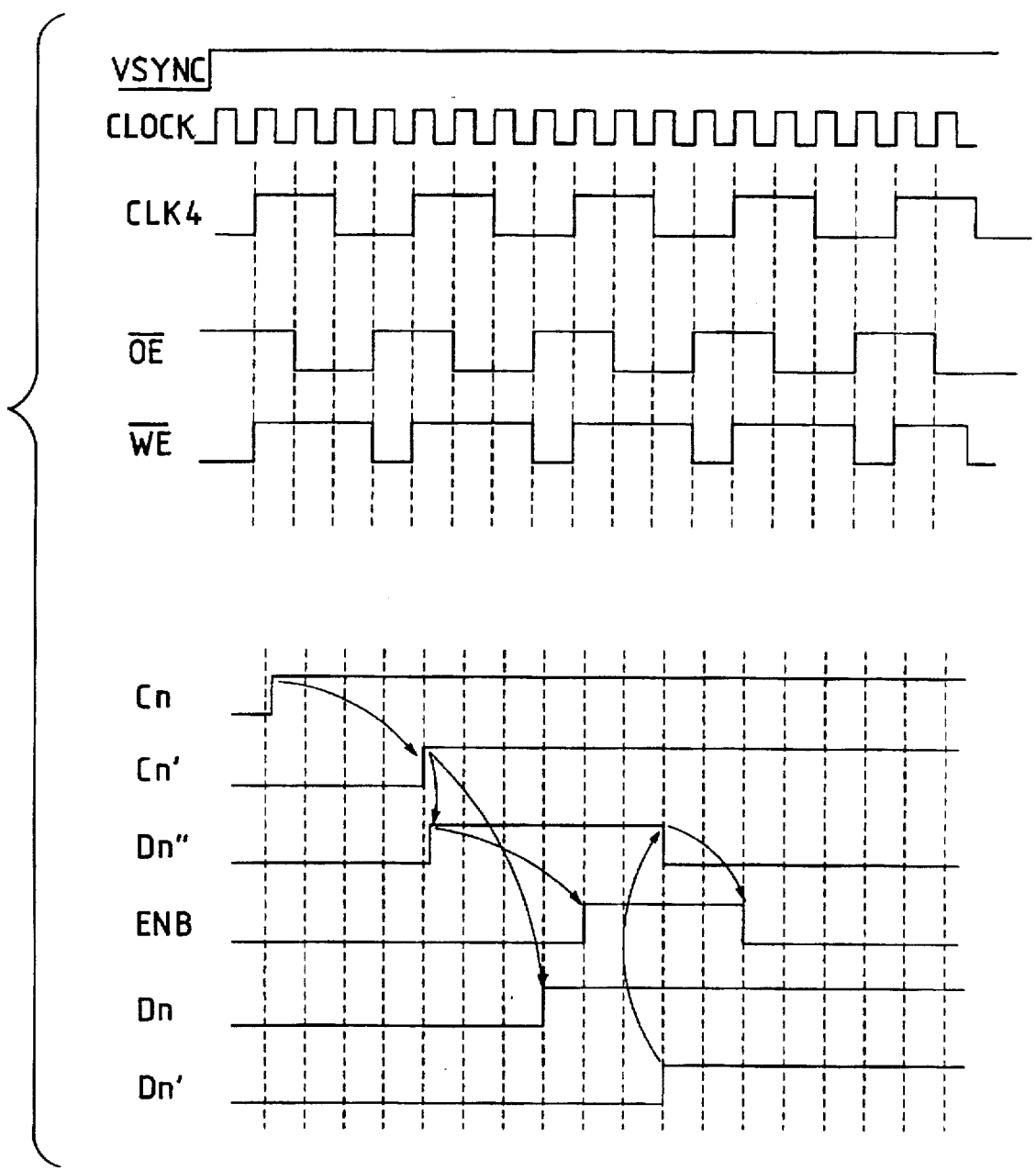
FIG. 9 is a timing chart for use in describing operation of the color space judgment circuit 7240.

A timing generating circuit 7205 produces timing signals shown in FIG. 9.

A clock (CLK4) 7206 is a clock signal obtained by means of dividing a reference clock into four divisions. A signal 7207 is for controlling a write enable terminal WE of the SRAM 7209 while a signal 7208 is for controlling an output enable terminal OE of the SRAM 7209.

Figure 8:
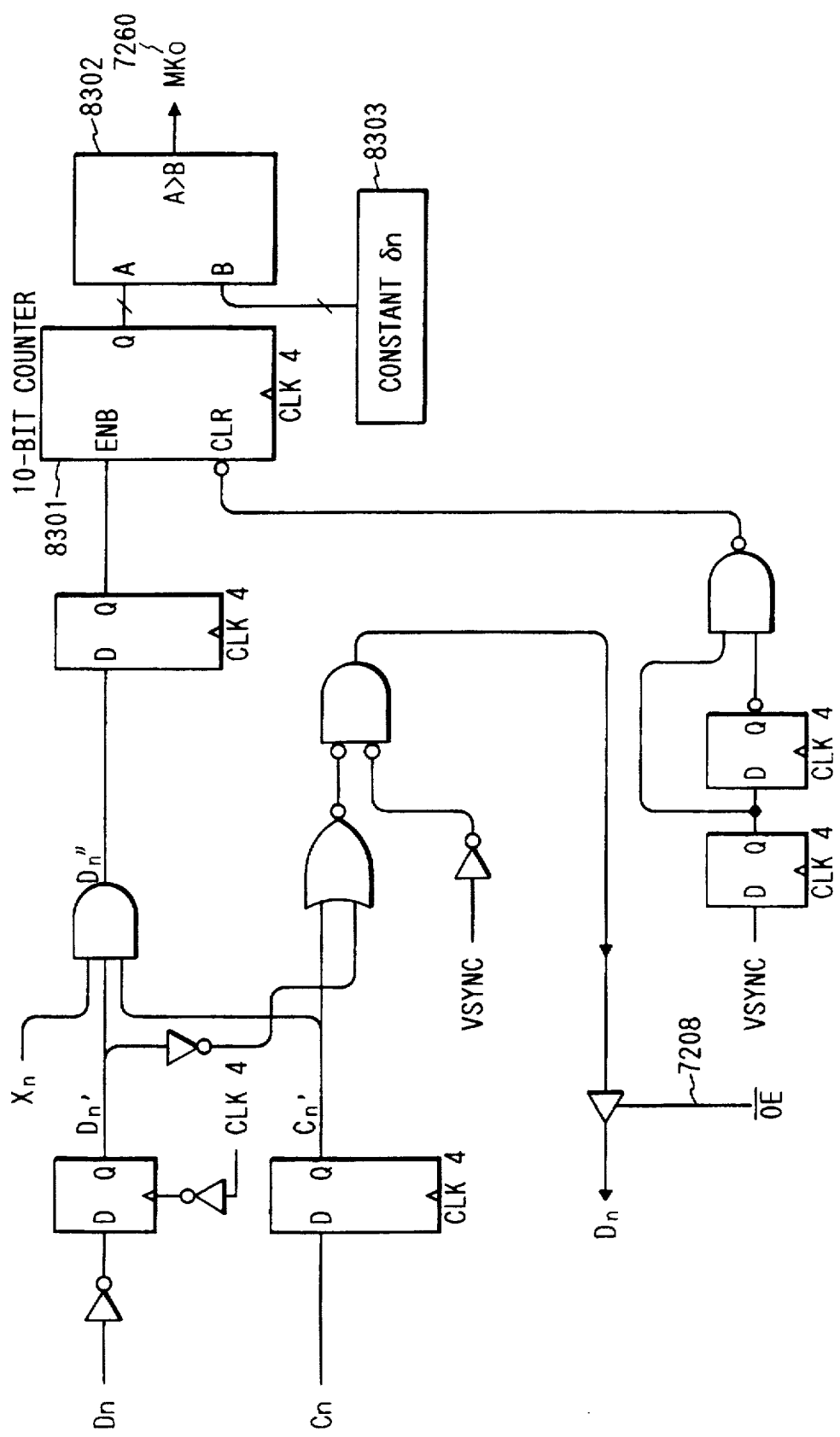
FIG. 8 is a circuit block diagram of a color space judgment circuit 7240.

FIG. 8 is a circuit block diagram of the color space judgment circuit 7240.

The color space judgment circuit 7240 receives a data $D_0$ and a signal $C_0$ supplied from the SRAM 7209 and the smoothing circuit 7220, respectively. The data $D_0$ and the signal $C_0$ are subjected to OR calculation. The result of the OR calculation is written to the SRAM 7209. In addition, a counter 8301 is incremented only when the data $D_0$ is shifted from 0 to 1. The counter 8301 is cleared at the timing of starting up the sub scan section signal VSYNC. An output Zn of the counter 8301 is supplied to a comparator 8302. The comparator 8302 is also provided with a constant δn from a register 8303. The comparator 8302 compares the output Zn with the constant δn to produce the color space similarity judgment signal MK. In this embodiment, the color space similarity judgment signal $MK_0$ represents 1 when the output Zn is larger than the constant δn. On the other hand, when the output Zn is equal to or smaller than the constant δn, the color space similarity judgment signal MK represents 0. A value of the constant dn is set to P % of $U_{ORG}$ shown in FIG. 12. (In this embodiment, P is equal in number to ninety.)

Figure 10:
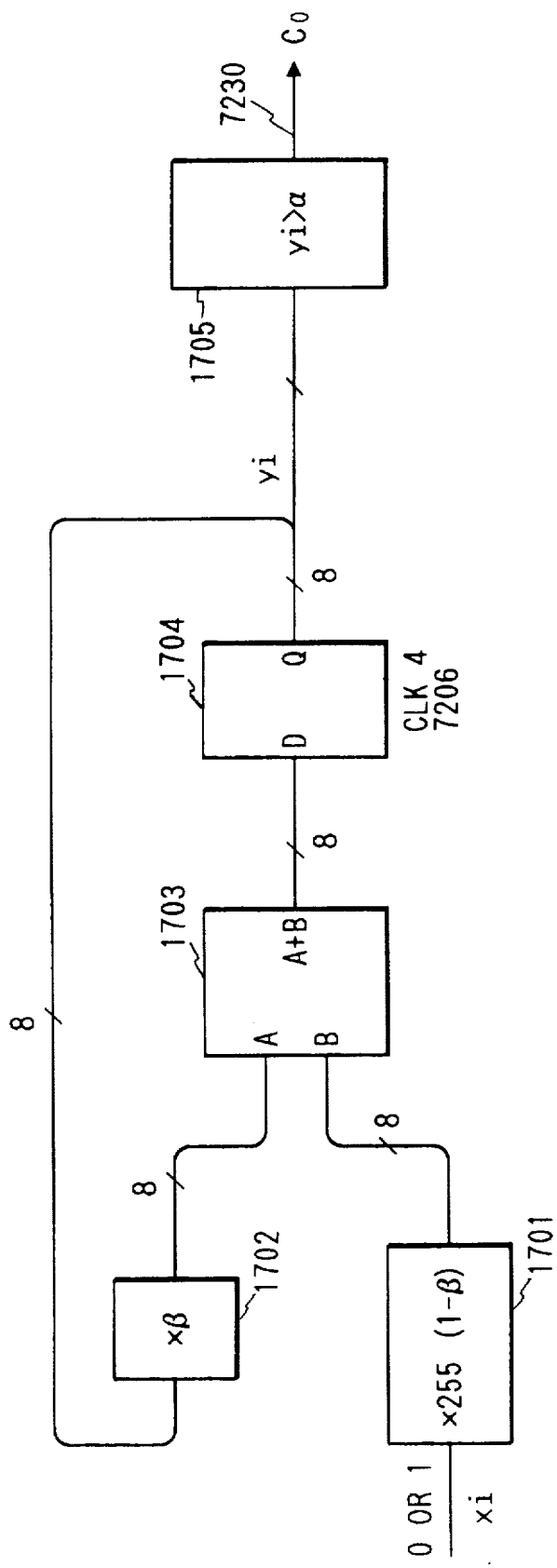
FIG. 10 is a circuit block diagram of a smoothing circuit 7220.

FIG. 10 is a circuit block diagram of the smoothing circuit 7220.

In the figure, the smoothing circuit 7220 comprises multipliers 1701 and 1702, an adder 1703, a latch circuit 1704 and a comparator 1705. A combination of the multipliers 1701 and 1702 and the adder 1703 contributes to provide a weighted mean of an input data and a previous input data. Thus, the judgment considering continuity as shown in FIG. 11 can be achieved.

Figure 11:
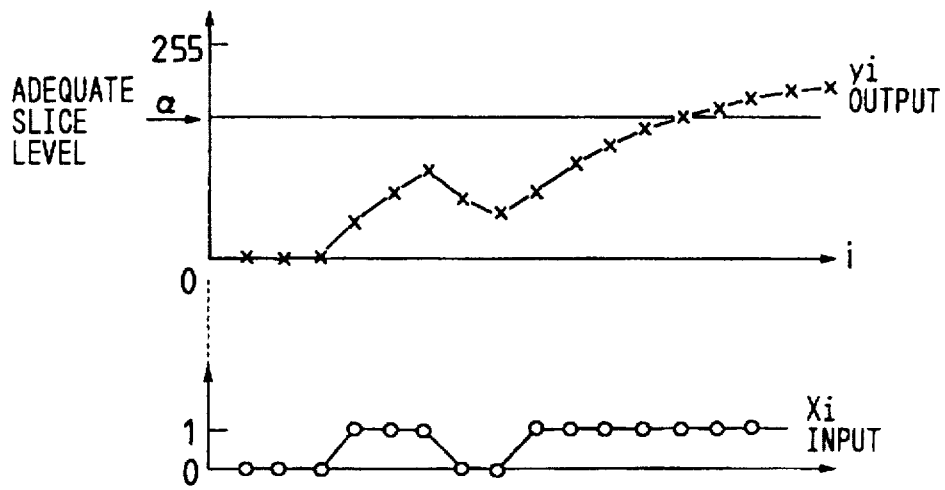
FIG. 11 is a view for use in describing a relation between an input Xi and an output Yi to and from the smoothing circuit 7220.

FIG. 11 is a view for use in describing a relation between an input Xi and an output Yi shown in FIG. 10 to and from the smoothing circuit 7220.

If "1" is continuously provided as the input Xi, the value of the Yi is increased. Accordingly, the output $C_0$ 7230 becomes "1" only when the input IR, R, G and B signals are matched with the tints of the specific original discrimination pattern and the line image is present continuously. This allows determination whether the specific original discrimination pattern is present continuously, thereby the adverse effects due to noises or the like can be avoided.

Figure 14:
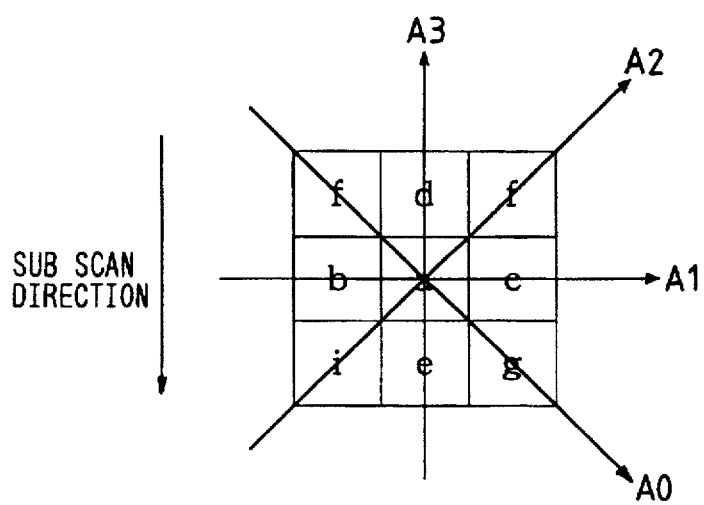
FIG. 14 is a view for use in describing a line image detecting operation carried out by a line image detection circuit 1500.
Figure 15:
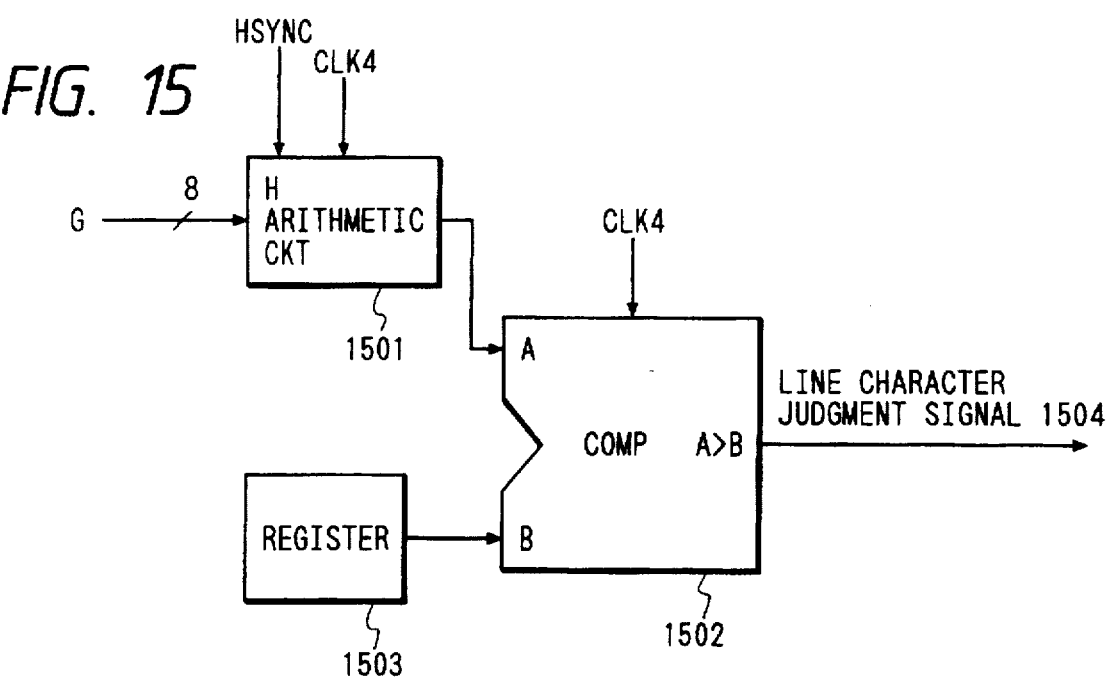
FIG. 15 is a circuit block diagram showing the line image detection circuit 1500.

FIGS. 14 and 15 are views for use in describing the line image detection circuit 1500 shown in FIG. 7.

In FIG. 14, a, b, c, d, e, f, g, h and i represent pixel values of eight bits (0 through 255) of the green signal in each pixel.

It is assumed that $A_0=g+a+f$, $A_1=b+a+c$, $A_2=i+a+h$, $A_3=d+a+e$ and $H=\max(A_0, A_1, A_2, A_3)-\min(A_0, A_1, A_2, A_3)$. When a straight line is present in either one of the directions $A_0$ through $A_3$, i.e., when the pixel a is classified into the line image, the value of H is increased. In this way, it is possible to determine whether the supplied pixel a is line image.

FIG. 15 is a block diagram showing a structure of the line image detection circuit 1500. The line image detection circuit 1500 comprises an H arithmetic circuit 1501, a comparator 1502 and a register 1503. The H arithmetic circuit 1501 calculates a value of H. The output of the H arithmetic circuit 1501 is supplied to the comparator 1502.

The register 1503 stores a predetermined constant that is supplied to the comparator 1502. The comparator 1502 compares the value of H with the constant supplied from the register 1503 to produce a line image judgment signal 1504.

The line image judgment signal 1504 is supplied to an AND circuit 7300 shown in FIG. 7. The AND circuit 7300 ANDs the line image judgment signal 1504 with a color judgment signal 7210. As a result, the pixels corresponding to the yellow line image can be extracted.

The color space judgment signal $MK_0$ 7260 shown in FIGS. 7 and 8 is supplied to a latch circuit 3022 in FIGS. 27A and 27B. An output of the latch circuit 3022 is supplied to an input port P10 of the CPU 3018. In response to this, the CPU 3018 recognizes detection of the specific original discrimination pattern. The CPU 3018 clears the latch 3022 for the subsequent pattern by means of a signal supplied from a port P9 thereof before starting a copy sequence.

Figure 29:
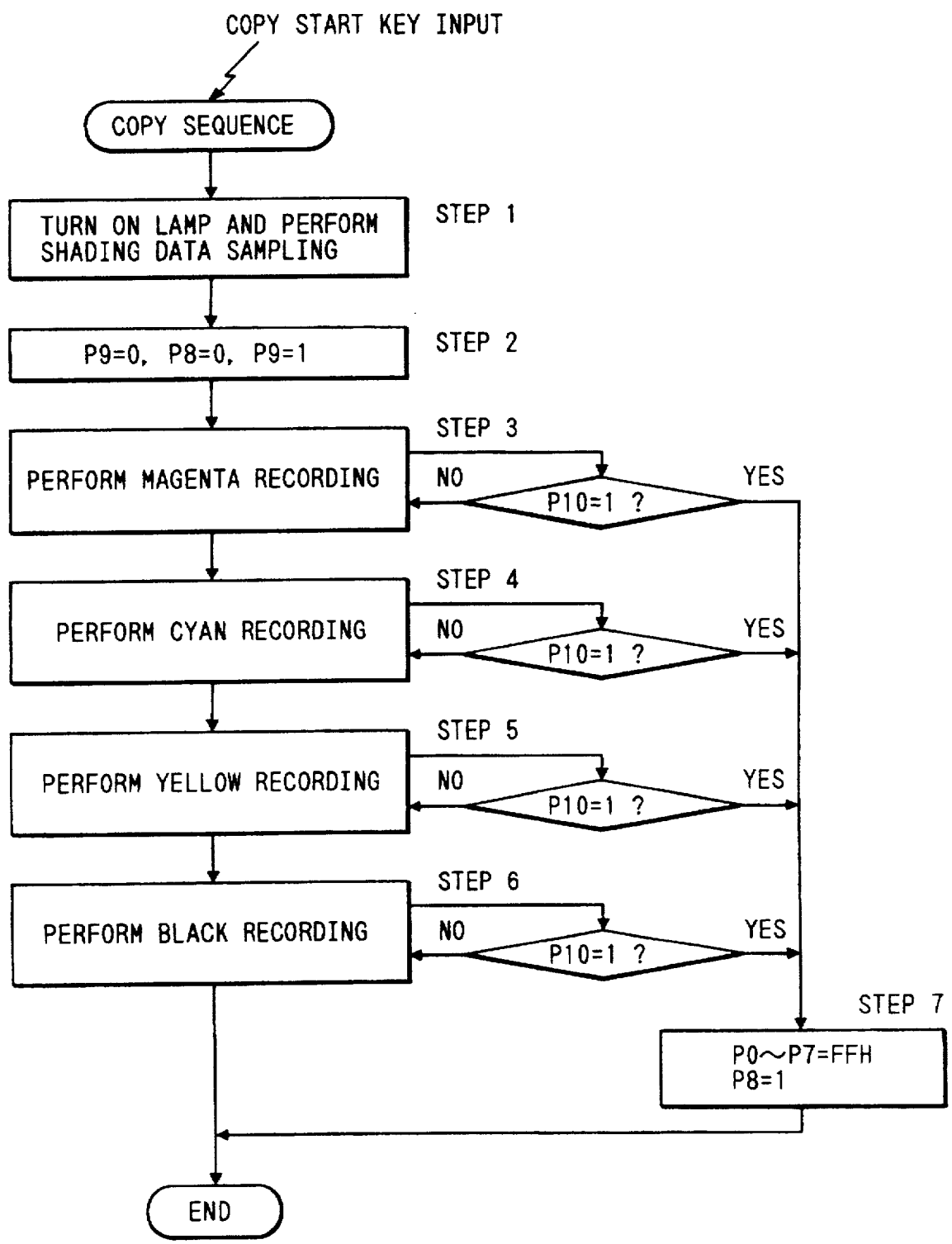
FIG. 29 is a control flow carried out by a central processing unit (CPU)

FIG. 29 is a control flow carried out by the CPU 3018 for a normal copying operation and a specific original discrimination pattern judging operation associated therewith.

When an operator put the original 204 on the platen 203 and initiates the copying operation through an operation unit (not shown), the CPU 3018 controls a motor (not shown) to move the reflection mirror 206 beneath the standard white plate 211.

The halogen lamp 205 is then turned on to illuminate the standard white plate 211. The shading correction units 3006 through 3009 sample the shading data for the IR, R, G and B signals (step 1).

Subsequently, the port output P is set into "0" to clear the output of the latch 3022 into "0" and, in turn, clear the P8 output into "0". An input A of the selector 3017 is selected such that the image signals masked and subjected to the undercolor removal (UCR) are supplied to the printer. The output P9 is set to "1" to stop the clear operation of the latch 3022 (step 2).

Next, the scanning operation is repeated four times as the printer unit 200 records four colors of M, C, Y and BK to complete one copy of the original. At the same time, presence of the identification mark is detected and the recording operation is controlled in accordance with the detection result.

The CPU 3018 sets, for recording magenta, processing conditions for magenta into the masking UCR processing unit 3016. Subsequently, the CPU operates the optical system to supply a signal indicating magenta to the printer 200. After completion of the scanning operation, the optical system is turned back to an initial position of scanning (step 3).

The CPU periodically reads the input signal supplied to the port 10 during the scanning operation to determine whether the input signal indicates "1". If the P10 is "1", outputs of P0 through P7 are set into FFH at step 7 based on the decision that the specific original is to be copied. In addition, an output of P8 is set into "1" to supply the printer 200 a set-solid signal of FFH, whereby prohibiting further copying operation to avoid counterfeit of the specific original.

Likewise, the recording control is also made for cyan, yellow and black through steps 4 to 6, during which the CPU periodically checks the P10. If the P10 is "1" the CPU supplies the set-solid FFH data to the printer 200 at step 7.

For example, when P10=1 is detected during cyan recording, only magenta is recorded through a normal or proper copying operation. The remainders, cyan, yellow and black are recorded as solid of FFH (i.e., painted all over in a single color).

<Second Embodiment>

Figure 16:
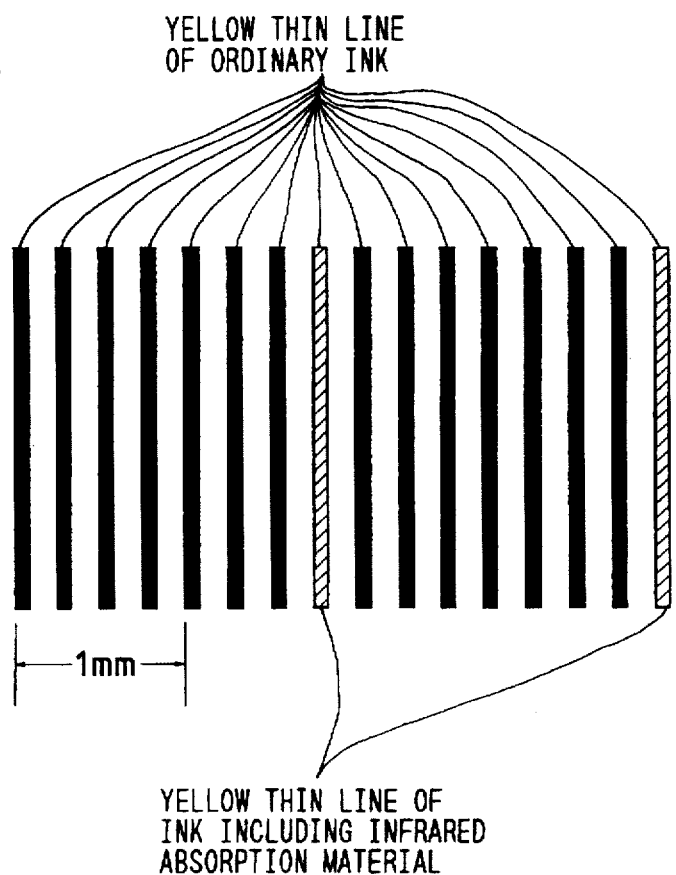
FIG. 16 shows a specific original discrimination pattern according to a second embodiment of the present invention.

FIG. 16 shows a specific original discrimination pattern according to a second embodiment of the present invention.

In the above mentioned first embodiment, the yellow thin lines printed using an ordinary yellow recording material and those printed using a yellow ink containing the infrared absorbing material are alternated at a constant distance.

On the contrary, the second embodiment elongates the distance between two yellow thin lines printed using the ink containing the infrared absorbing material.

The focusing lens 208 shown in FIG. 2 is for focusing the original image on the CCD sensor 210. A complex lens arrangement is required to focus the original image on the CCD sensor 210 for all wavelengths of from the visible region to the infrared region without degrading a space resolution. This makes the lens system expensive.

Thus, to avoid this problem, the yellow thin lines printed with the infrared absorbing ink are spaced away from each other at the elongated distance. As a result, the line image patterns can be kept even when the image information is provided with the infrared absorbing thin lines being faded.

In addition, the infrared absorbing material costs much as compared with the ordinary ink materials. By using less infrared absorbing material is thus preferable by the economic considerations.

<Third Embodiment>

Figure 17:
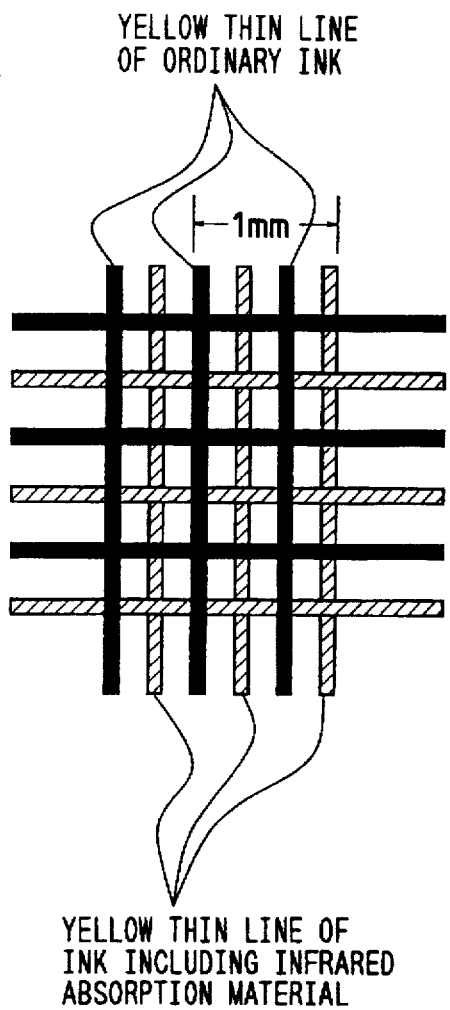
FIG. 17 shows a specific original discrimination pattern according to a third embodiment of the present invention.

FIG. 17 shows a specific original discrimination pattern according to a third embodiment of the present invention.

In the above mentioned first and second embodiments, the specific original discrimination pattern is formed with the thin lines arranged in parallel. On the contrary, the third embodiment provides the pattern with the thin lines crossing at a right angle to each other.

The resolution of an image reading apparatus in the main scan direction is not necessarily coincident with the resolution thereof in the sub scan direction. The orthogonal lines forming the specific original discrimination pattern contributes to detecting the pattern in a more reliable manner with such an image reading apparatus.

<Fourth Embodiment>

Figure 18:
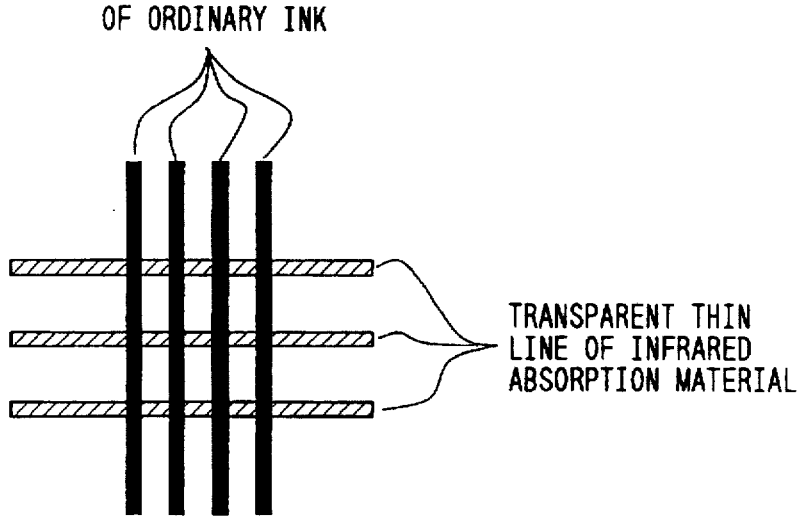
FIG. 18 is a specific original discrimination pattern according to a fourth embodiment of the present invention.

FIG. 18 is a specific original discrimination pattern according to a fourth embodiment of the present invention.

In this embodiment, the ordinary yellow lines are crossed with the transparent lines to form the specific original discrimination pattern. This embodiment provides various effects similar to those obtained in the third embodiment.

As mentioned above, by using the pattern formed of the normal visible patterns and the transparent patterns printed with the ink containing the infrared absorbing material, it becomes possible to discriminate the specific original discrimination pattern from the background with a high accuracy.

While the above mentioned embodiments have thus been described in conjunction with operations carried out in the color copying machine, the present invention can equally be applied to a computer for processing images or to a scanner for use in an image filing device.

As mentioned above, according to the above embodiments, the specific original can be discriminated from others with a high accuracy.

<Fifth Embodiment>

The apparatus used in this embodiment is similar in structure and in operation to the apparatus described in conjunction with the first embodiment. Accordingly, detailed description of similar parts will be omitted.

Figure 30:
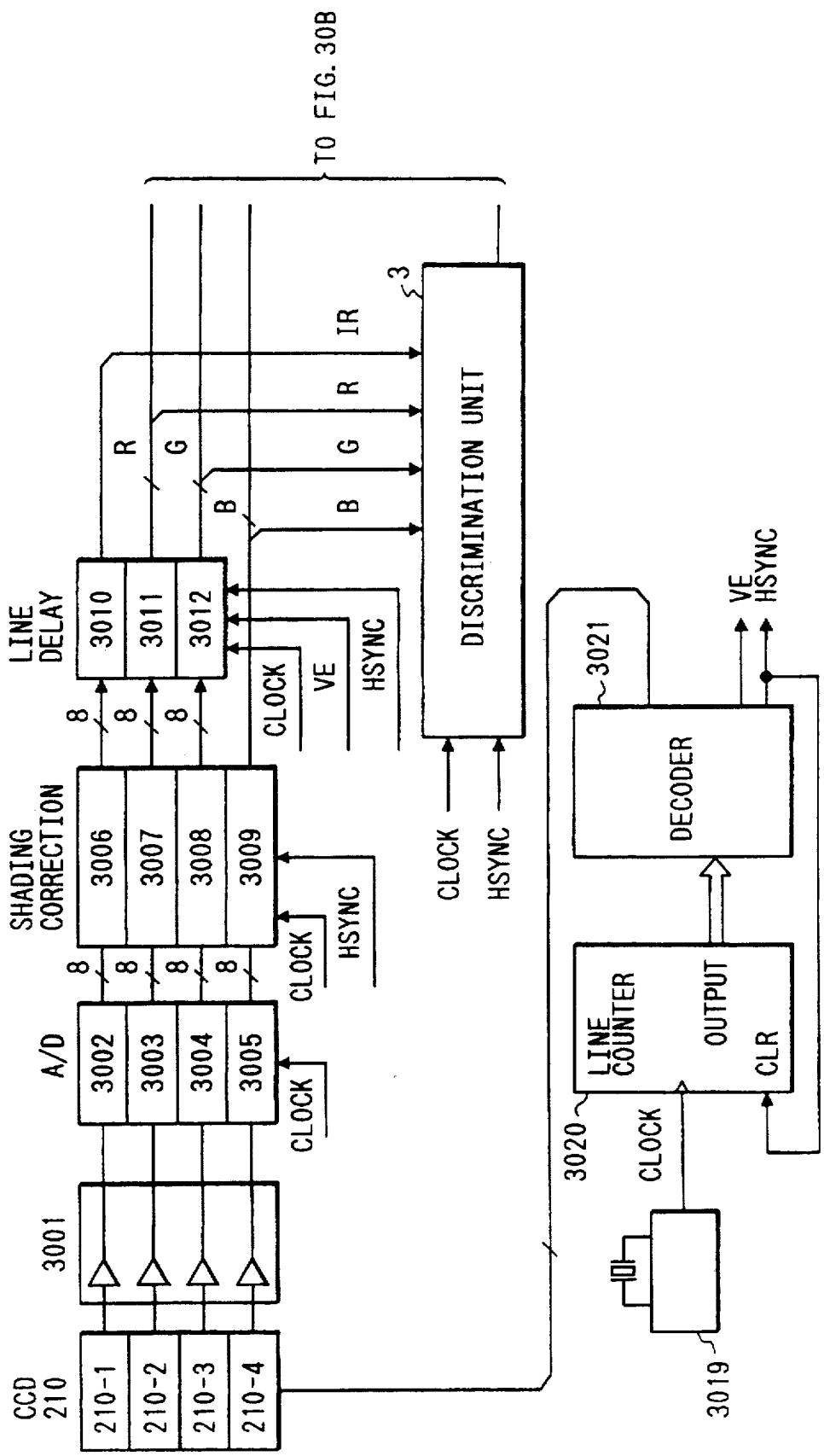
FIG. 30 is comprised of FIGS. 30A and 30B showing block diagrams of an image signal controlling unit.
Figure 30B:
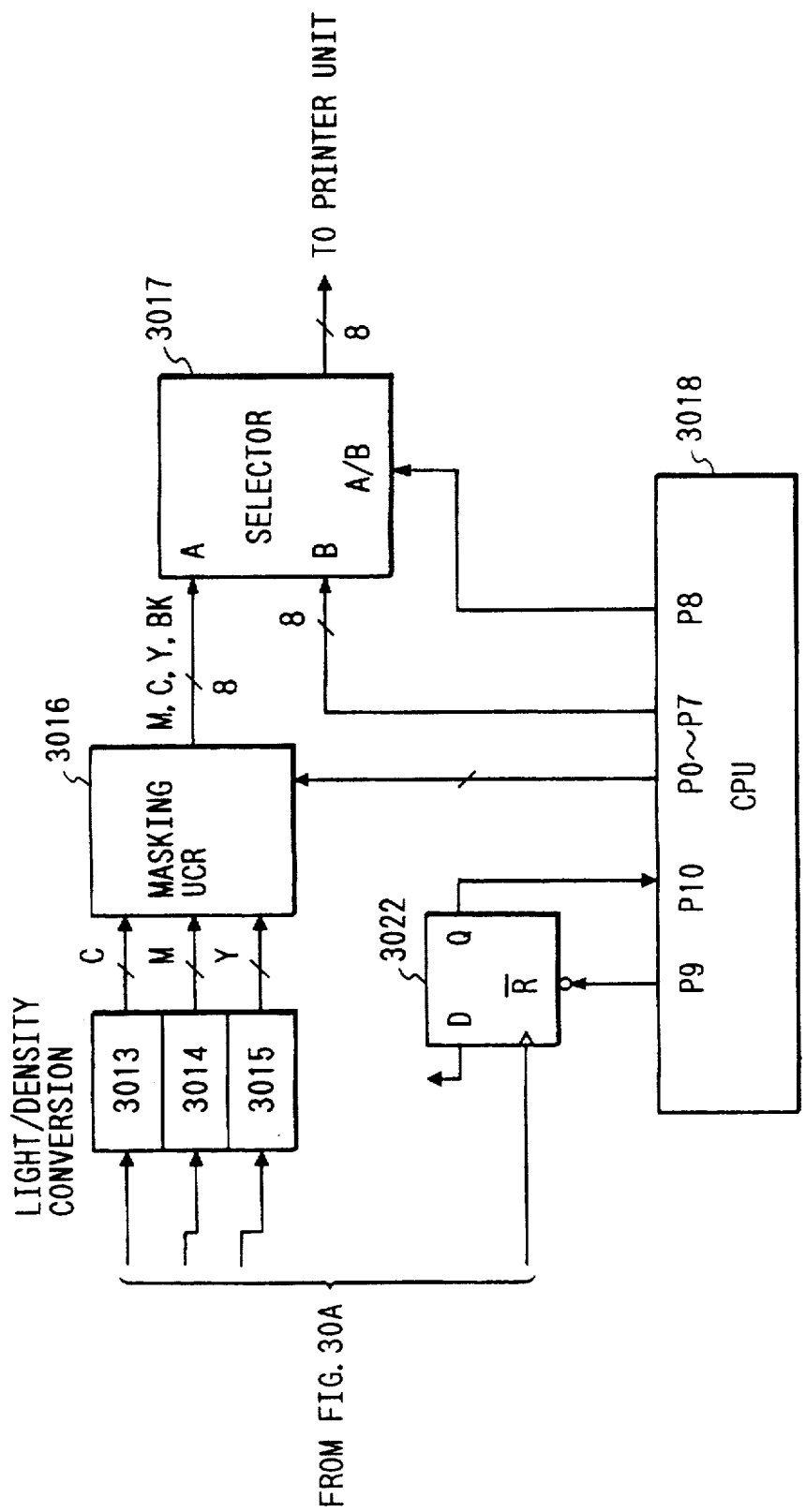

FIGS. 30A and 30B are block diagrams showing a flow of image signals in the image scanner unit 201, in which carried out is a signal processing similar to those described in conjunction with FIGS. 27A and 27B.

In addition, the timing of each control signal is similar to FIG. 28.

Figure 31A:
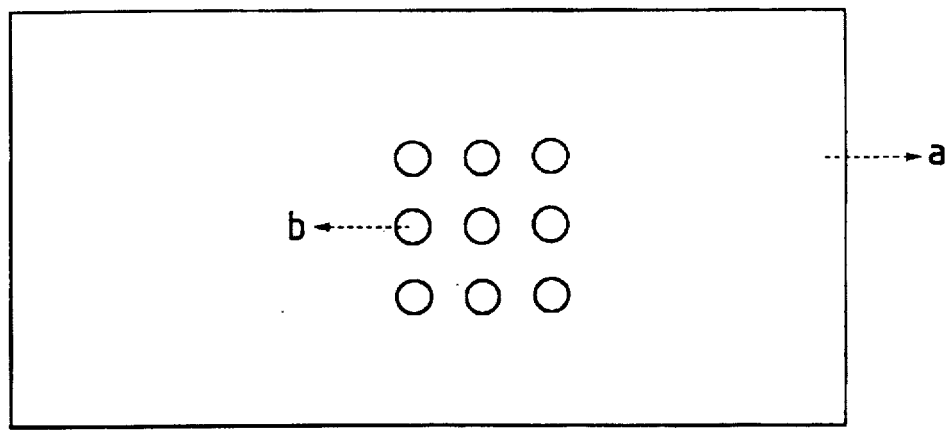
FIGS. 31A and 31B are views showing an exemplified arrangement of specific original discrimination patterns according to a fifth embodiment of the present invention.
Figure 31B:
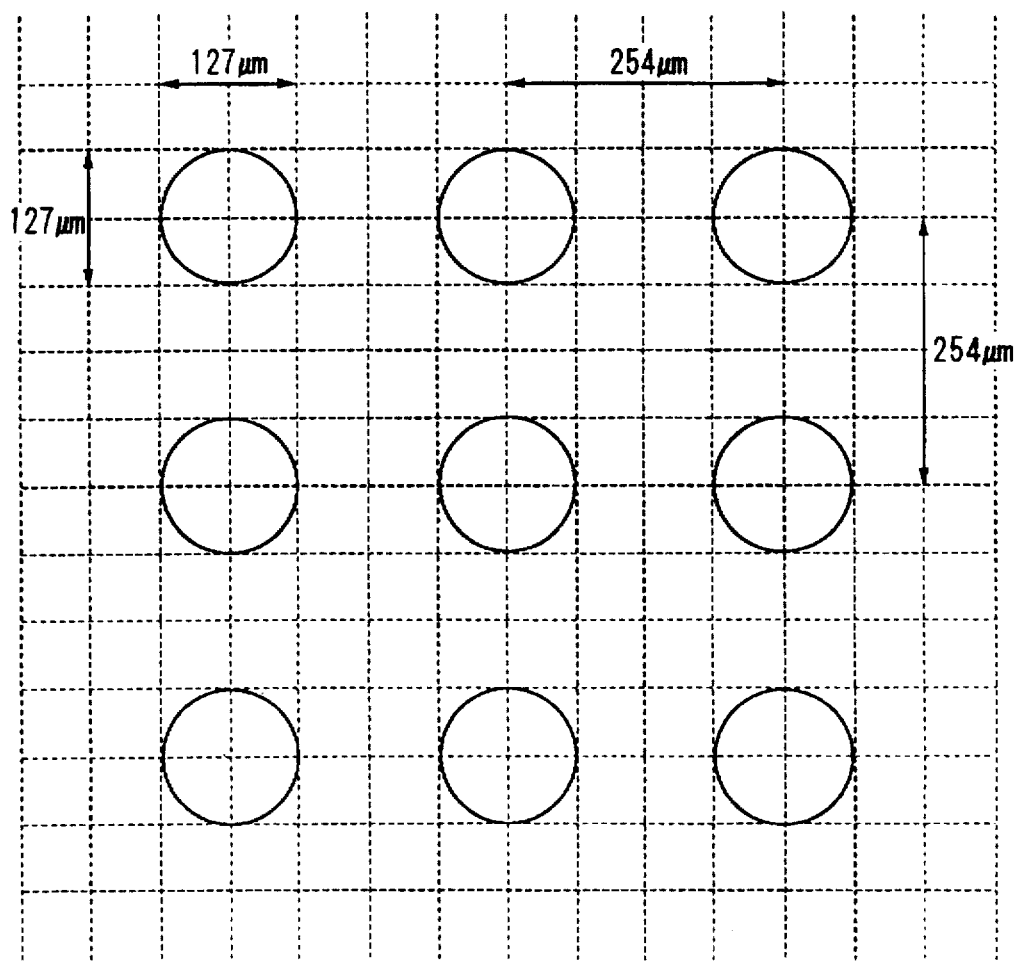

An image pattern to be detected in this embodiment is shown in FIGS. 31A and 31B. FIG. 31A is a view showing an exemplified arrangement of specific original discrimination patterns printed with the transparent ink having the infrared absorbing characteristic as shown in FIG. 21. In this embodiment, a region a is printed with an ink that has no infrared absorbing characteristic. A plurality of small patterns b are printed thereon with the above mentioned transparent ink. FIG. 31B is an enlarged view of the patterns b. Each pattern b is generally circle having a diameter of approximately 127 μm. These patterns are aligned as a matrix with a distance of 254 μm between two adjacent patterns. The configuration, size and arrangement of these patterns are not limited to those illustrative examples.

The patterns b are approximately equal in color to the background, so that no one can distinguish the patterns b from the region a. However, the patterns b can be detected in the infrared region. Each pattern exemplified here is enclosed in a square having sides of approximately 127 μm. This square corresponds to four pixels as shown in FIG. 31B when being scanned with the resolution of 400 dpi.

Figure 32:
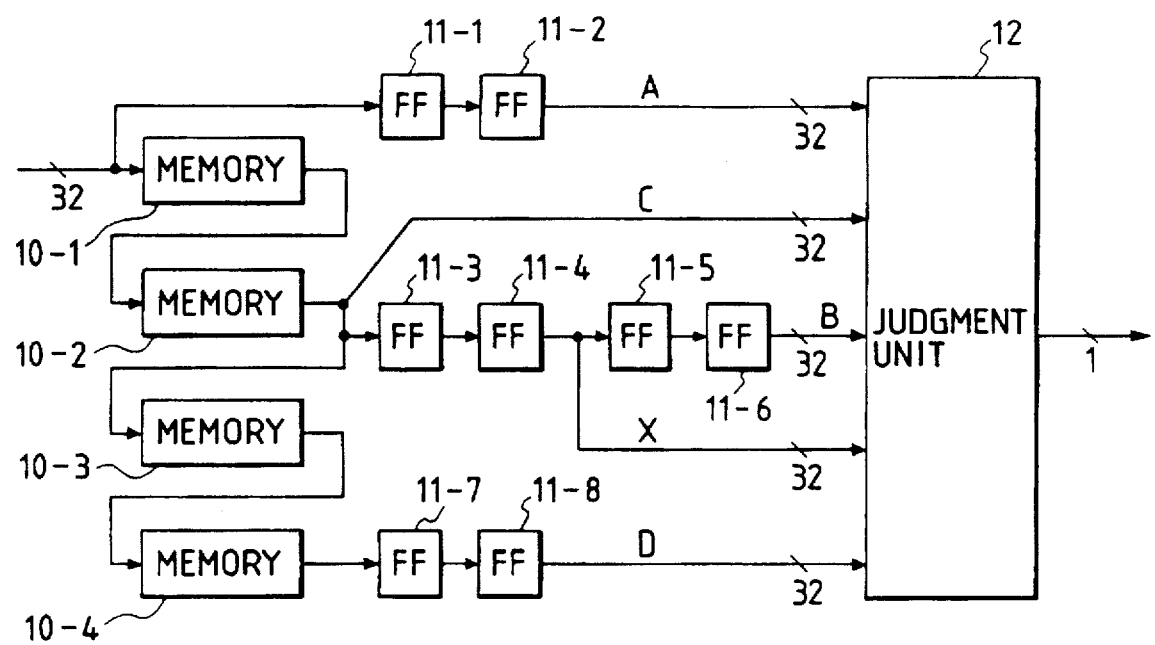
FIG. 32 is a block diagram of a two-dimensional area signal generating unit for use in detecting the specific pattern according to the fifth embodiment of the present invention.

Details of the discrimination unit 3 in FIGS. 30A and 30B according to the fifth embodiment are described with reference to FIG. 32. Each of image data line delay units 10-1 through 10-4 in FIG. 32 is formed with FIFO, of which address pointer is initialized by the line synchronization signal HSYNC (not shown). The image data line delay units 10-1 through 10-4 write and read data for every pixel as a unit in response to the CLOCK signal. The image data line delay units 10-1 through 10-4 delay the R, G, B and IR data of 32 bits, respectively, by an amount equivalent to one line.

An input signal is latched by flip-flops 11-1 and 11-2 with being delayed by an amount equivalent to two pixels to produce a pixel data A. This signal is delayed by an amount equivalent to two lines by using the line memories 10-1 and 10-2 to produce a pixel data C. The pixel data C is delayed by an amount equivalent to four pixels to produce a remark pixel data X and a pixel data B. All of these signals A, C and X are supplied to a judgment unit 12. Likewise, a pixel data D is produced and supplied to the judgment unit 12.

Figure 33:
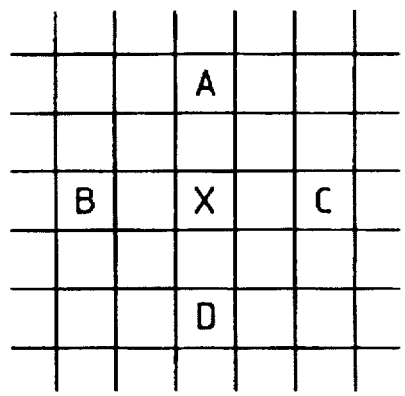
FIG. 33 shows reference pixels for discriminating a specific pattern from others according to the fifth embodiment of the present invention.

The orientations of four pixels A, B, C and D relative to the remark pixel X are as indicated in FIG. 33. If the remark pixel X corresponds to the pattern printed with the ink b, then the peripheral pixels A, B, C and D correspond to the pattern a of the background.

Now, described is a judgment algorithm carried out by the judgment unit 12 of this embodiment.

Let the R, G, B and IR components of the reading signal composing the pixel signal A be $A_R$, $A_G$, $A_B$ and $A_{IR}$, respectively, then average values $Y_R$, $Y_G$, $Y_B$ and $Y_{IR}$ of the reading signals of the corresponding color components R, G, B and IR in each of the pixel signals B, C and D are given as follows:

$Y_R = \frac{1}{4}(A_R + B_R + C_R + D_R)$, $Y_G = \frac{1}{4}(A_G + B_G + C_G + D_G)$, $Y_B = \frac{1}{4}(A_B + B_B + C_B + D_B)$, and $Y_{IR} = \frac{1}{4}(A_{IR} + B_{IR} + C_{IR} + D_{IR})$.

Judgment of the target pattern is made according to the difference between the remark pixel X and the average value Y obtained from the above equation.

More specifically, let the R, G, B and IR components of X be $X_R$, $X_G$, $X_B$ and $X_{IR}$, then $\Delta R = |Y_R - X_R|$, $\Delta G = |Y_G - X_G|$, $\Delta B = |Y_B - X_B|$, and $\Delta IR = Y_{IR} - X_{IR}$.

In this event, the original is judged as the specific original when the following equations are satisfied:

$\Delta R < K$ and $\Delta G < K$ and $\Delta B < K$ and ($\Delta IR < L1$ or $Y_{IR}/X_{IR} < L2$), where K, L1 and L2 are constants.

More specifically, the pattern is judged to be present when the difference in tint is small (smaller than K) between the remark pixel X and any one of the peripheral portions A, B, C and D in the visible region; when the difference is equal to or larger than the constant L1 in the infrared region; and when the ratio of the level of the remark pixel X to that of the periphery is equal to or larger than the constant L2 in the infrared region.

In this event, the ratio is taken into consideration along with the difference in judging the infrared region in view of the reduction of the signal level of the infrared signal due to dirt on the original. In this embodiment, any affects of the dirt are eliminated by means of detecting the ratio, provided that the infrared reading signal is entirely attenuated due to the dirt.

Figure 36:
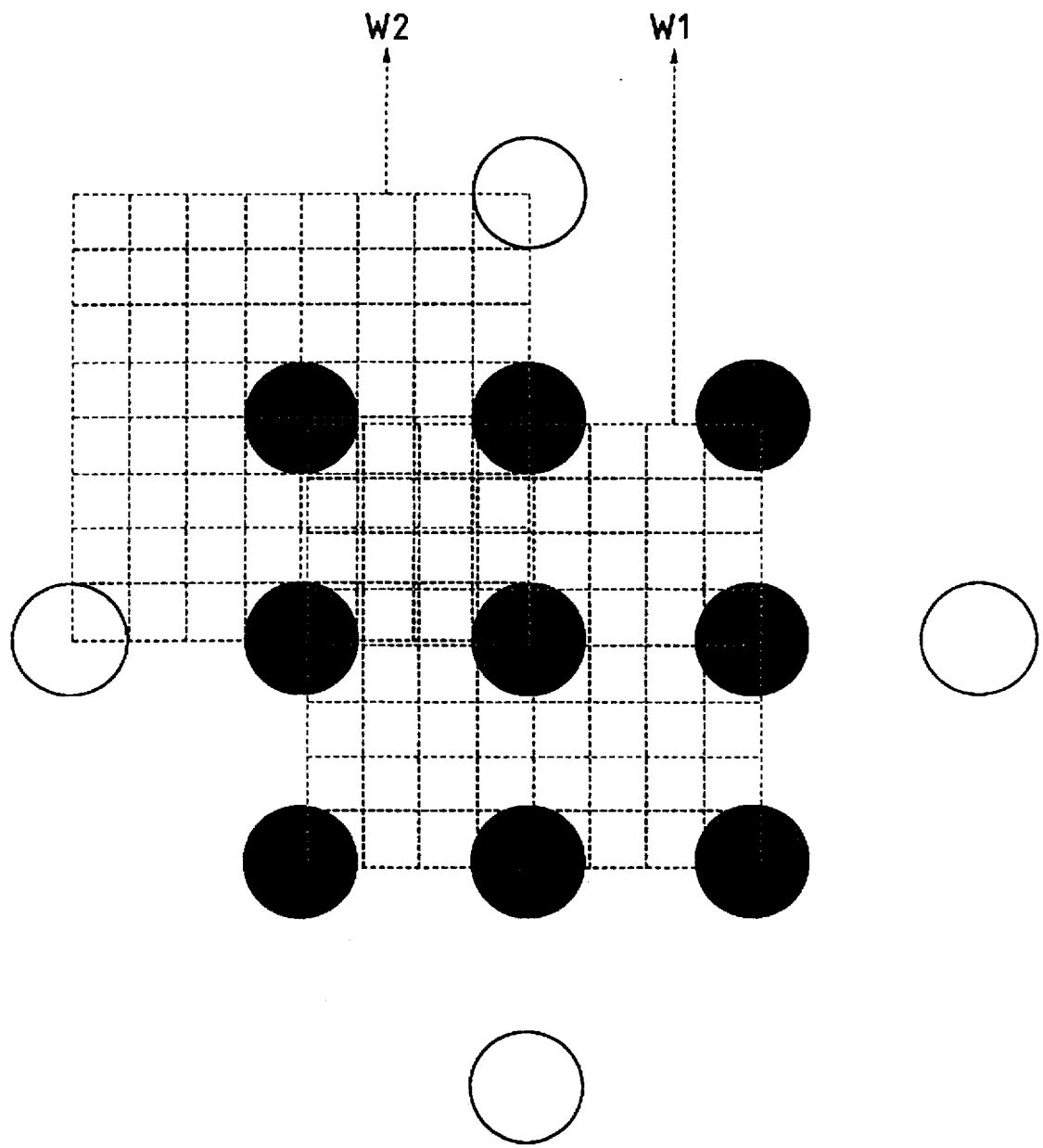
FIG. 36 is a view showing an array of patterns on the original according to the fifth embodiment.
Figure 37:
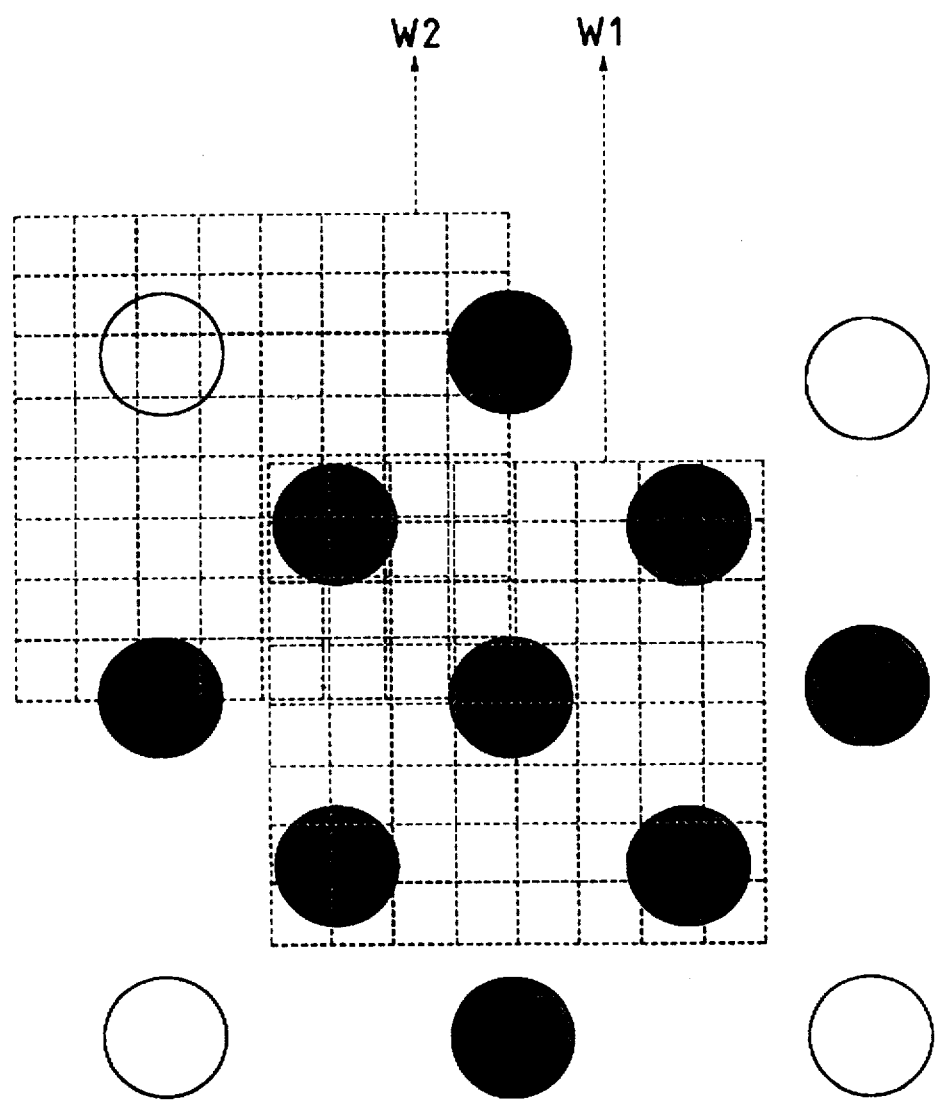
FIG. 37 corresponds to FIG. 36 except that the array is rotated by 45° relative to the original.

A density of the specific patterns is then counted, which is described with reference to FIGS. 36 and 37. If an array of 3×3 pixels as indicated by ● in FIG. 36 is read with a window W1 of 8×8 pixels, sixteen pixels out of sixty-four pixels correspond to the specific patterns, provided that more than half of each pixel is occupied by the pattern. Likewise, if the same array is read with a window W2, nine pixels correspond to the specific patterns. The window W1 provides the maximum density while the window W2 provides only a quarter of the array. The window W2 is a typical example of a case where the phase of the window is displaced from the original at the maximum amount. This state is referred to the minimum dense state. FIG. 37 corresponds to FIG. 36 except that the array is rotated by 45° relative to the original. Sixteen patterns are detected in the maximum dense window W1 while six patterns are detected in the minimum dense window W2. The window may be displaced relative to the original by an arbitrary angle. However, at least 2.25 patterns are enclosed in the window. Thus, the original is determined as the one that should be prevented from being copied when at least six out of sixty-four patterns are detected thereon.

As shown in FIGS. 36 and 37, with the array consisting of thirteen patterns, nine ● and four ○, the window W2 in FIG. 36 contains eleven patterns while the window W2 in FIG. 37 contains seven patterns. As a result, the reliability of the judgment can be improved.

Figure 34:
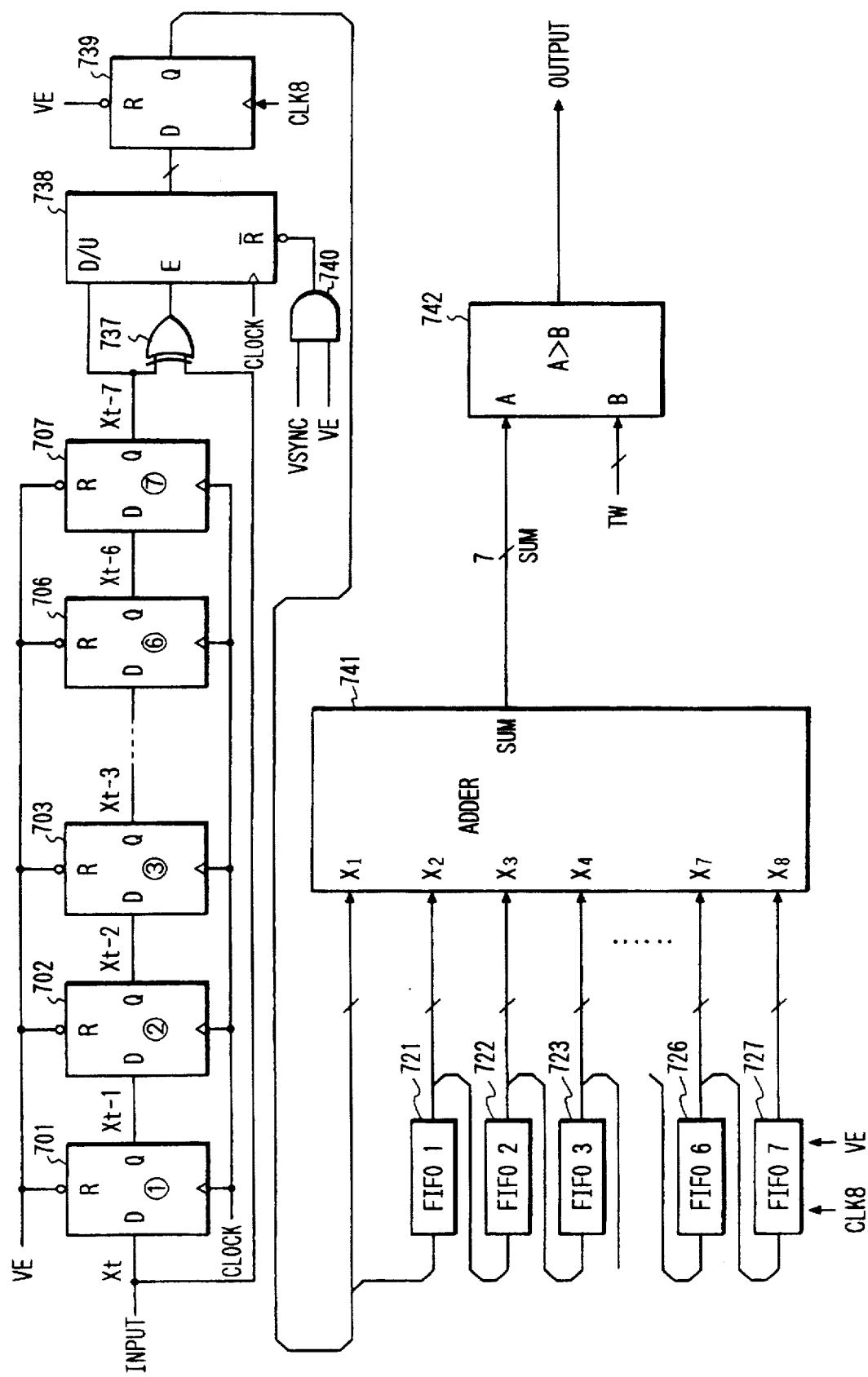
FIG. 34 is a block diagram showing a structure of a density detection unit in the fifth embodiment.

The judgment unit 12 for realizing the above mentioned algorithm comprises a pattern detection unit (FIG. 35) and a density detection unit (FIG. 34).

Figure 35:
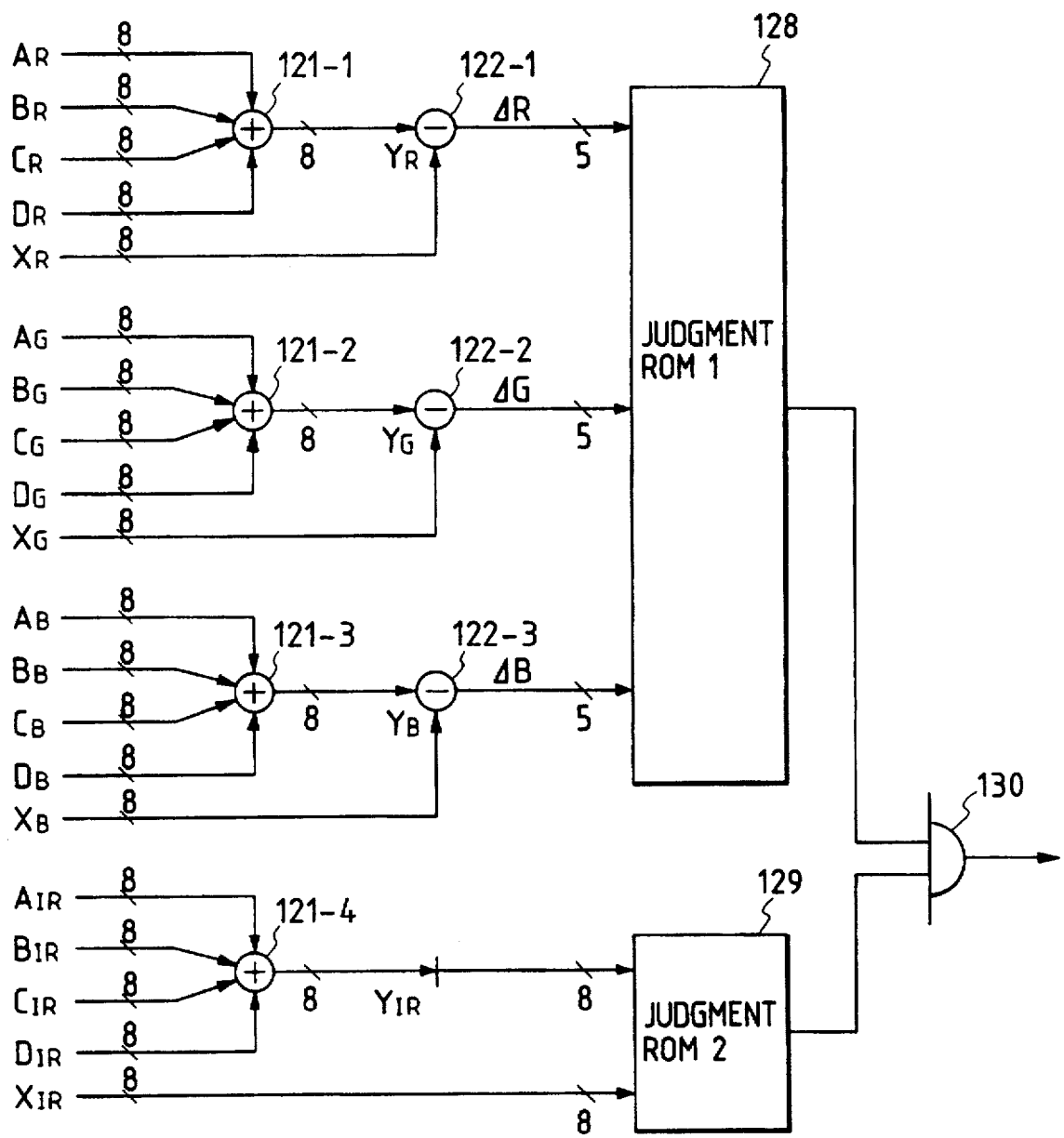
FIG. 35 is a block diagram showing a structure of a pattern detection unit in the fifth embodiment.

FIG. 35 shows the structure of the pattern detection unit. An adder 121 merely adds the color components of four pixels and produces the eight high-order bits of the sum to obtain $Y_R$, $Y_G$, $Y_B$ and $Y_{IR}$. A subtractor 122 calculates a difference between the output of the adder 121 and corresponding component of the remark pixel signal to obtain $\Delta R$, $\Delta G$ and $\Delta B$ components. The subtractor 122 supplies five high-order bits of the subtraction results to a judgment LUT 128 consisting of ROMs. The LUT 128 produces "1" when each of the $\Delta R$, $\Delta G$ and $\Delta B$ components is smaller than a constant K. Likewise, for the infrared reading signal, $Y_{IR}$ and $X_{IR}$ of eight bits each are supplied to address terminals of a judgment LUT 129 consisting of ROMs. The LUT 129 produces "1" when the above mentioned judgment result holds, that is, $\Delta IR > L1$ or $Y_{IR}/X_{IR} > L2$ holds in the calculation of $\Delta IR = Y_{IR-XIR}$.

The outputs of the LUTs are supplied to an AND gate 130 to obtain a logical product thereof. An output of the AND gate 130 indicating "1" corresponds to the condition where presence of the specific pattern is detected.

The judgment result is supplied to the density detection unit shown in FIG. 34. The density detection unit comprises D flip flops (DFFs) 701 through 707 arranged in series to successively delay the input signal in response to an image clock CLOCK signal. Each DFF is cleared to "0" in a non-image area, i.e., VE="0". The density detection unit also comprises an up-down counter 738 for 4 bits, an exclusive OR (EX-OR) gate 737 and an AND gate 740.

An output of the counter 738 is cleared to "0" in the section where either one of VSYNC and VE represents "0" while is kept without being cleared when $X_t = X_{t-7}$. The counter 738 is counted up when $X_t = 1$ and $X_{t-7} = 0$ and is counted down when $X_t = 0$ and $X_{t-7} = 1$. The output of the counter is latched by a latch circuit 739 in response to a clock signal CLK 8 of eight clock cycles, thereby producing a sum (equivalent to the number of 1) of the eight input data Xt received in one cycle of the CLK 8. An output of the latch circuit 739 is supplied to FIFO memories 721 through 727 each of which is for one line as a unit. Thus, data regarding to eight lines are simultaneously supplied to an adder 741. The adder produces the sum of the eight data. As a result, the SUM of the number of 1 in the 8×8 window is produces as 0 through 64.

The SUM is then supplied to a comparator 742. The comparator 742 compares the SUM with a predetermined comparative value TW determined by the CPU 3018 to produce an output of either "1" or "0". According to the above description, the TW may be equal in number to five.

The comparison result is supplied to a latch 3022 in FIGS. 30A and 30B. An output of the latch 3022 is supplied to an input port P10 of the CPU 3018. The CPU 3018 confirms that the specific mark is detected. The CPU 3018 clears the latch 3022 by an output port P9 signal before initiation of a copy sequence. The CPU 3018 is thus ready for the subsequent pattern detection.

Figure 46:
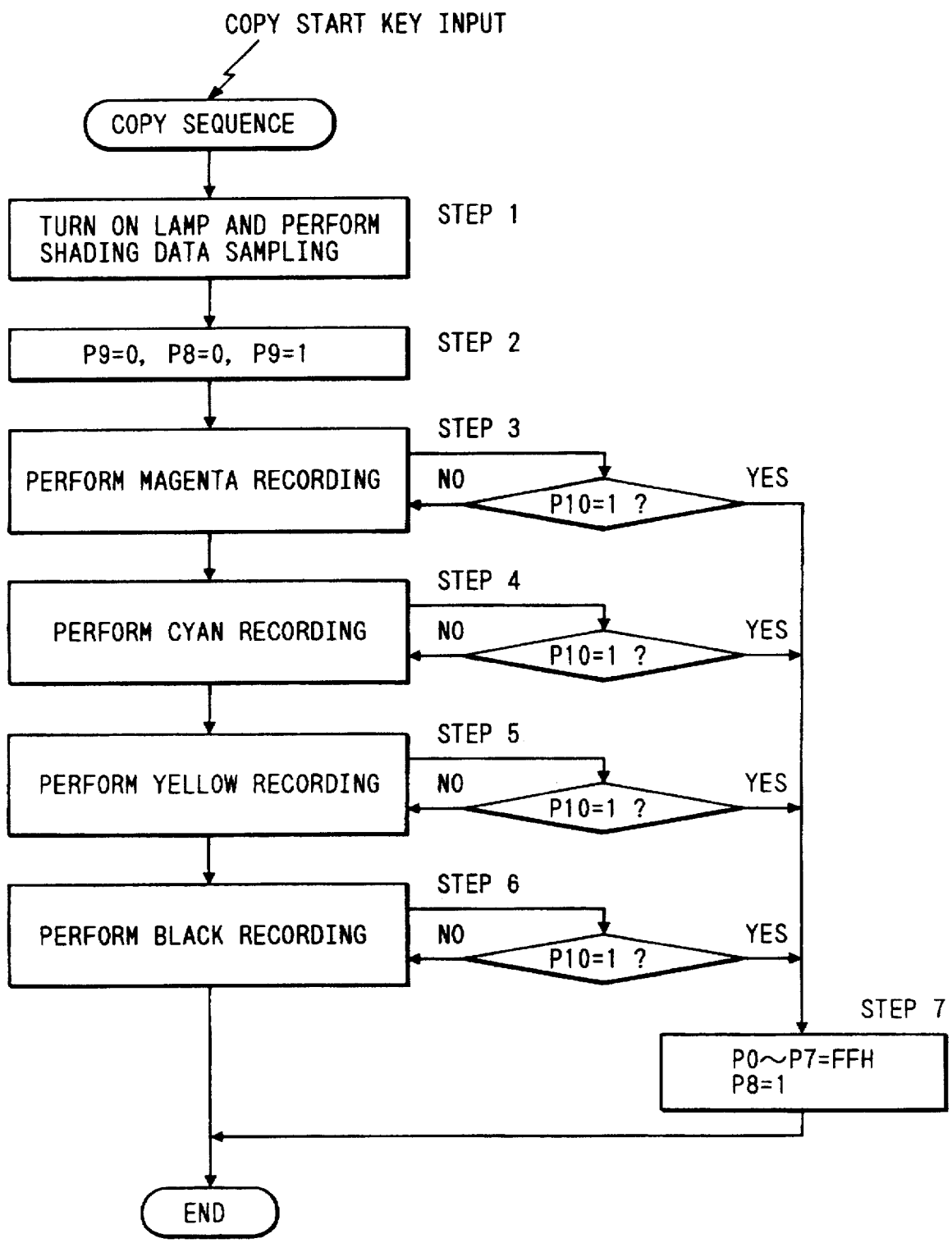
FIG. 46 is a control flow carried out by a central processing unit (CPU)

FIG. 46 is a control flow carried out by the CPU 3018 for a normal copying operation and a specific original discrimination pattern judging operation associated therewith.

When an operator put the original 204 on the platen 203 and initiates the copying operation through an operation unit (not shown), the CPU 3018 controls a motor (not shown) to move the reflection mirror 206 beneath the standard white plate 211.

The halogen lamp 205 is then turned on to illuminate the standard white plate 211. The shading correction units 3006 through 3009 sample the shading data for the IR, R, G and B signals (step 1).

Subsequently, the port output P is set into "0" to clear the output of the latch 3022 into "0" and, in turn, clear the P8 output into "0". An input A of the selector 3017 is selected such that the image signals masked and subjected to the undercolor removal (UCR) are supplied to the printer. The output P9 is set to "1" to stop the clear operation of the latch 3022 (step 2).

Next, the scanning operation is repeated four times as the printer unit 200 records four colors of M, C, Y and BK to complete one copy of the original. At the same time, presence of the identification mark is detected and the recording operation is controlled in accordance with the detection result.

The CPU 3018 sets, for recording magenta, processing conditions for magenta into the masking UCR processing unit 3016. Subsequently, the CPU operates the optical system to supply a signal indicating magenta to the printer 200. After completion of the scanning operation, the optical system is turned back to an initial position of scanning (step 3).

The CPU periodically reads the input signal supplied to the port 10 during the scanning operation to determine whether the input signal indicates "1". If the P10 is "1", outputs of P0 through P7 are set into FFH at step 7 based on the decision that the specific original is to be copied. In addition, an output of P8 is set into "1" to supply the printer 200 a set-solid signal of FFH, whereby prohibiting further copying operation to avoid counterfeit of the specific original.

Likewise, the recording control is also made for cyan, yellow and black through steps 4 to 6, during which the CPU periodically checks the P10. If the P10 is "1" the CPU supplies the set-solid FFH data to the printer 200 at step 7.

For example, when P10=1 is detected during cyan recording, only magenta is recorded through a normal or proper copying operation. The remainders, cyan, yellow and black are recorded as solid of FFH (i.e., painted all over in a single color).

<Sixth Embodiment>

Figure 38A:
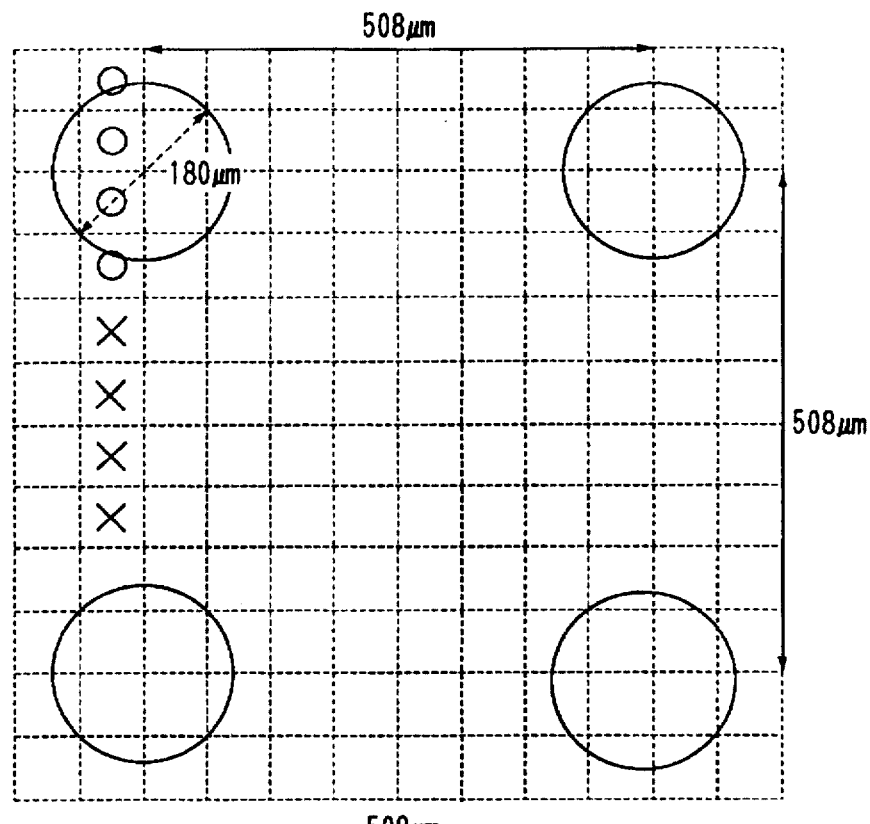
FIGS. 38A and 38B are views showing specific patterns according to a sixth embodiment of the present invention.
Figure 38B:
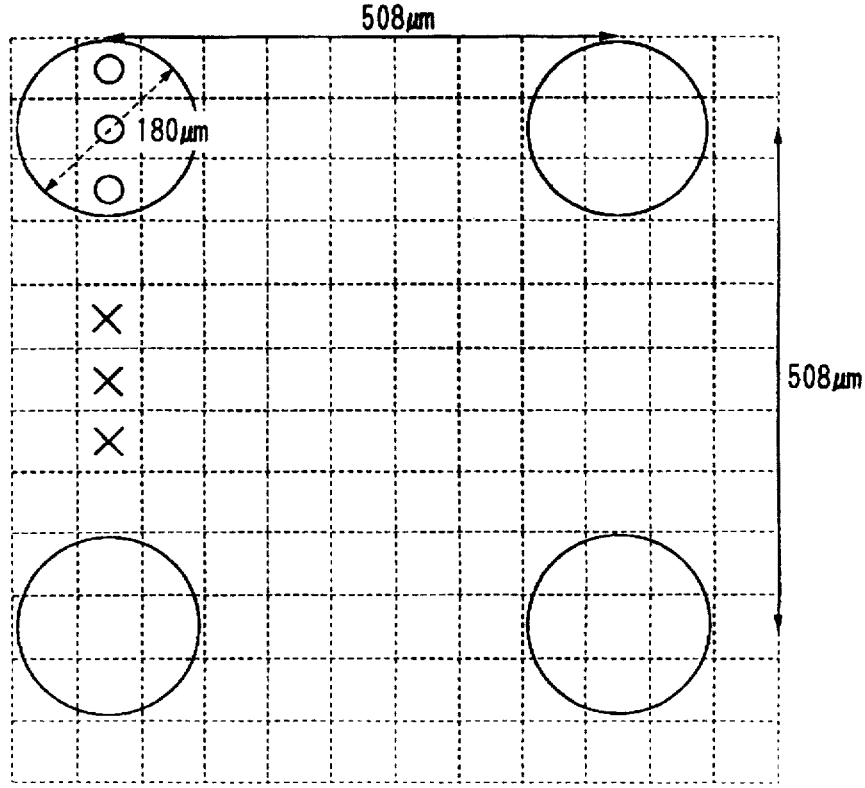
Figure 39:
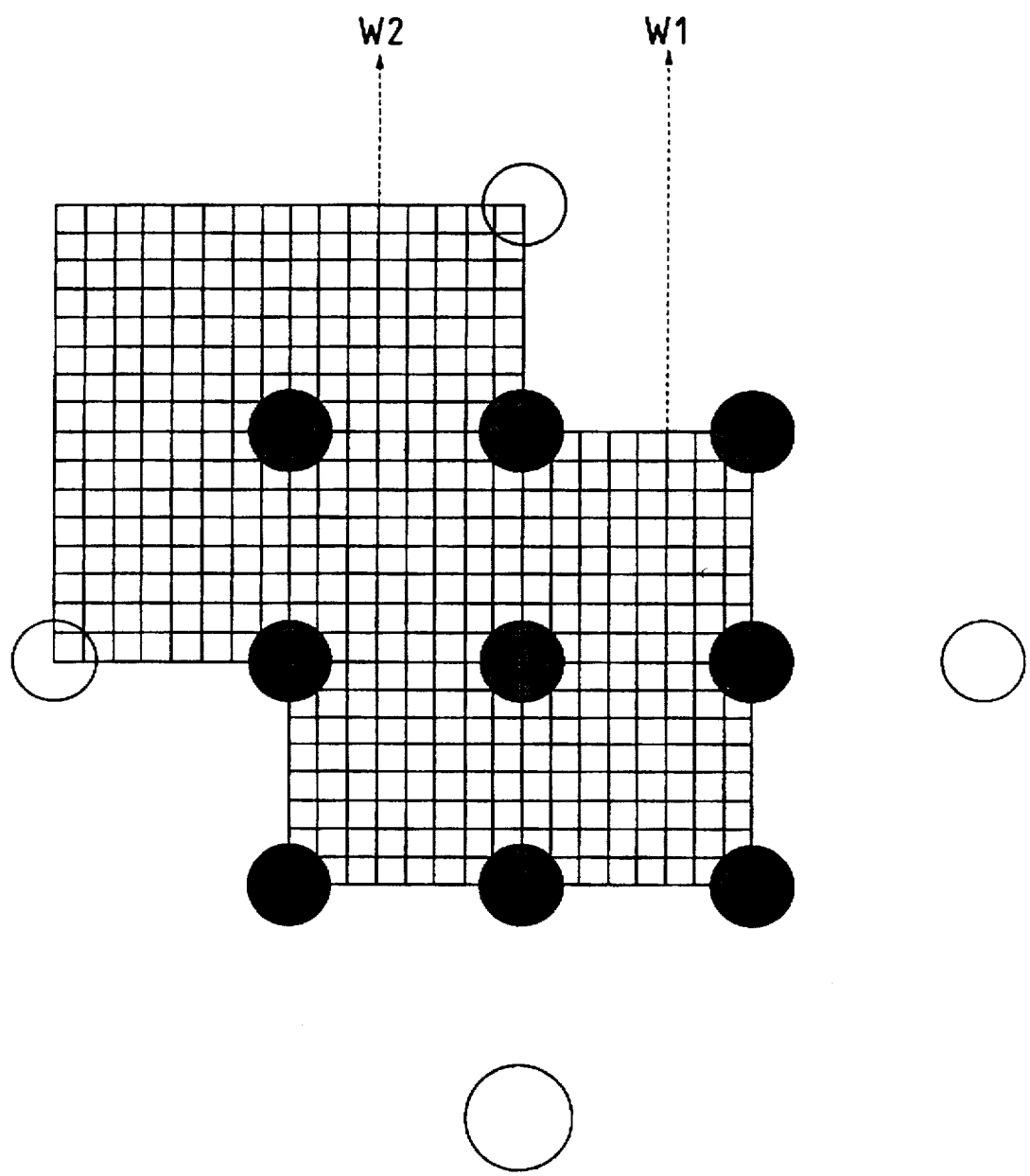
FIG. 39 is a view showing specific patterns according to the sixth embodiment.
Figure 40:
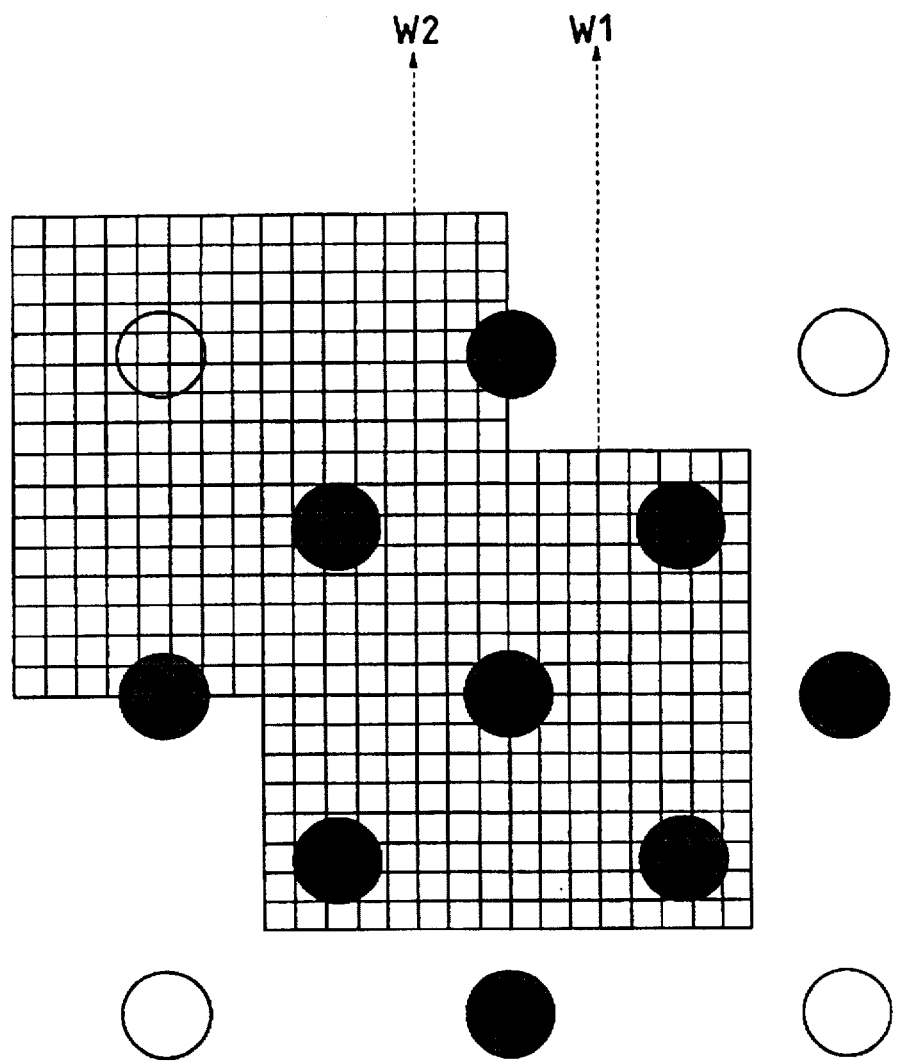
FIG. 40 corresponds to FIG. 39 except that the array of patterns is rotated by 45° relative to the original.

In the sixth embodiment, each pattern is approximately 180 μm in diameter as shown in FIG. 38A. This pattern is a circle circumscribing a square of 2 by 2 pixels. Four pixels at maximum are enclosed in the pattern regardless of the orientation of the window relative to the original. In addition, as apparent from FIG. 38B, at least one pixel is contained in the pattern regardless of the phase relation between the window and the original. The pattern is associated with four pixels at maximum, so that a distance between two adjacent patterns is set to be equal to 508 μm. In this way, it is ensured to detect the infrared absorbing pattern positively. In this event, 16-by-16 window prepared as the density detection window allows application of the density standard that is similar to the one described in the fifth embodiment. In this event, it is sufficient to use sixteen DFFs corresponding to the DFFs 701 through 707, sixteen FIFOs corresponding to the FIFOs 721 through 727, and a clock for sixteen cycles of the pixel clock in place of the CLK 8.

FIGS. 39, 40, 36 and 37 illustrate diagrammatic representation of the density detection. The window W2 having the lowest density contains the 9/4 (or 13/4) patterns. Accordingly, at least nine (or 11) patterns are detected in FIG. 39 while at least four (or five) patterns are detected in FIG. 40.

<Seventh Embodiment>

In the fifth and sixth embodiments, the minimum value is checked by the comparator 742 in the density detection unit shown in FIG. 34. However, as apparent from the above, the patterns arranged according to a predetermined rule can be discriminated from others in a more positive manner by means of limiting the maximum detection number.

Figure 41:
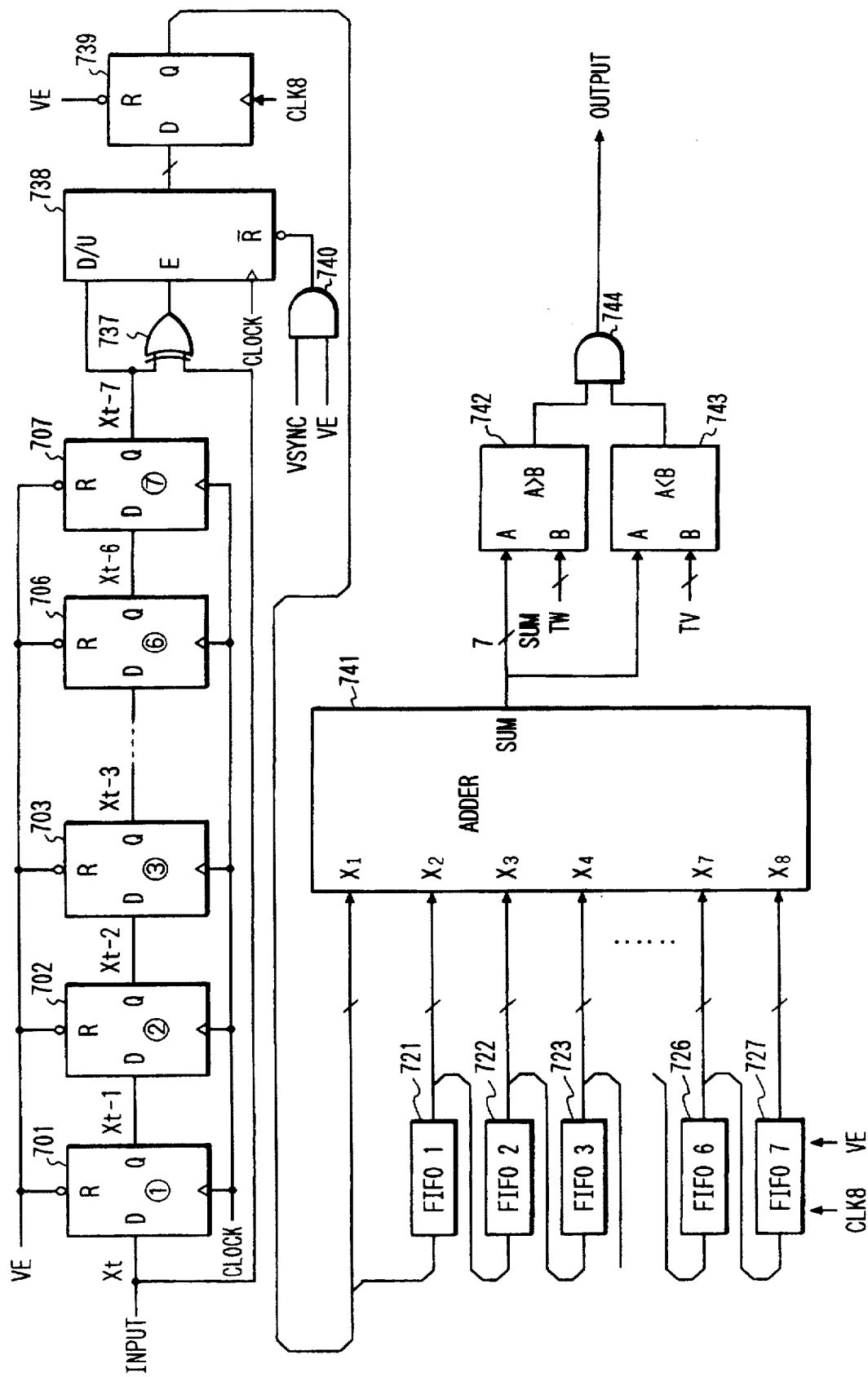
FIG. 41 is a block diagram corresponding to FIG. 34 except that the limitation to the maximum density is made.

FIG. 41 is a block diagram corresponding to FIG. 34 except that the limitation to the maximum density is made. More particularly, the density detection unit comprises an comparator 743 and an AND gate 744 along with the components shown in FIG. 34. The output SUM of the adder 741 is compared with comparative values TV and TW which are predetermined by the CPU 3018. Determination of the original as the specific one is made when the SUM is larger than the TW but is smaller than the TV. For the example shown in FIGS. 39 and 40, the values of TV and TW are equal to seventeen and four, respectively.

<Eighth Embodiment>

Figure 42:
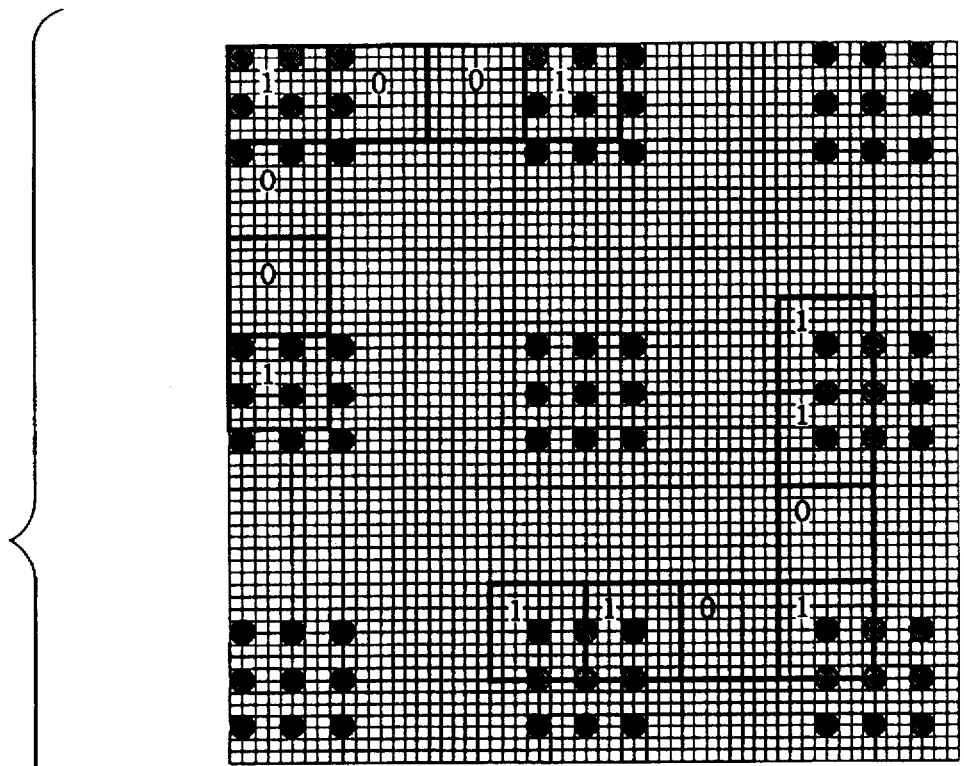
FIG. 42 is a view showing an array of patterns on the original according to an eighth embodiment.

FIG. 42 is a view showing an array of patterns on the original according to the eighth embodiment. By means of arranging the pattern arrays having the predetermined density (such as three-by-three arrays) into a coarse array as shown in FIG. 42, it is possible to ensure the determination of the specific original in a more positive manner. In the example shown in FIG. 42, the three-by-three arrays are arranged into a matrix at every twenty four pixels. For example, a square area having the sides of 4 mm permits printing of the nine three-by-three arrays, three for each row and column. The regularity as shown in the figure can be provided for the judgment result on the specific pattern of the type described in the window of 8×8. A difference between "1001001" and "1101101" is caused due to the phase of the window relative to the original. However, it is possible to prepare a plurality of rules (regular designs) considering the phase by means of determining the pattern arrangement previously. As a result, the specific original can be detected by means of carrying out pattern matching again in the window of 8×8 on the judgment results obtained in the density detection window of 8×8. Likewise, it is possible to perform matching with the rules considering any orientations of the window relative to the original.

Figure 43:
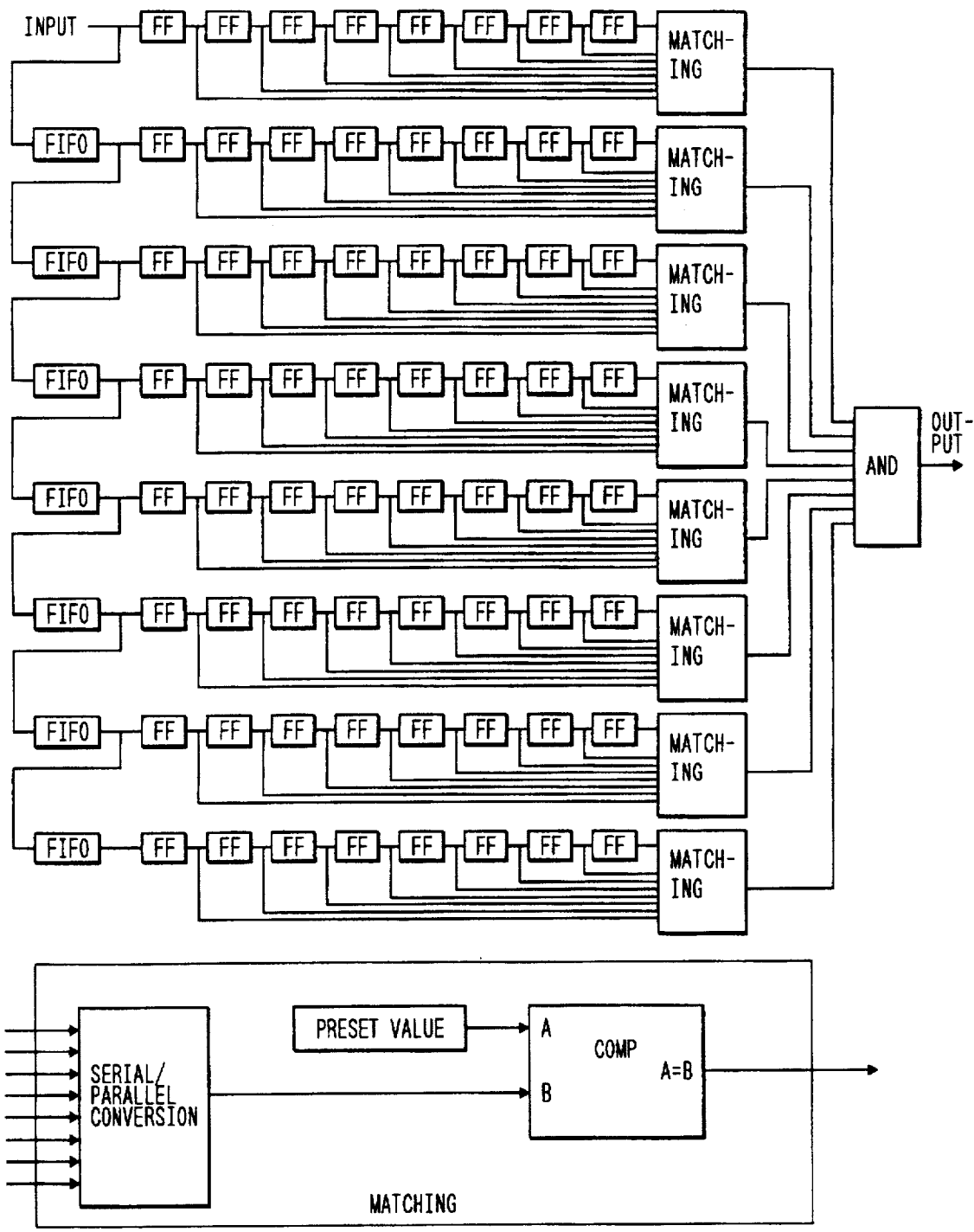
FIG. 43 is a block diagram showing a pattern matching unit for carrying out the pattern matching operation.

FIG. 43 is a block diagram showing a pattern matching unit for carrying out the pattern matching operation. The last output obtained in FIG. 34 or 41 is used as an input to the pattern matching unit shown in FIG. 43. The pattern matching unit comprises FIFOs that serve as the image data line delay units. The address pointer of each FIFO is initialized by the line synchronization signal HSYNC 8 of 8 line cycles of the line synchronization signal SYNC. The image data line delay units write and read data for every pixel as a unit in response to the synchronization signal CLK 8 generated at eight clock cycles of the image clock CLOCK. An FF represents a flip-flop that operates in synchronism with the CLK 8. Each matching unit is supplied with eight judgment signals in the main scan direction. These signals are subjected to serial-to-parallel conversion. The converted signal is then compared with a data set by the CPU in a preset value register. When the converted data is equal to the preset data, an output of "1" is produced. An AND gate produces an output of "1" only when all matching results indicate "1". The output of the AND gate corresponds to the final judgment result shown in FIG. 32. If the pattern matching is made with a plurality of patterns, the desired number of sets (eight matching units are considered as one set) of matching units may be provided. In addition, a way of the pattern matching is not limited to the illustrative example. For the example shown in FIG. 42, the preset value register is provided with a first set of matching units where [92HEX, 00HEX, 0HEX, 92HEX, 00HEX, 00HEX, 92HEX and 00HEX] is set and a second set of matching units where [DBHEX, DBHEX, 00HEX, DBHEX, DBHEX, 00HEX, DBHEX and DBHEX] is set.

<Ninth Embodiment>

Figure 44:
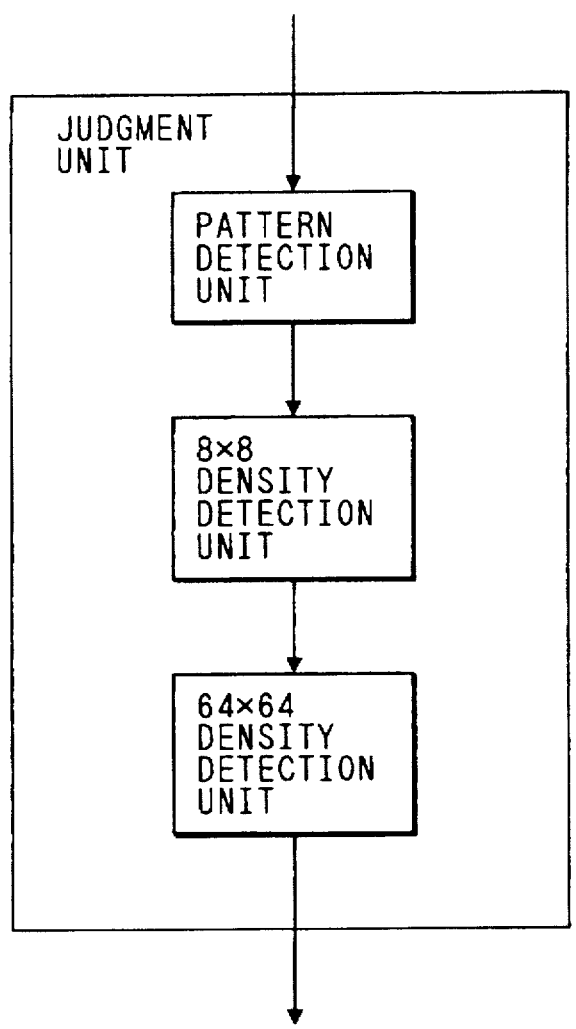
FIG. 44 is a schematical block diagram showing the judgment unit 12 according to a ninth embodiment of the present invention.
Figure 45:
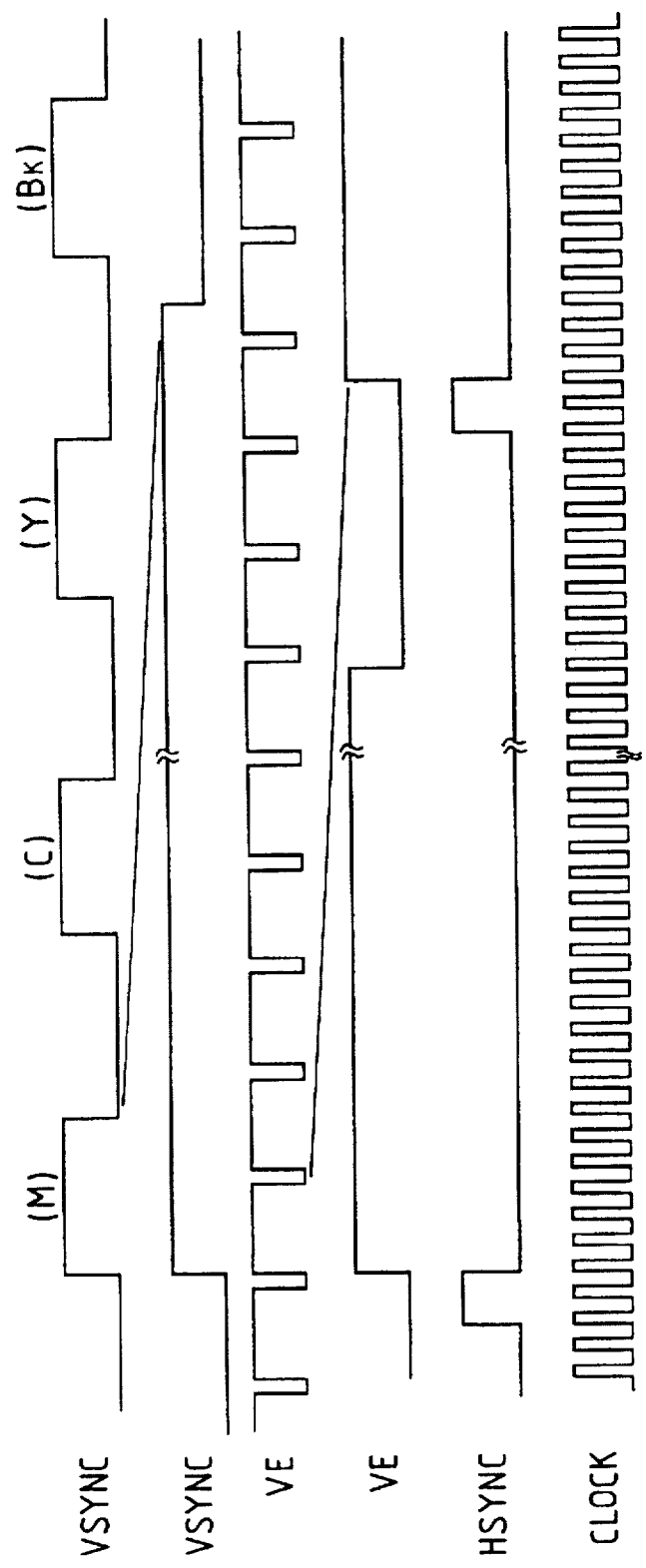
FIG. 45 is a timing chart of image control signals.

In the ninth embodiment, the judgment unit 12 shown in FIG. 32 comprises, as shown in FIG. 44, a 64-by-64 density detection unit connected to the 8-by-8 density detection unit (FIG. 34 or 42) that is connected to the pattern detection unit (FIG. 35). The 64-by-64 density detection unit sums the outputs of the 8-by-8 density detection unit by 8×8 times. In other words, the 64-by-64 density detection unit sums the 8×8 numbers of "0" or "1" obtained from the 64×64 pixels. The 64-by-64 density detection unit is similar in structure to the 8-by-8 density detection unit shown in FIG. 34 except that the cycle of the synchronization signal. Accordingly, detailed description of the 64-by-64 density detection unit will be omitted. The 64-by-64 density detection unit operates in response to the synchronization signal HSYNC 8 of eight line cycles, the synchronization signal CLK 8 of eight pixel cycles, and the synchronization signal CLK 64 of sixty-four pixel cycles.

In the embodiment shown in FIG. 42, it becomes possible to discriminate the specific original from others without relying upon the phase of the original and the window when the value used for comparison with the added value is set to be equal to eight. In addition, a comparative value considering the orientation of the window relative to the original may be predetermined easily.

<Modification>

While the above mentioned embodiments have thus been described in conjunction with operations carried out in the color copying machine, the present invention can equally be applied to any other apparatus having an image reading device such as a facsimile and a scanner.

In addition, while the above mentioned embodiments have applied to detect the specific pattern for discriminating the specific original, the present invention is not limited to those illustrative embodiments. One of the feature of the present invention is to detect the density, and thus the shape of the infrared absorbing mark is not limited to a circle. In addition, the arrangement of the marks is not limited to the matrix or array described above. The patterns may be formed in any shape and arranged in any suitable orientation.

As mentioned above, according to the above mentioned embodiments, the specific original can be discriminated from others by means of providing an arrangement for detecting the mark printed with the invisible ink such as the infrared absorbing transparent ink.

<Tenth Embodiment>

An outer configuration, sensor construction and operation of the tenth embodiment are similar to those described in the first embodiment.

In place of the glass plate 210-5, the infrared-cutoff filter 210-11 may be provided on the surface facing to the sensors of a cover glass 210-13 as shown in FIG. 14. In this event, a ceramic package 210-12 of the CCD sensor should be so formed that a distance d is sufficiently short between the sensor surface and the inner surface of the cover glass. In this way, it is ensured that the infrared-cutoff filter 210-11 formed on the inner surface of the cover glass less affects on the infrared radiation.

The signal flow is also similar to those described in conjunction with FIGS. 27A and 27B.

An image pattern (discrimination mark) to be detected in the tenth embodiment is described with reference to FIG. 47.

Figure 47:
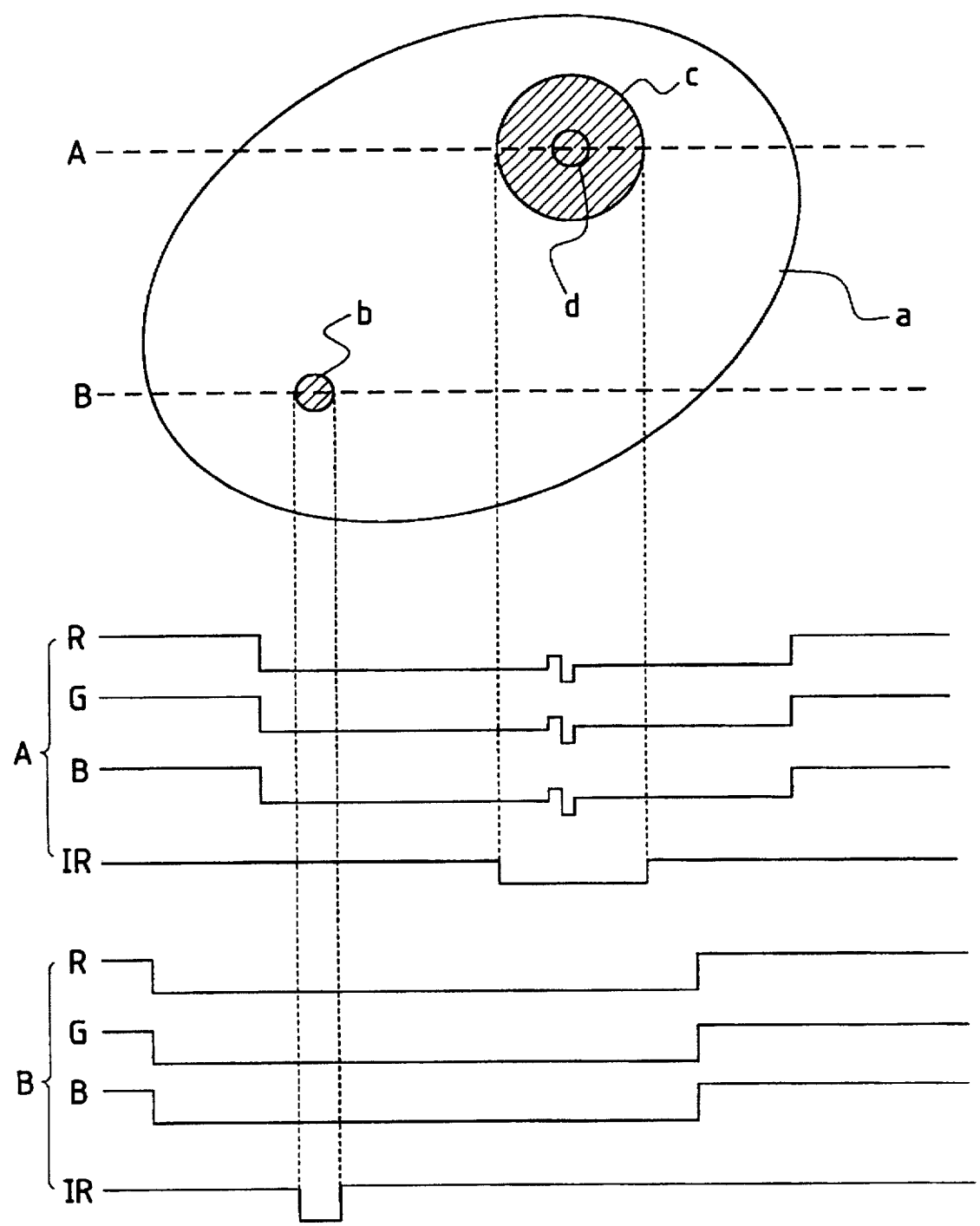
FIG. 47 is a view showing a specific original discrimination pattern to be detected according to a tenth embodiment of the present invention.

In FIG. 47, a specific pattern is provided on an original as the specific original. In the figure, a region a is filled with a single ink. This ink absorbs the light having the wavelengths other than those corresponding to the infrared spectrum. Patterns b and c are printed with the transparent ink having the infrared absorbing characteristic as shown in FIG. 21. Only the color of the region a is visible to the human eyes.

In addition, a region d is printed with an ink having such concentration that the visible signals are varied in the small region with the concentration relative to the periphery maintained.

Timing charts A and B represent the output signals of the CCD sensor 210 at positions indicated by dotted lines A and B, respectively. The region c provides the IR output in the lower level due to the presence of the infrared absorbing ink. As apparent from the RGB outputs of the timing chart A, the region d is different from the region a by the concentration of α. However, this region d is under the cover of the region a to the human eyes.

This means that the visible signals within the region vary while the infrared signal in the same region is not changed.

The timing chart B is for the signals obtained at the position indicated by the dotted line B. This timing chart indicates that the position B provides the intact visual signal sand the changing infrared signal.

The pattern(s) and design thereof are not limited to those described in the illustrative embodiments.

The discrimination unit 3 shown in FIG. 27A is similar in structure to the one describe in the fifth embodiment.

The orientations of four pixels A, B, C and D relative to the remark pixel X are as indicated in FIG. 33.

If the remark pixel X corresponds to the pattern printed with the ink b in FIG. 47, then the peripheral pixels A, B, C and D correspond to the pattern a of the background.

Now, described is a judgment algorithm carried out by the judgment unit 12 of this embodiment.

Let the R, G, B and IR components of the reading signal composing the pixel signal A be $A_R$, $A_G$, $A_B$ and $A_{IR}$, respectively, and the components are defined for the B, C and D pixel signals, then average values $Y_R$, $Y_G$, $Y_B$ and $Y_{IR}$ of the reading signals of the corresponding color components R, G, B and IR in each of the pixel signals B, C and D are given as follows:

$$Y_R = (1/4) \cdot (A_R + B_R + C_R + D_R),$$

$$Y_G = (1/4) \cdot (A_G + B_G + C_R + D_G),$$

$$Y_B = (1/4) \cdot (A_B + B_B + C_R + D_B),$$

and $$Y_{IR} = (1/4) \cdot (A_{IR} + B_{IR} + C_{IR} + D_{IR}),$$

Judgment of the target pattern is made according to the difference between the remark pixel X and the average value Y obtained from the above equation.

More specifically, let the R, G, B and IR components of X be $X_R$, $X_G$, $X_B$ and $X_{IR}$, then $$\Delta R = |Y_R - X_R|,$$

$$\Delta G = |Y_G - X_G|,$$

$$\Delta B = |Y_B - X_B|,$$

and $$\Delta IR = |Y_{IR} - X_{IR}|.$$

In this event, the original is judged as the specific original when the following equations are satisfied:

$$\Delta R < K$$

and $$\Delta G < K$$

and $$\Delta B < K$$

and $$\Delta(\Delta IR > L1 \text{ or } Y_{IR}/X_{IR} > L2),$$

where K, L1 and L2 are constants.

More specifically, the pattern is judged to be present when the difference in tint is small (smaller than K) between the remark pixel X and any one of the peripheral portions A, B, C and D in the visible region; when the difference is equal to or larger than the constant L1 in the infrared region; and when the ratio of the level of the remark pixel X to that of the peripheries is equal to or larger than the constant L2 in the infrared region.

In this event, the ratio is taken into consideration along with the difference in judging the infrared region in view of the reduction of the signal level of the infrared signal due to dirt on the original. In this embodiment, any affects of the dirt are eliminated by means of detecting the ratio, provided that the infrared reading signal is entirely attenuated due to the dirt.

Figure 48:
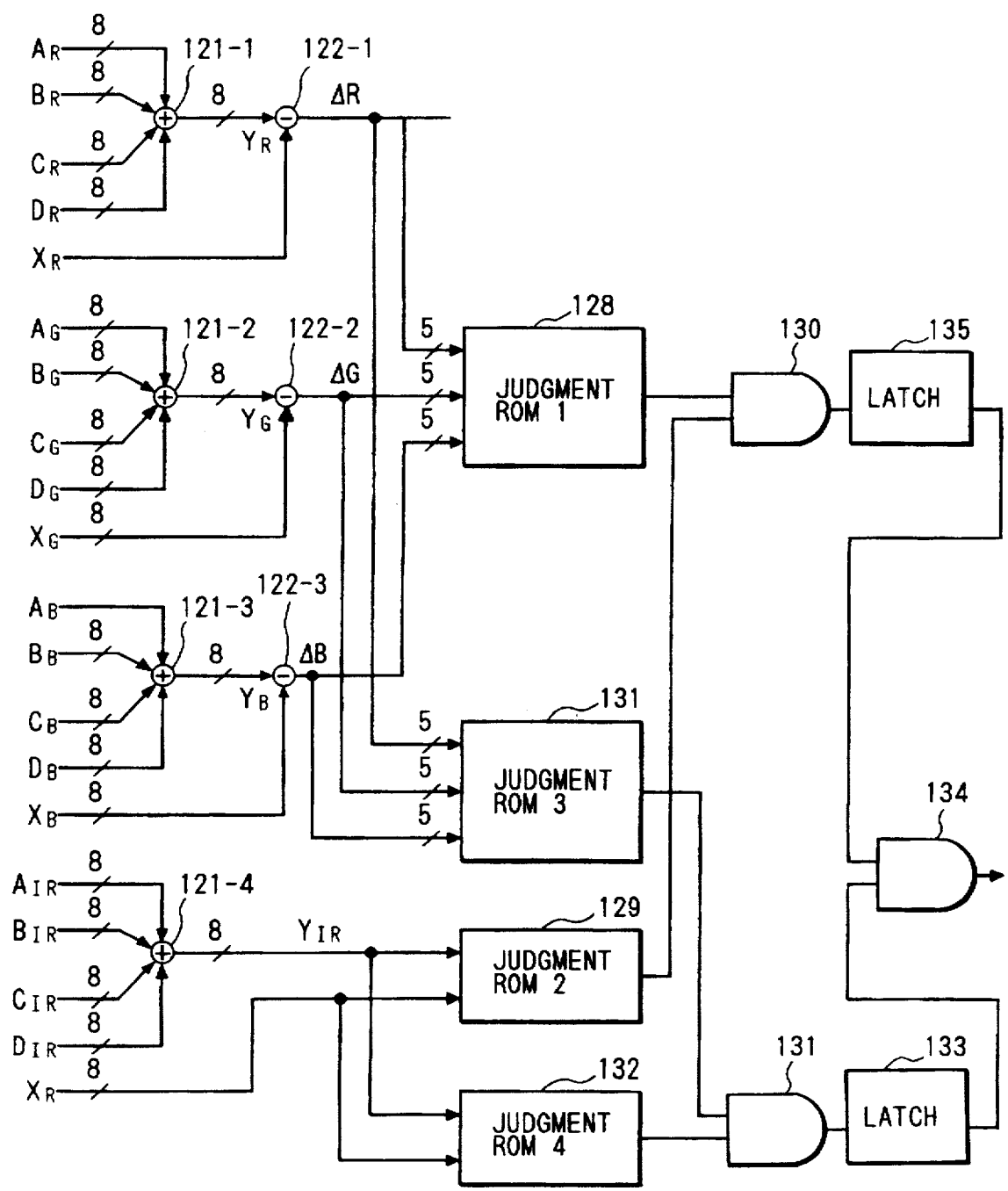
FIG. 48 is a block diagram showing a structure of a pattern detection unit in the tenth embodiment.

FIG. 48 shows the structure of the judgment unit 12 with which the above mentioned algorithm is carried out. An adder 121 merely adds the color components of four pixels and produces the eight high-order bits of the sum to obtain $Y_R$, $Y_G$, $Y_B$ and $Y_{IR}$. A subtractor 122 calculates a difference between the output of the adder 121 and corresponding component of the remark pixel signal to obtain ΔR, ΔG and ΔB components. The subtractor 122 supplies five high-order bits of the subtraction results to a judgment LUT 128 consisting of ROMs. The LUT 128 produces "1" when each of the ΔR, ΔG and ΔB components is smaller than a constant K.

Likewise, for the infrared reading signal, $Y_{IR}$ and $X_{IR}$ of eight bits each are supplied to address terminals of a judgment LUT 129 consisting of ROMs. The LUT 129 produces "1" when the above mentioned judgment result holds, that is, ΔIR>L1 or $Y_{IR}/X_{IR}$>L2 holds in the calculation of AIR=$Y_{IR}$-$X_{IR}$.

The outputs of the LUTs are supplied to an AND gate 130 to obtain a logical product thereof. An output of the AND gate 130 indicating "1" corresponds to the condition where presence of the specific pattern is detected. The resultant information is supplied to a latch 135 and latched there.

This corresponds to a case where the infrared signal is changed during the visible signals are kept constant, as indicated by the dotted line B in FIG. 47.

On the other hand, a judgment ROM 3 of 131 (LUT 131) is provided with ΔR, ΔG and ΔB components and produces "1" when each of them is larger than a constant M.

Likewise, for the infrared reading signal, $Y_{IR}$ and $X_{IR}$ are supplied to a judgment ROM 4 of 132 (LUT 132). The LUT 132 produces "1" when the above mentioned judgment result holds, that is, ΔIR is smaller than a constant N1 and within a range of N2<$X_{IR}$<N3 in the calculation of ΔIR= $Y_{IR-XIR}$. The output of the LUTs 131 and 132 are supplied to an AND circuit. The AND product is then supplied to a latch 133 where it is latched.

This corresponds to a case where the visible signals are changed during the infrared signal is kept constant, as indicated by the dotted line A in FIG. 47.

As mentioned above, the latches 132 and 133 produce the outputs "1" when the conditions as described in conjunction with the dotted lines A and B are held, which makes the AND gate 134 produce "1" as the output. These latch outputs are reset at a port (not shown) by the CPU 3018 for the subsequent discrimination operation.

The judgment result is supplied to the latch 3022 in FIG. 27B. An output of the latch 3022 is supplied to the input port P10 of the CPU 3018. The CPU 3018 confirms that the specific mark is detected. The CPU 3018 clears the latch 3022 by the output port P9 signal before initiation of a copy sequence. The CPU 3018 is thus ready for the subsequent pattern detection.

A normal copying operation and an identification mark judging operation accompanying thereto carried out by the CPU 3018 according to this embodiment are similar to those already described in conjunction with FIG. 29. Accordingly, description thereof is omitted to avoid redundancy of the explanation.

<Eleventh Embodiment>

Figure 50A:
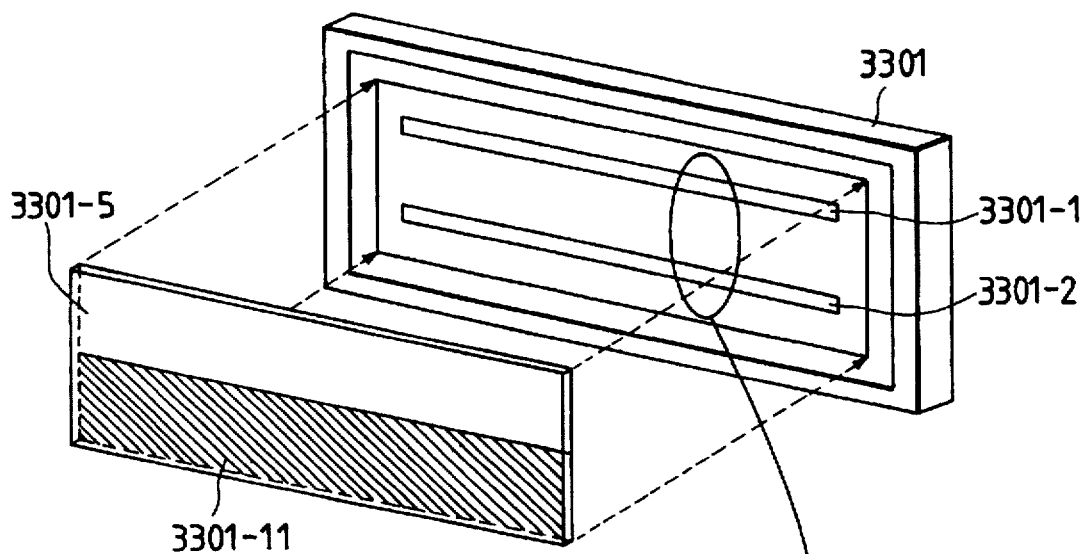
FIGS. 50A and 50B are views showing a structure of an image reading apparatus according to an eleventh embodiment of the present invention.
Figure 50B:
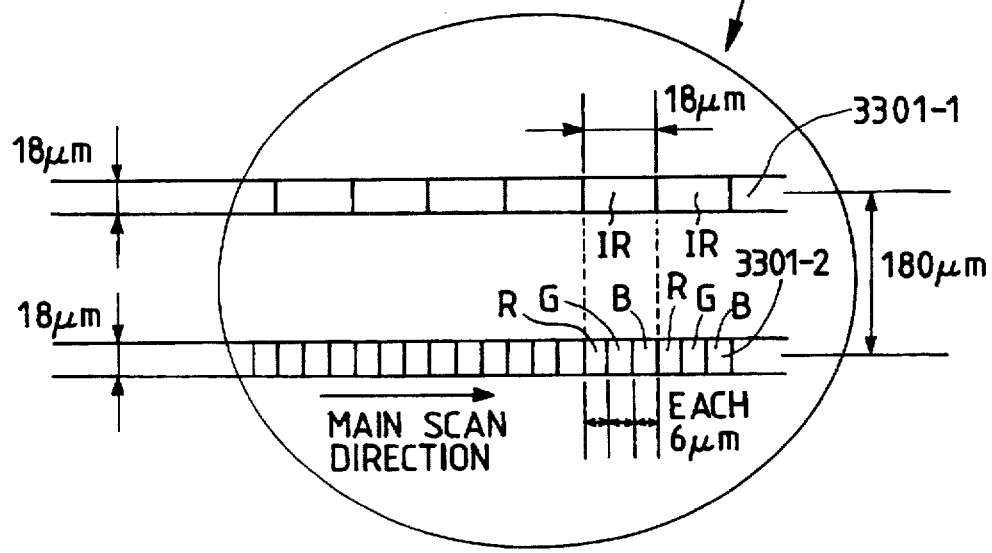

FIGS. 50A and 50B illustrate an image reading apparatus according to an eleventh embodiment of the present invention.

The CCD comprises two line sensors arranged monolithically on a single silicon chip as shown in FIG. 50A.

In this embodiment, a line sensor 3301-1 is a sensor sensitive to an infrared radiation (IR sensor) while a line sensor 3301-2 is a full-color sensor where R, G and B sensors are alternatively arranged for every one pixel as a unit.

As in FIGS. 19A and 19B, provided over the sensors is a glass plate 3301-5 provided with a dichroic filter 3301-11 formed of a deposition film.

The dichroic filter 3301-11 has the infrared cutoff characteristic as shown in FIG. 23.

In this event, the glass plate 210-5 is adhered to the surface of the chip with the deposited region facing to the sensors as in the case described referring to FIGS. 19A and 19B. In addition, the end of the deposited region is located between the line sensors 3301-1 and 3301-2.

FIG. 50B is an enlarged illustration of the line sensors 3301-1 and 3301-2. Each IR sensor is 18 µm in length and width for every one pixel on which the R and B filters having the characteristic shown in FIG. 22 are formed. This sensor is similar to the IR sensors of the line sensor 210-1. More particularly, the line sensor 3301-1 has the infrared transmitting characteristic.

The infrared reading function similar to the one obtained in the tenth embodiment can be achieved with a combination of the line sensor 3301-1 and an infrared-cutoff filter having the characteristic shown in FIG. 24 (provided in a focusing optical system which is not shown and is similar to the optical system in the tenth embodiment).

The line sensor 3301-2 is an alignment of R, G and B sensors. The line sensor 3301-2 is away from the line sensor 3301-1 at a distance equal to 180 µm (corresponding to ten lines). The IR sensor for one pixel has 18 µm in width and length while each of these R, G and B sensors for one pixel has 6 µm in width and length. The R, G and B sensors are provided with color separating filters, respectively, having the characteristics shown in FIG. 22.

The line sensor 3301-1 comprises five thousand IR sensors aligned along the main scan direction to read the an A3 original at a resolution of 400 dpi. Likewise, the line sensor 3301-2 comprises five thousand combinations of R, G and B sensors.

In addition, the zoom rate of the optical system is 18.5/63.5 to project the portion of 63.5 µm (corresponding to one pixel at the resolution of 400 dpi) of the original into 18.5 µm.

<Twelfth Embodiment>

Figure 51A:
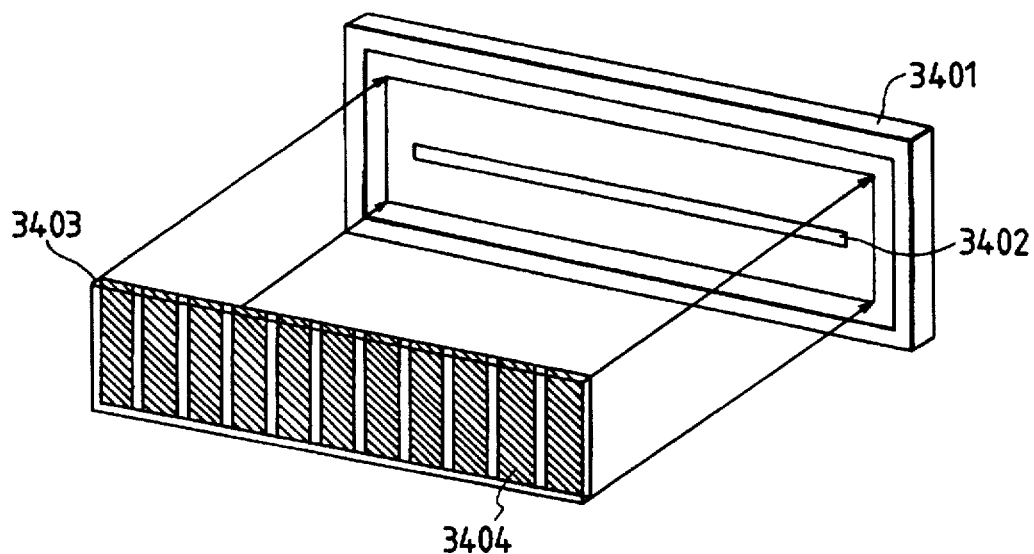
FIGS. 51A and 51B are views showing a structure of an image reading apparatus according to a twelfth embodiment of the present invention.
Figure 51B:
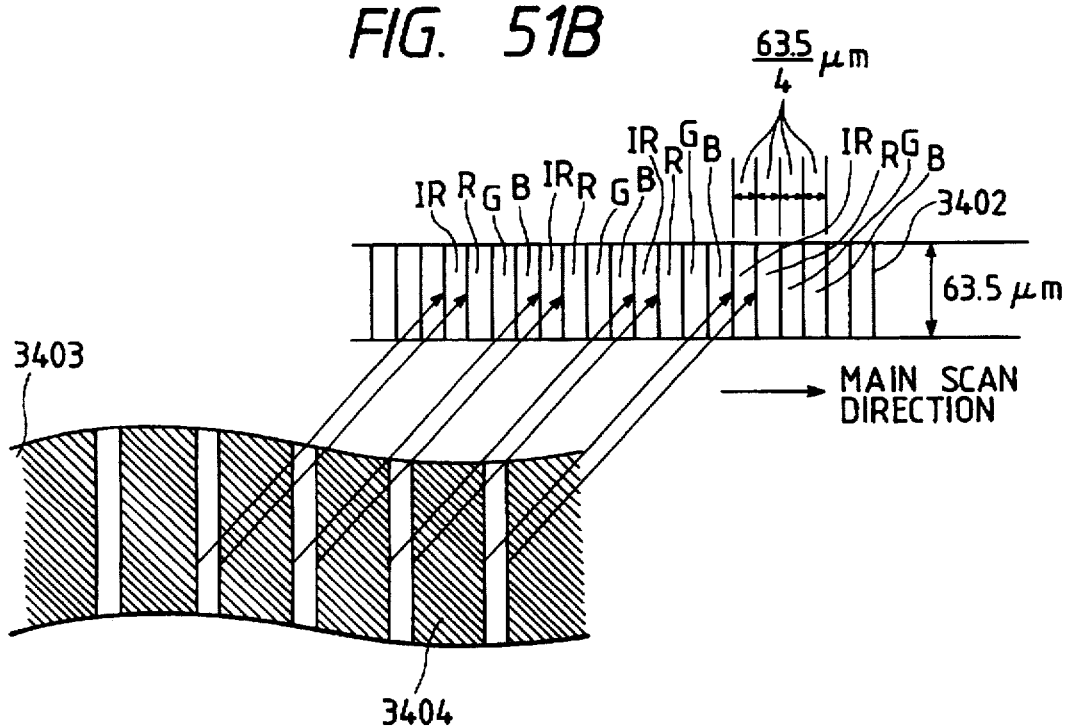
Figure 52:
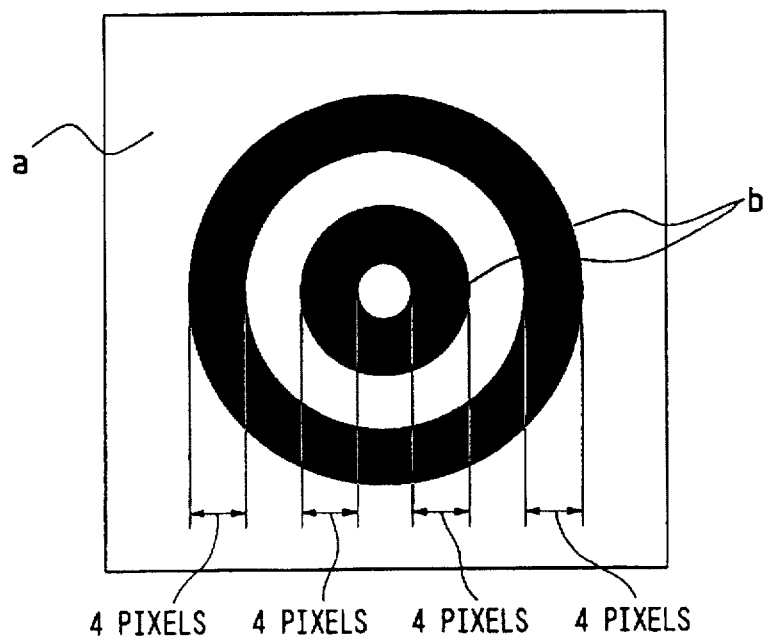
FIG. 52 is a view showing an exemplified specific original discrimination pattern in accordance with a thirteenth embodiment of the present invention.

FIGS. 51A and 51B illustrate an image reading apparatus according to a twelfth embodiment of the present invention.

A CCD 3401 comprises, as shown in FIG. 51A, sensors 3402 formed of R, G, B and IR pixels aligned in series. An image data for one pixel is read by means of separating the colors (wavelengths) with a combination of IR, R, G and B sensors.

A size of each of the IR, R, G and B pixels is 63.5/4 µm in the main scan direction. A combination of IR, R, G and B is thus equal to 63.5 µm to read each pixel.

The zoom rate of the optical system is equal to one to project the portion of 63.5 µm (corresponding to one pixel at the resolution of 400 dpi) of the original as the projected pixel of 63.5 µm. On each IR sensor, the R and B filters having the characteristic shown in FIG. 22 are formed. This sensor is similar to the IR sensors of the line sensor 210-1. More particularly, the line sensor has the infrared transmitting characteristic.

The infrared reading function similar to the one obtained in the tenth embodiment can be achieved with a combination of the line sensor and an infrared-cutoff filter having the characteristic shown in FIG. 24.

As shown in FIG. 51A, provided over the sensors is a glass plate 3403 provided with a dichroic filter 3404-11 formed of a deposition film at a pitch of 63.5 µm and in a width of 63.5 µm.

The dichroic filter 3404-11 has the infrared cutoff characteristic as shown in FIG. 23.

In this event, the glass plate 3403 is adhered to the surface of the chip with the deposited region facing to the sensors as in the case described referring to FIGS. 19A and 19B. The portion of the glass plate not being deposited faces to the IR pixels as shown in FIGS. 51A and 51B.

<Modification>

While the twelfth embodiment has thus been described in conjunction with the line sensor comprising the IR, R, G and B sensors aligned in the main scan direction for reading a pixel, these sensors may be arranged in a two-dimensional array and the glass plate is provided with the dichroic mirror only at the positions corresponding to the R, G and B sensors.

In addition, while the above embodiments have thus been described in conjunction with the infrared cutoff-filter attached to the sensors, the sensor is not limited to the one having the sensitivity to the infrared radiation. It is also expected that an equivalent effect can be achieved by using a filter having an ultraviolet-cutoff characteristic.

As mentioned above, the present invention has an effect that the specific original can be discriminated from others with a high accuracy by means of providing a first detection arrangement comprising a unit for detecting the constancy of the visible signals being read for a given region and a unit for detecting the change of the invisible signal being red for the same given region; and a second detection arrangement comprising a unit for detecting the constancy of the invisible signal and a unit for detecting the change of the visible signals.

The above mentioned embodiments allow discrimination of the specific original with a high accuracy.

<Thirteenth Embodiment>

FIG. 3 is a view showing an exemplified specific original discrimination pattern in accordance with a thirteenth embodiment of the present invention.

The patterns b are printed concentrically on a background a in this embodiment. As shown in FIG. 22, the patterns b are invisible to the human eyes but can be detected readily by the apparatus in the infrared region. The patterns concentrically printed is symmetrical when the original is rotated or so on. Thus, these patterns can be discriminated in any directions. For example, the original may be placed on the platen of the copying machine in any direction. In this thirteenth embodiment, the patterns are determined by using data for several lines passing through near the center of the patterns. As an example, the patterns b have line width of approximately 150 μm, which corresponds to four pixels when being scanned at the resolution of 400 dpi. It is noted that the patterns b are not limited to the illustrative examples.

Figure 53:
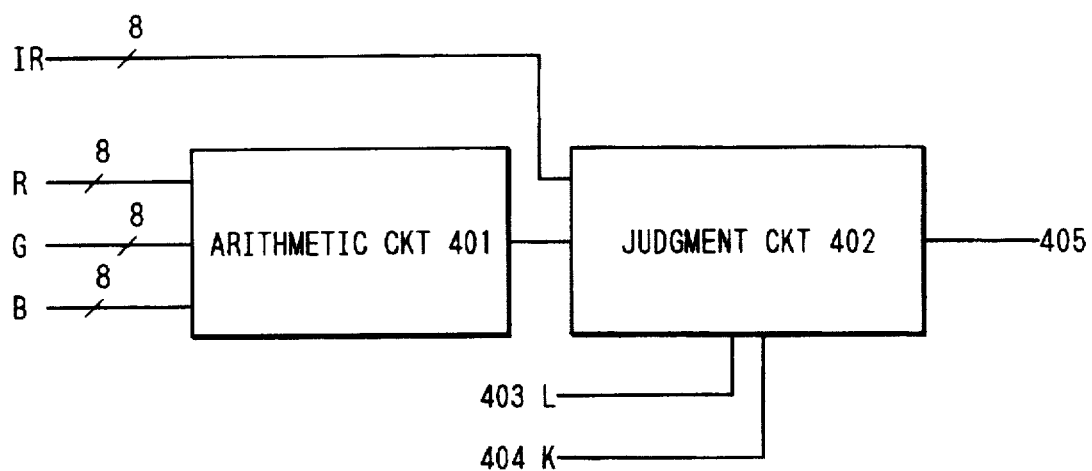
FIG. 53 is a block diagram illustrating a discrimination unit 3 according to the thirteenth embodiment.

The discrimination unit 3 in FIG. 27A according to this embodiment is described in detail. In FIG. 53, the discrimination unit 3 comprises an arithmetic circuit 401 and a judgment circuit 402. Each of IR, R, G and B represents a read signal of eight bits supplied to the discrimination unit 3. Of these, the R, G, B signals are supplied to the arithmetic circuit 401. The arithmetic circuit 401 calculates an average S of these signals, namely:

$$S=(R+G+B)/3.$$

The judgment circuit 402 is provided with a result A obtained by the arithmetic circuit 401, the IR signal and constants K and L. The judgment circuit 402 supplies an output signal of HIGH level to an output line BIN__IR 405 when $$IR/S>L \text{ and,}$$

$$IR>K,$$

and otherwise, it produces the output signal of LOW level. With this, the input data is converted into a binary form to detect the presence of the patterns b printed with the above mentioned transparent ink. In this event, the ratio is taken into consideration along with the difference in judging the infrared region in view of the reduction of the signal level of the infrared signal due to dirt on the original.

Figure 54:
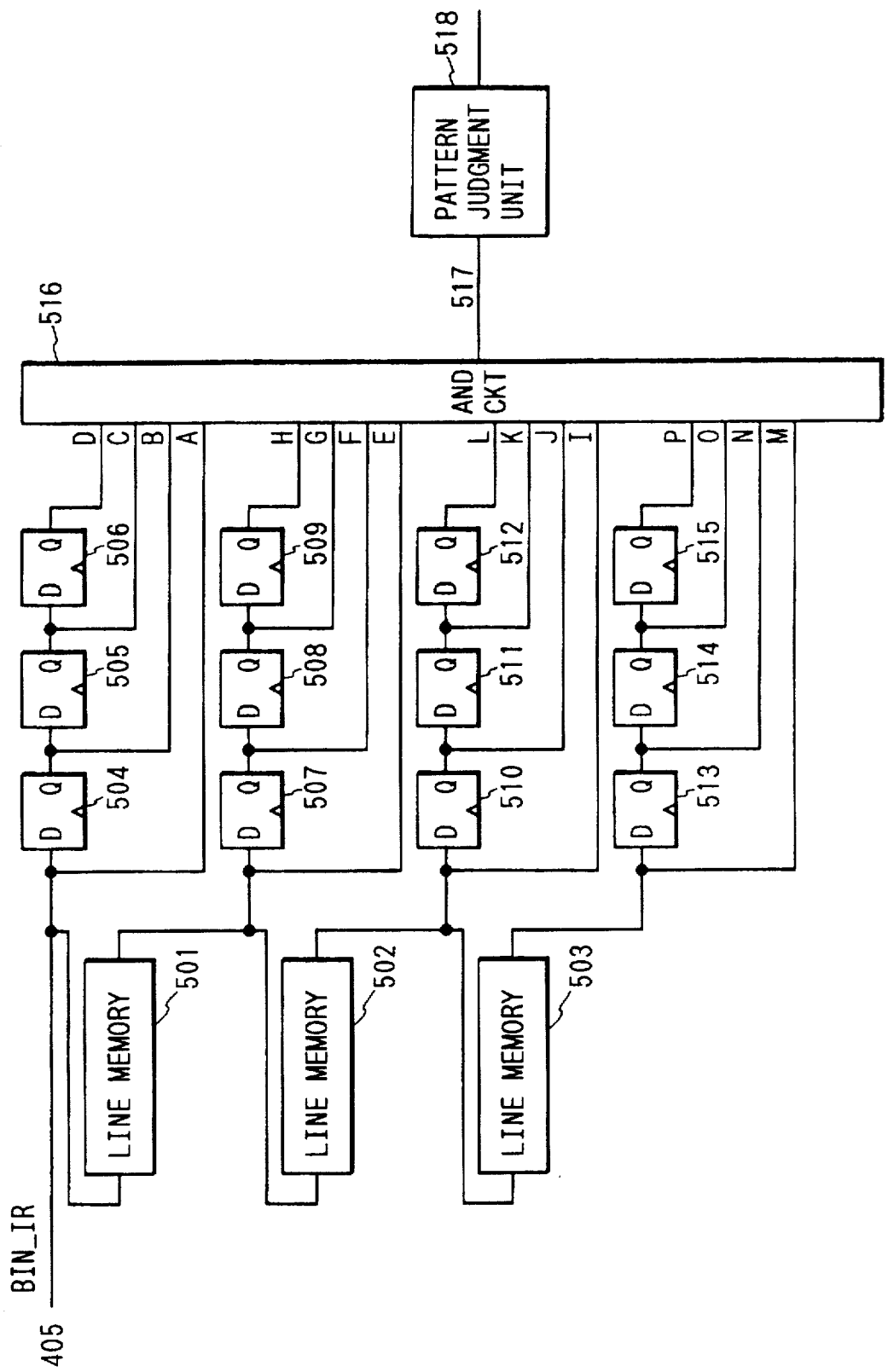
FIG. 54 is a block diagram of a processing block of the discrimination unit 3.

The binary data is supplied to a processing block shown in FIG. 54. Each of image data line delay units 501 through 503 is formed with FIFO, of which address pointer is initialized by the line synchronization signal HSYNC (not shown). The image data line delay units 501 through 503 write and read data for every pixel as a unit in response to the CLOCK signal. The image data line delay units 501 through 503 delay binary data BIN__IR data of one bit, respectively, by an amount equivalent to one line.

The BIN__IR data is latched by flip-flops 507, 508 and 509 with being delayed by an amount equivalent to three pixels to produce pixel data of E, F, G and H. In the similar manner, data of I, J, K, L, M, N, O and P are produced.

Figures 55, 56:
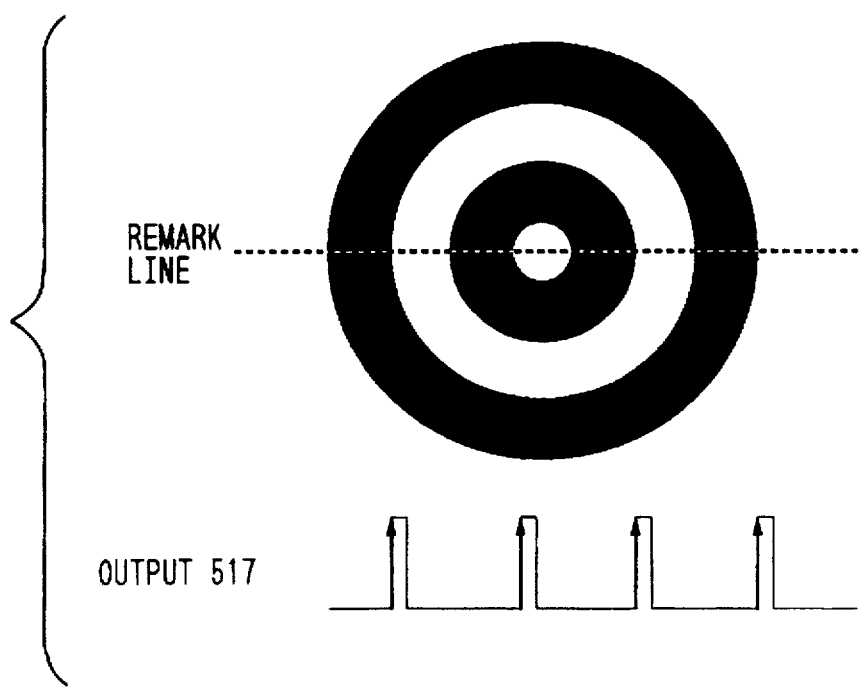
FIG. 55 shows a relation of pixels for discriminating a specific pattern from others according to the thirteenth embodiment of the present invention.
FIG. 56 is a data model of an output data 517 when the central portion of the pattern is read.

The relation of the sixteen pixels A through P is as indicated in FIG. 55.

These data are ANDed and an output 517 becomes HIGH when all data A through P represent "1". In other words, the line width of the pattern can be detected by means of detecting the presence of the infrared absorbing ink in all pixels in the region consisting of four by four pixels. Illustrated in FIG. 7 is a data model of the output data 517 when the central portion of the pattern is read.

Figure 57:
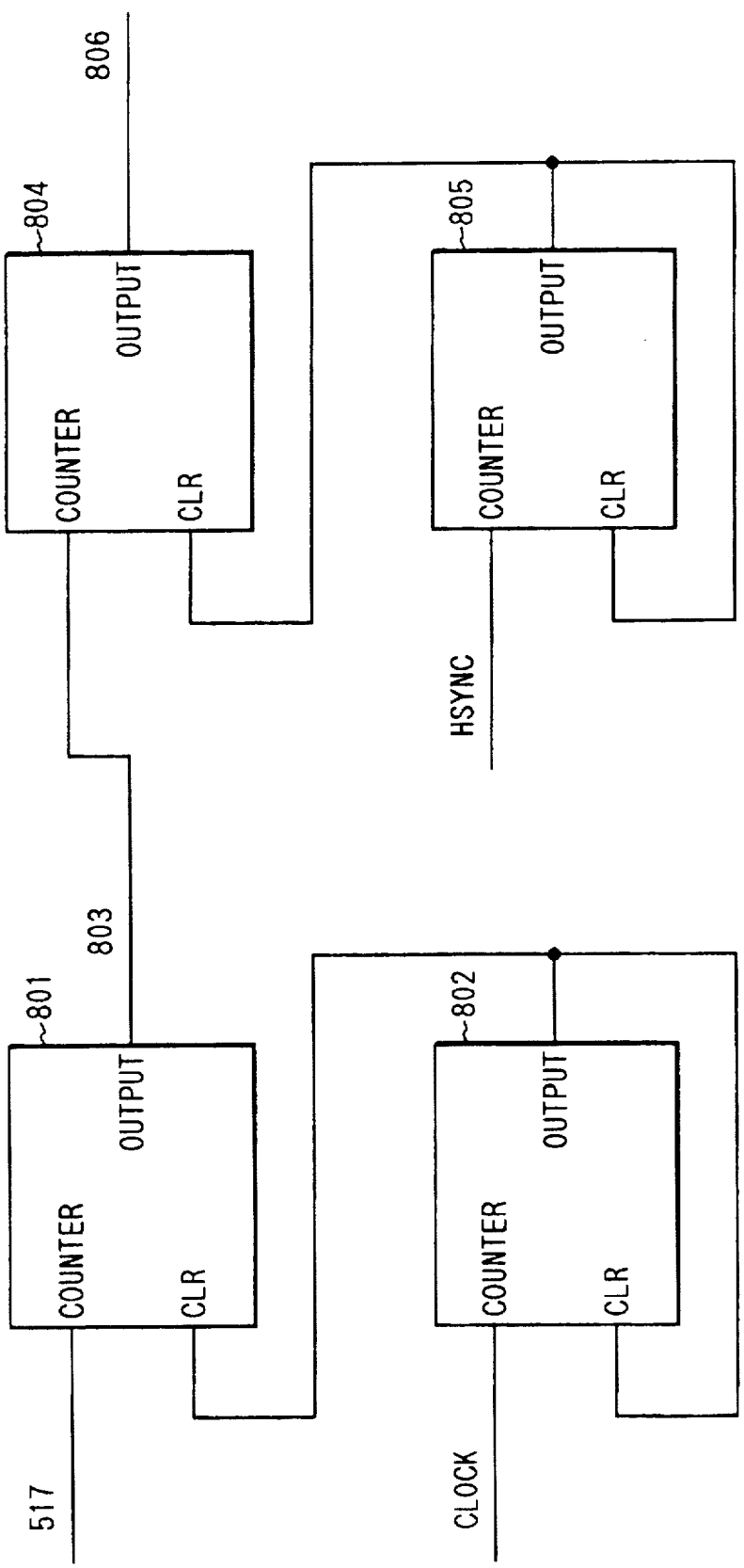
FIG. 57 is a block diagram showing a structure of a pattern judgment unit 518.

FIG. 57 shows a structure of a pattern judgment unit 518. The pattern judgment unit 518 comprises four counters 801, 802, 804 and 805. The counter 801 is provided with the output data 517 supplied from the AND circuit 516. This counter 801 counts the starting up (shift point from "0" to "1") of the binary data 517 produced in response to reading of the pattern. In other words, it counts the number of the starting up (equal to four in FIG. 56) of the data produced when a line passing through the center of the pattern. The counter 801 produces an output signal 803 when a predetermined count is reached. The counter 802 counts the number of CLOCKs and produces a reset signal at an adequate timing. This reset signal is supplied to the counter 801. The counter 801 carries out the counting operation in response to this reset signal for every block having an adequate side in the main scan direction. The size of the block may be from several times to several ten times larger than that of the concentric patterns. In addition, the concentric pattern is previously memorized to prevent two or more concentric patterns from being contained in one block. With this structure, it becomes unnecessary to process simultaneously the data for the regions where the patterns are present. As a result, the circuit will be reduced in size. The counter 804 counts the number of the output signals 803 supplied from the counter 801. The counter 804 produces a discrimination signal 806 of the discrimination unit 3 when an adequate number of output signals is counted that ensures the presence of the pattern as a result of reading several lines including the center of the pattern. The counter 805 counts the number of HSYNCs. The counter 805 produces a reset signal when it counts the HSYNCs for the predetermined lines. This reset signal is supplied to the counter 804, thereby allowing the counter 804 to count the output signals for every one of the predetermined blocks in the sub scan direction.

The discrimination result is supplied to the latch 3022 shown in FIG. 27B. The output of the latch circuit 3022 is supplied to the input port P10 of the CPU 3018. In response to this, the CPU 3018 recognizes detection of the specific original discrimination pattern. The CPU 3018 clears the latch 3022 for the subsequent pattern by means of the signal supplied from the port P9 thereof before starting a copy sequence.

<Fourteenth Embodiment>

Figure 58:
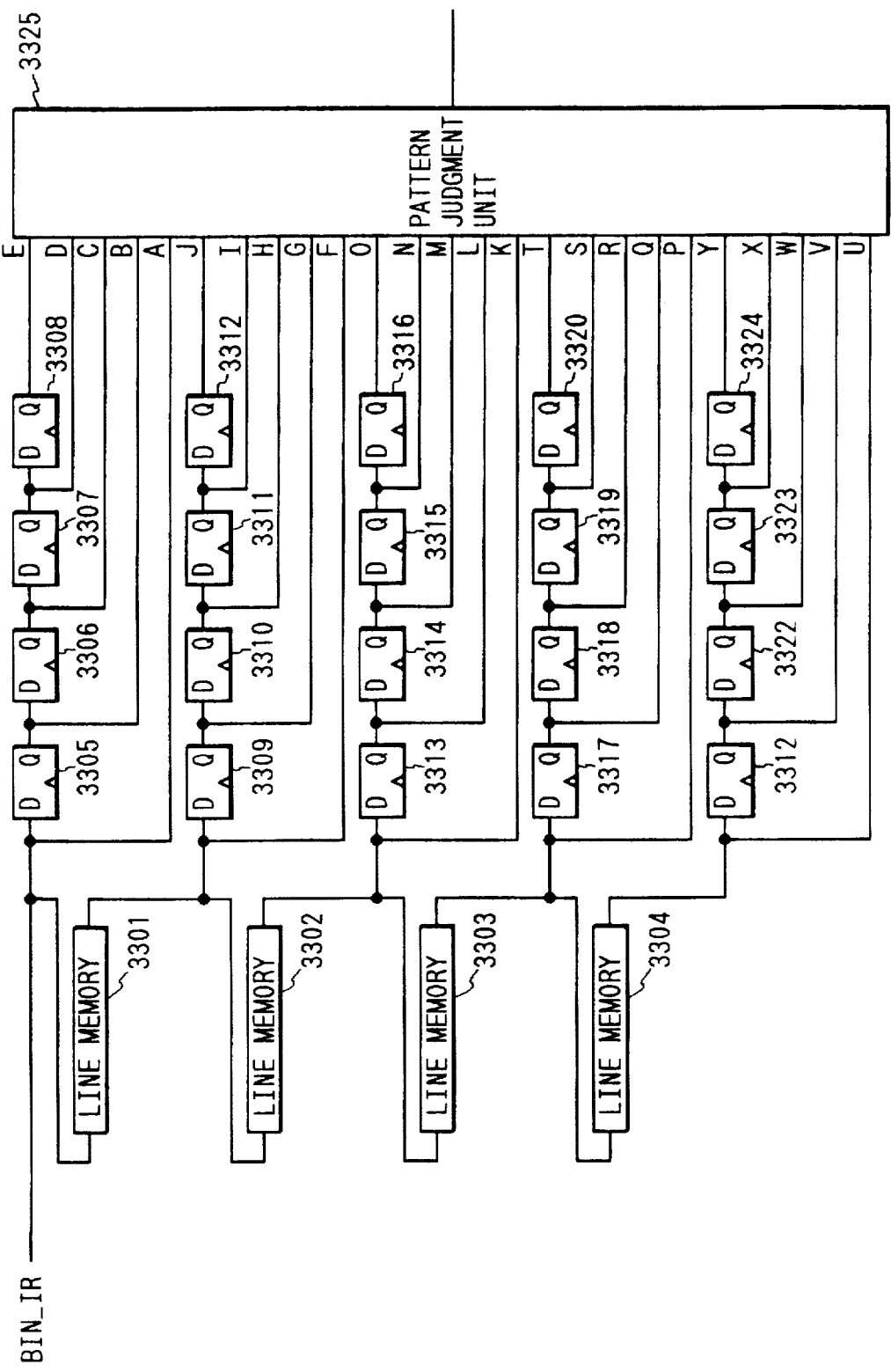
FIG. 58 is a block diagram showing an exemplified structure of the pattern discrimination unit 3 according to a fourteenth embodiment of the present invention.
Figures 59, 60:
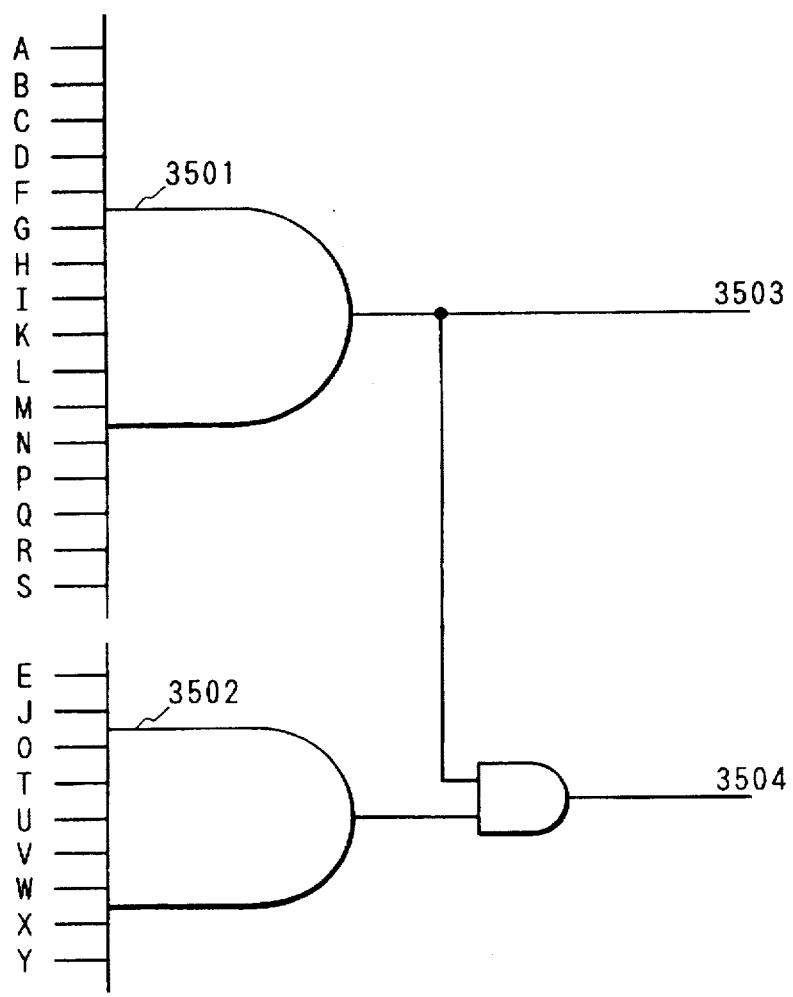
FIG. 59 is a view for use in describing a position relation of the data A through Y generated in the pattern discrimination unit 3.
FIG. 60 is a block diagram showing AND circuits of a pattern judgment unit 3325.
Figure 61:
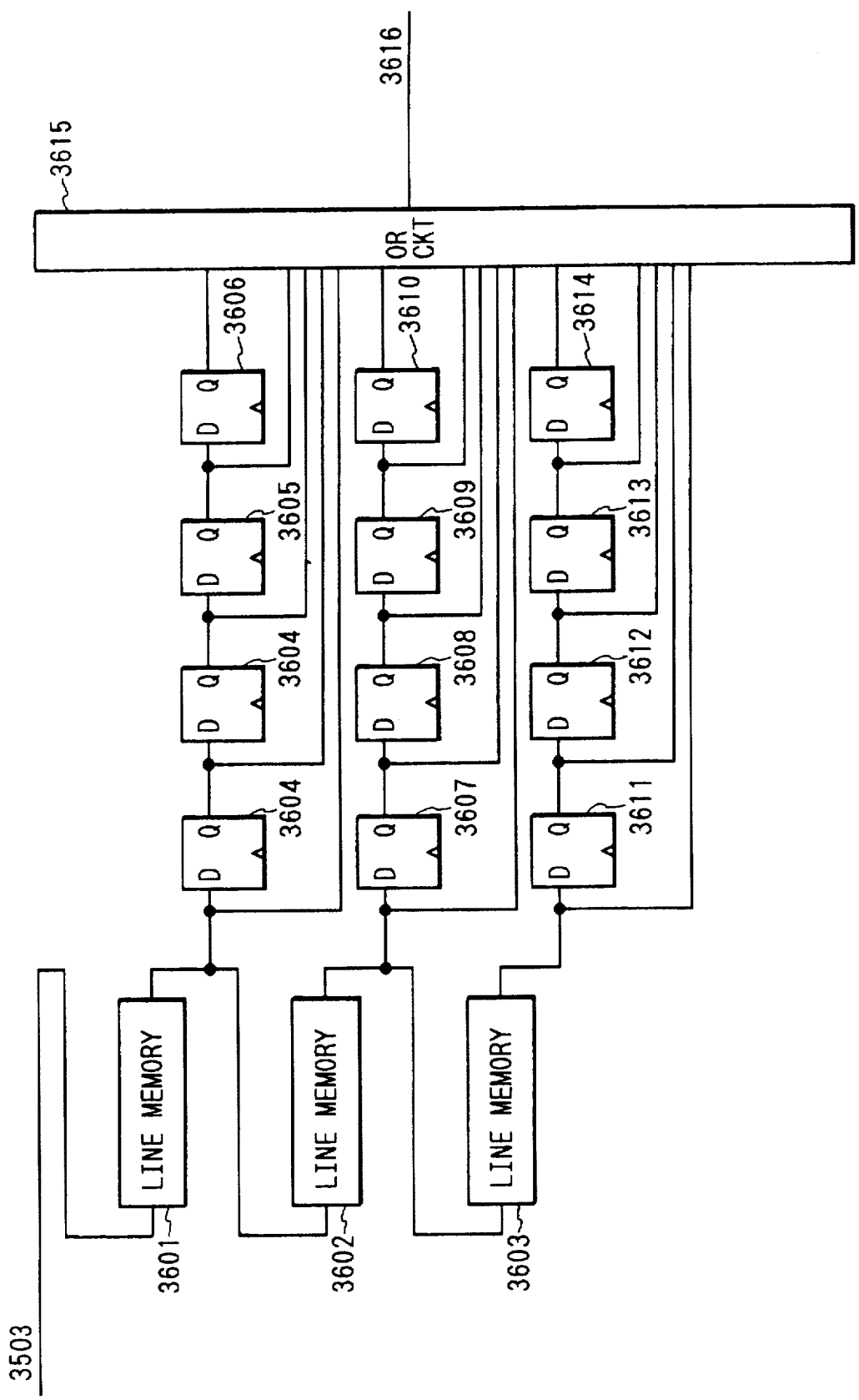
FIG. 61 is a block diagram showing a delay arrangement of the pattern judgment unit.
Figure 62:
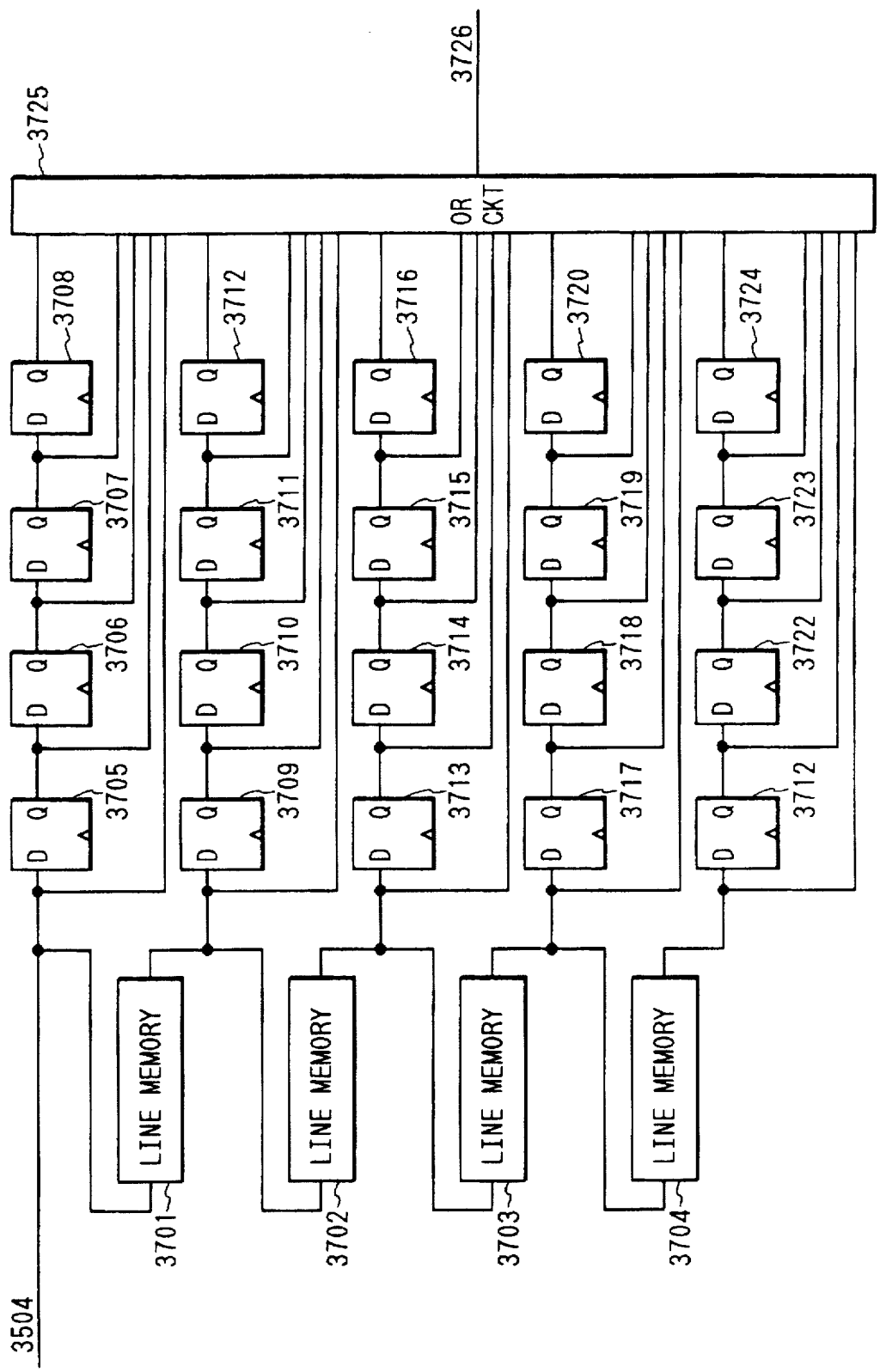
FIG. 62 is a block diagram showing another delay arrangement of the pattern judgment unit.
Figure 63:
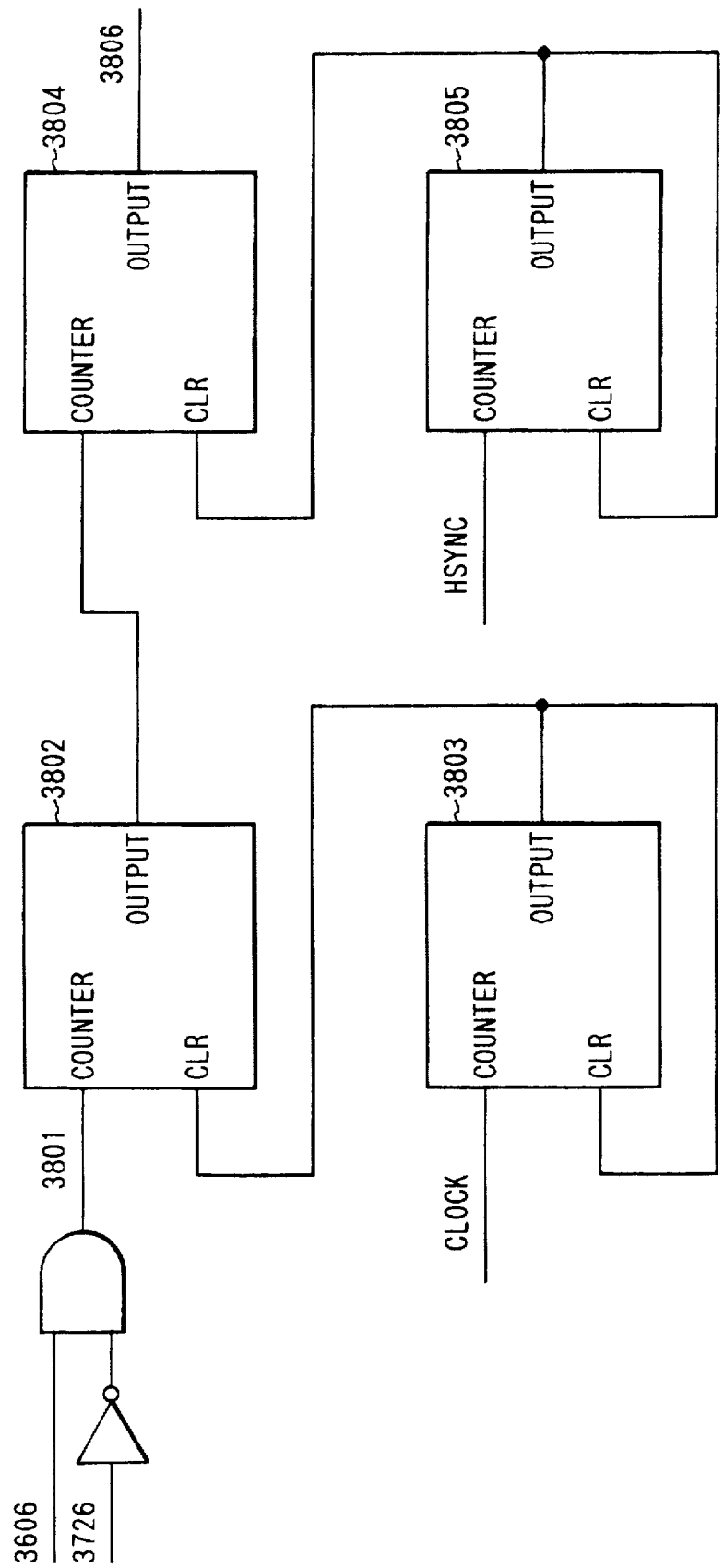
FIG. 63 is a block diagram showing a counter arrangement of the pattern judgment unit.
Figure 64B:
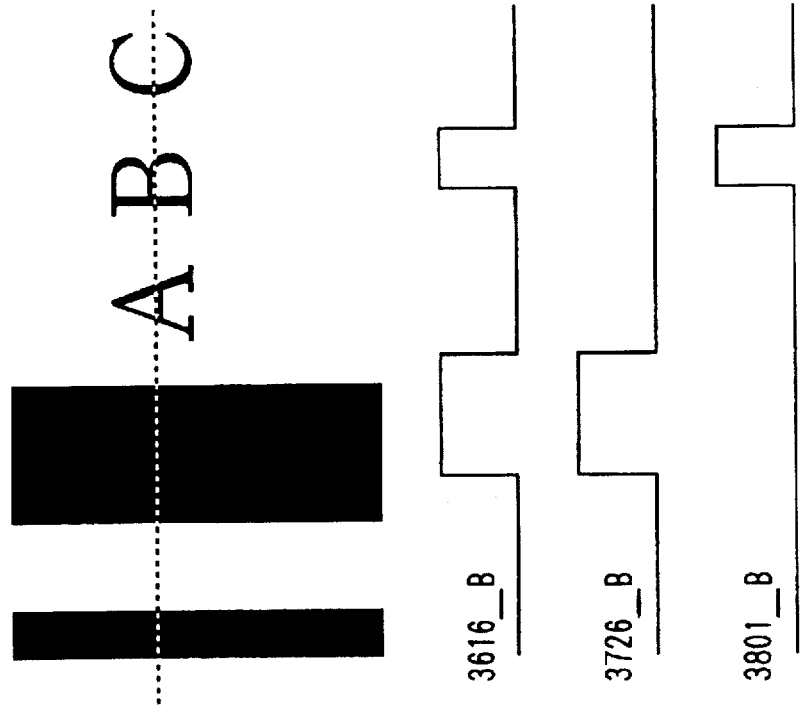
FIGS. 64A and 64B are views showing data models of specific pattern judgment output data.
Figure 64A:
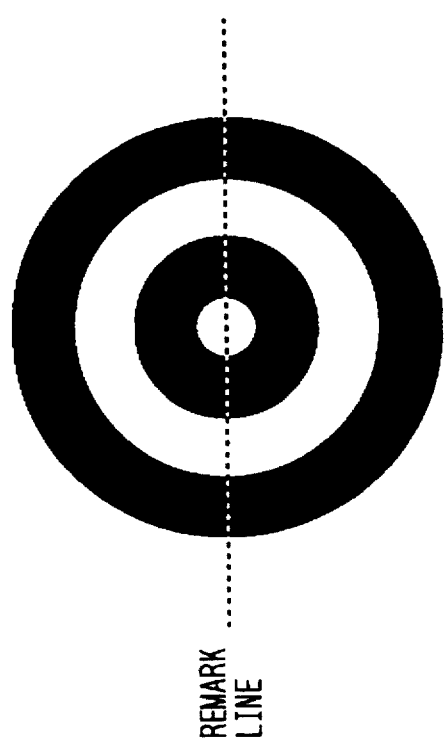

In FIG. 58, illustrated is an exemplified structure of the pattern discrimination unit 3 according to a fourteenth embodiment of the present invention. The data 405 converted into the binary form in the block shown in FIG. 53 is delayed through line memories 3301 through 3304 and flip-flops 3305 through 3324. As a result of this, generated are the data A through Y in the position relation as shown in FIG. 59. These data are supplied to a pattern judgment unit 3325. Details of the pattern judgment unit are illustrated in block diagrams shown in FIGS. 60 through 63. In FIG. 60, the pattern judgment unit comprises AND circuits 3501 and 3502. The AND circuit 3501 ANDs the data of 4×4 pixels. Then, the data of 5×5 pixels are ANDed by using the AND circuits 3501 and 3502. Outputs 3503 and 3504 of the AND circuits 3501 and 3502, respectively, are delayed by using delay circuits shown in FIGS. 61 and 62, respectively. OR calculations are carried out on the data of 4×4 pixels and 5×5 pixels. Outputs 3616 and 3726 are supplied to a counter arrangement shown in FIG. 63 where the judgment of the pattern is carried out. The counter arrangement comprises counters 3802, 3803, 3804 and 3805. The counter 3802 is a counter that produces an output when the signal of HIGH level continues by four clocks. The counter 3802 counts the number of signals, i.e., the signal 3061 of HIGH level and the signal 3602 of LOW level. This makes it possible to detect repetition of the patterns having the line width formed of four or five pixels. The counters 3803 through 3805 are used to judge the patterns for each block in the main and sub scan directions. Data models of the pattern detection data are shown in FIGS. 64A and 64B. In FIG. 64A, the illustrated pattern has the line width consisting of four pixels, so that the portion of a signal 3616_A corresponding to the pattern is in the HIGH level. On the other hand, a signal 3726_A remains in the LOW level, so that a signal 3801_A thus becomes similar to the signal 3616. In FIG. 64B, the line width of the pattern differs from each other. Accordingly, a signal 3801_B is not an iterative or periodic signal indicating four continuous pixels. As apparent from the above, this embodiment allows detection of only the patterns having the iterative line widths each consisting of four pixels. The present embodiment has been directed to the detection of the pattern having the iterative line width consisting of four or five pixels. However, any one of the suitable widths can be detected by means of setting the regions used for judgment.

In the above conventional arts, the specific original data to be judged or the specific pattern configuration should be memorized by a memory. In addition, it is necessary for the conventional arts to judge the specific pattern by means of carrying out complex image processing on the image data.

On the contrary, according to the embodiments of the present invention, the pattern discrimination unit can be achieved by the relatively simple structure comprising arrangements for providing the binary image data, for delaying the data, and for carrying out logic arithmetic.

In addition, there is no need to store previously the configuration of the specific pattern. Further, the circuit will be reduced in size by means of processing the data for the region smaller than the overall pattern.

As mentioned above, according to the present invention, it is possible to discriminate the specific original from others in a relatively simple manner with a high accuracy.

<Fifteenth Embodiment>

FIGS. 66A and 66B are block diagrams for use in describing a flow of image signals in the image scanner 201 according to a fifteenth embodiment of the present invention.

Each of the image signals is supplied from the CCD 210 to an analog signal processing unit 3001. The analog signal processing unit 3001 changes the magnitude of the image signal with a gain constant. The offset is also adjusted in the analog signal processing unit 3001. The image signals for the respective colors are then supplied from the analog signal processing unit 3001 to respective A/D converters 3002 through 3005. Each of the A/D converters 3002 through 3005 converts the analog image signal into a digital image signal of 8 bits. The digital image signal is supplied to corresponding one of shading correction units 3006 through 3009 where it is subjected to known shading correction using a reading signal obtained for the standard white plate 211.

A clock generator 3019 generates a clock signal at a speed corresponding to data of one pixel carried by the digital image signal. The clock signal is supplied to a line counter 3020 that counts the number of clock signals to produce a pixel address output for one line. A decoder 3021 decodes a main scan address supplied from the main scan address counter 3020 to generate a CCD driving signal, a VE signal and a line synchronization signal HSYNC for synchronizing the lines. The CCD driving signal may be shift pulses or reset pulses for every one line while the VE signal indicates a valid section in a one line reading signal supplied from the line CCD 210. The line counter 3020 is cleared by the HSYNC signal for every one line to restart counting of the pixel addresses in the subsequent line.

A circuit 3025 is provided to correct a lag of spatial lag of the output timing generated according to the order of arrangement of the sensor cells 210-1, 210-2 and 210-3 of the CCD 210 corresponding to the R, G and B components, respectively.

Light-to-density conversion units 3013, 3014, 3015 are composed of look-up table ROMs and convert luminance signals of R, G and B into density signals of C, M and Y. A masking and undercolor removal (UCR) circuit 3016 generates, from input signals Y, M and C representing three primary colors, output signals of Y, M, C and BK or the print colors of the printer 200 with a predetermined number of bits (for example, 8 bits), at each scanning operation carried out by the image scanner unit 201. Since the masking and UCR circuit 3016 used is the one well known in the art, a detailed description thereof is omitted.

A discrimination unit 3 detects a specific pattern on the original, which is a feature of the present invention. A CPU 3018 carries out sequence control involving, for example, control to the original reading optical systems or so on. The CPU 3018 produces a pixel section signal VSYNC in the sub scan direction. The CPU 3018 also serves to control a selector 3017 in response to a result of judgment supplied from the discrimination unit 3 such that a port output rather than the reading signal is supplied to the printer, thereby effectively prohibiting copying operation for a specific original.

FIG. 28 is a timing chart for each control signal.

The VSYNC signal indicates the image valid section in the sub scan direction and assumes a level "1" in the entries for scanning the image to successively produce the output signals of (C), (M), (Y) and (BK). VE is a signal indicating the image valid section in the main scan direction and takes timing at the start position of the main scanning operation. A CLOCK signal is a pixel synchronization signal that causes the transfer of the image data at the leading edge from "0" to "1".

Figures 67, 68A, 68B:
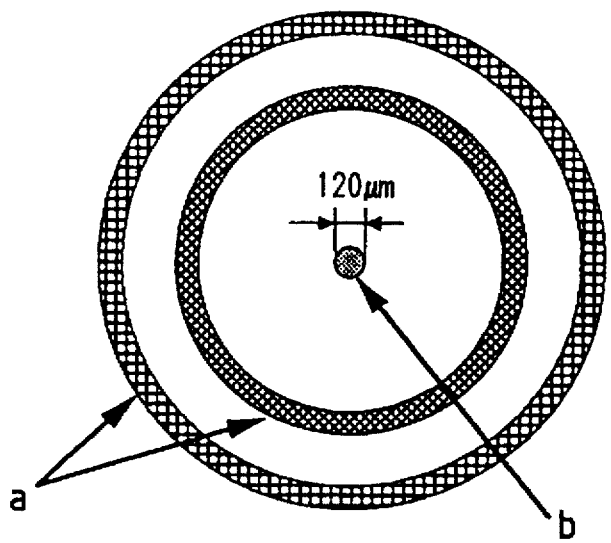
FIG. 67 is a view showing an example of a pattern to be discriminated by the present invention.
FIGS. 68A and 68B are views showing illustrating pixel areas and area pattern of a central pixel judgment circuit.

An image pattern to be detected by the discrimination unit 3 according to this embodiment is described in general with reference to FIG. 67. This figure showing an example of a pattern formed by using a transparent ink loading infrared absorbing pigments having the characteristic shown in FIG. 21. More particularly, concentric patterns (a) and a small circle (b) located at the center thereof are printed with the transparent ink on the original that has no infrared absorbing characteristic. The small circle at the center is approximately 120 μm in diameter. These patterns are almost invisible in the visible region as apparent from the FIG. 21. However, the apparatus can readily discriminate these patterns from the background in the infrared region. In addition, the background may be filled all over with a color that is similar to the tint to the transparent ink.

It is noted that the pattern (a) is not limited to the one illustrated in FIG. 67. Instead, equilateral polygons may be used that have a common central point.

Figure 65:
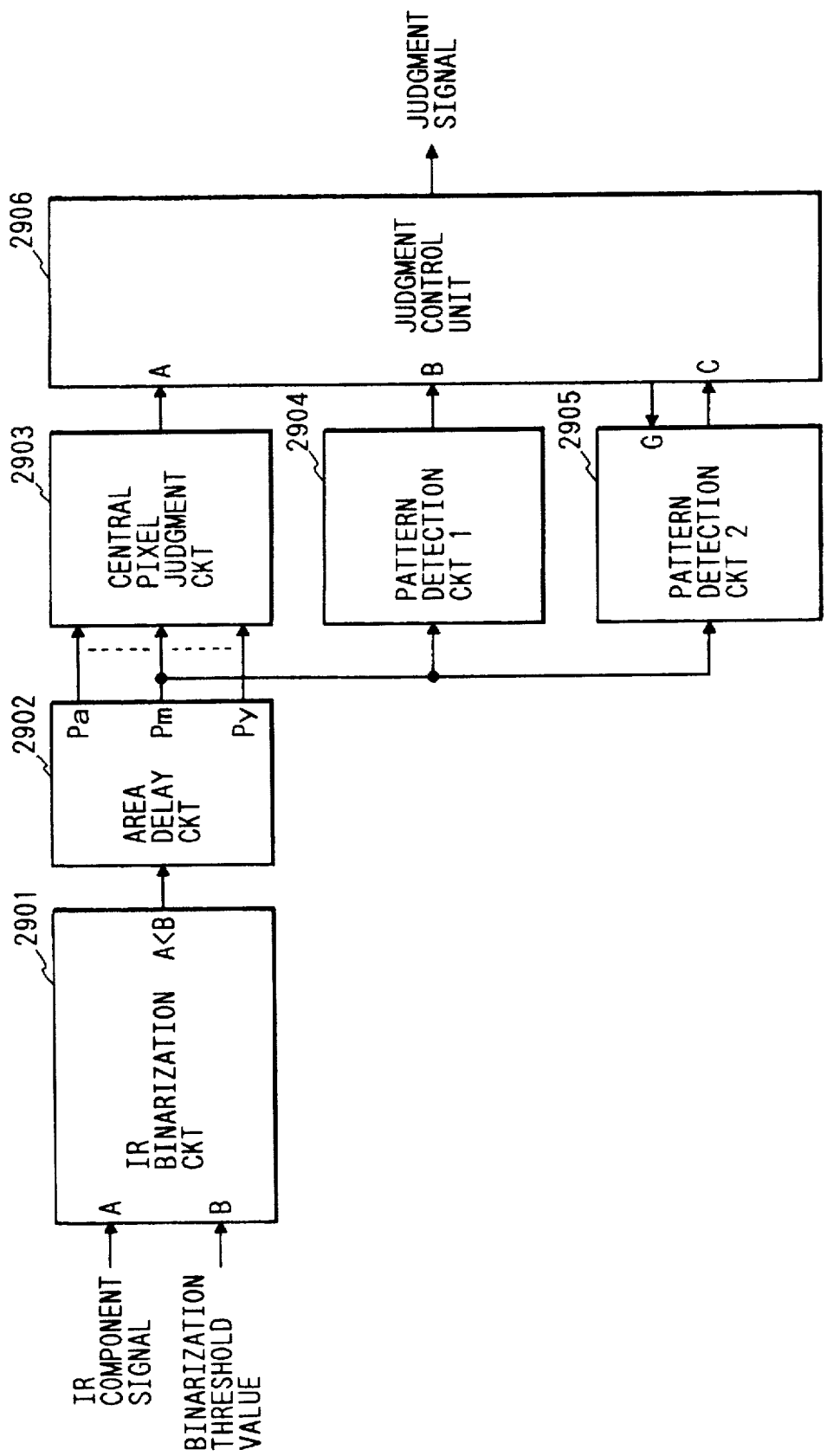
FIG. 65 is a block diagram showing details of the discrimination unit 3.

FIG. 65 is used for describing the details of the discrimination unit 3 shown in FIGS. 66A and 66B.

The IR component data supplied from a shading correction circuit 3009 to the discrimination unit 3 is converted into a binary signal in an IR binarization circuit 2901. The IR binarization circuit 2901 is also provided with a binarization threshold value to supply a binary signal to an area delay circuit 2902 according to the conditions as follows:

If the IR component data ≧ binarization threshold, the output represents "0".

If the IR component data < binarization threshold, the output represents "1".

Figure 69:
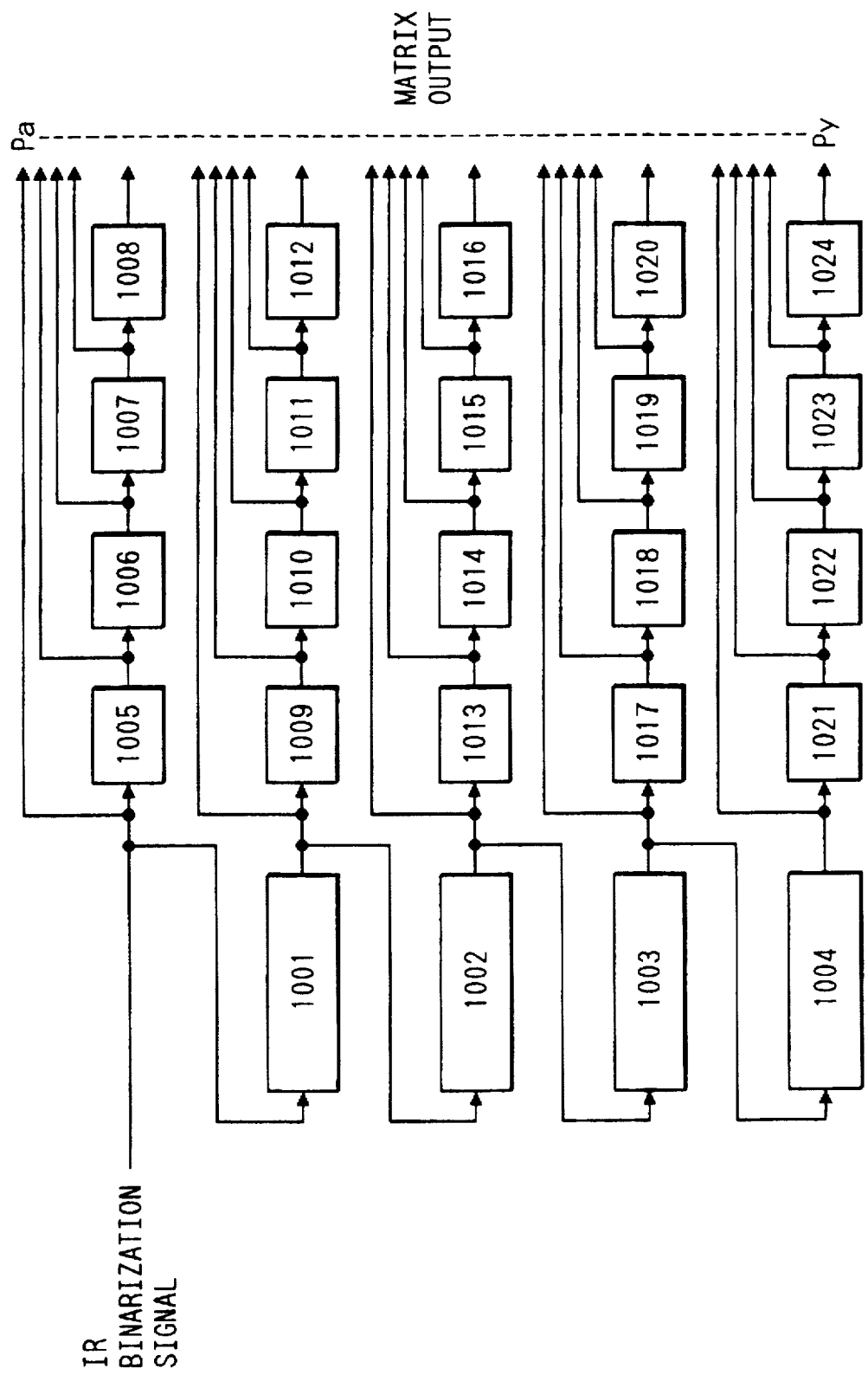
FIG. 69 is a block diagram showing an area delay circuit of the discrimination unit 3.

As shown in FIG. 69, the area delay circuit 2902 comprises line memories 1001 through 1004 and D flip-flops 1005 through 1024. The pointers thereof are initialized by the line synchronization signal HSYNC (not shown). To write and read data for every pixel as a unit and shift operations are carried out in response to the CLOCK signal.

The IR binary signals supplied from the IR binarization circuit 2901 are successively subjected to a pixel delay by the D flip-flops 1005 through 1008 and delayed by one line interval by the line memory 1001. Then the signals are successively subjected to a pixel delay by the D flip-flops 1009 through 1012. Data Pa through Py that are successively subjected to the line delay and the pixel delay are simultaneously produces at the timing such that the position relation shown in FIG. 68A can be obtained. Accordingly, the output of this circuit is varied in synchronism with the output timing of the CCD 210, and corresponds to movement of the matrix area shown in FIG. 68A by one pixel in both the main and sub scan directions. In this embodiment, the pixel area of 5×5 is illustrated as an example of the matrix area. However, the present invention is not limited thereto. The data Pa through Py are compared with predetermined area patterns in a central pixel judgment circuit 2903. When the data coincides with the predetermined area pattern, the central pixel judgment circuit 2903 produces an output signal of "1" as an A input to the judgment control unit 2906. As an example of the predetermined area pattern used in the central pixel judgment circuit 2903, a pattern for use in judging an isolation degree of a remark pixel data (Pm) is shown in FIG. 68B.

The remark pixel data (Pm) is also supplied to a first pattern detection circuit 2904 and a second pattern detection circuit 2905.

Figure 70:
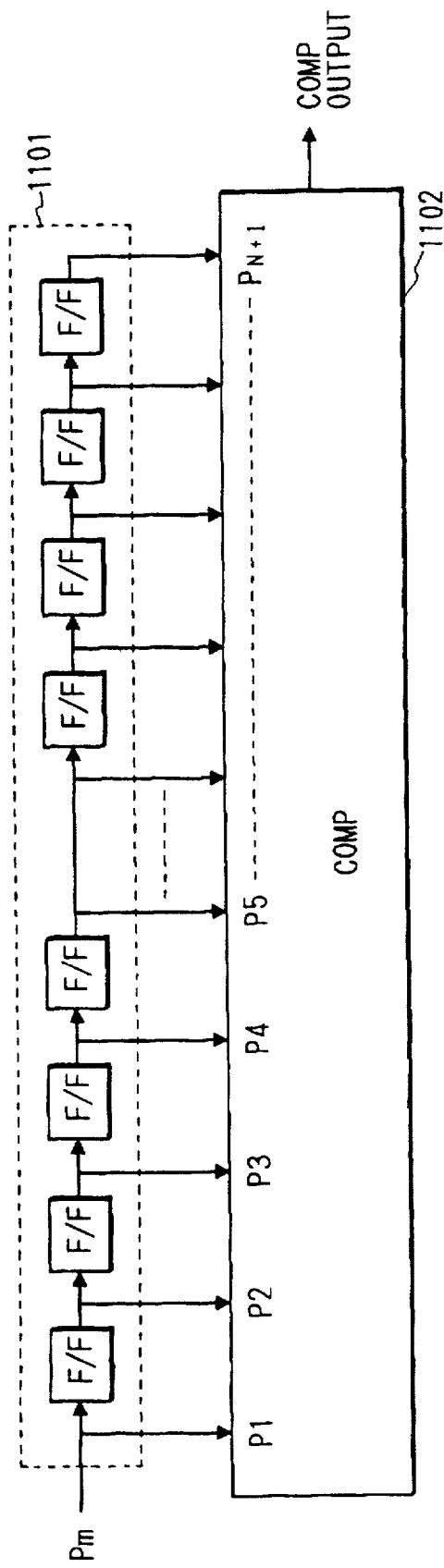
FIG. 70 is a block diagram showing details of a first pattern detection circuit 2904 of the discrimination unit.

The first pattern detection circuit 2904 comprises, as shown in FIG. 70, a shift register 1101 consisting of N numbers of D flip-flops and a pattern comparator 1102. A shift operation of the first pattern detection circuit 2904 is carried out in response to a CLOCK signal (not shown). The remark pixel data supplied from the area delay circuit 2902 are successively stored in the shift register 1101. (N+1) data are supplied to the comparator 1102 at the simultaneous timing.

The comparator 1102 compares a predetermined iterative pattern with the pixel direction (opposing to the main scan direction) already read on the same line started from the remark pixel data (Pm). The comparator 1102 produces a comparison result of "1" when they coincide with each other. The timing of this output is simultaneous with the timing of producing the judgment result by the central pixel judgment circuit 2903. The output of the comparator 1102 is used as a B input to the judgment control unit 2906.

Figure 71:
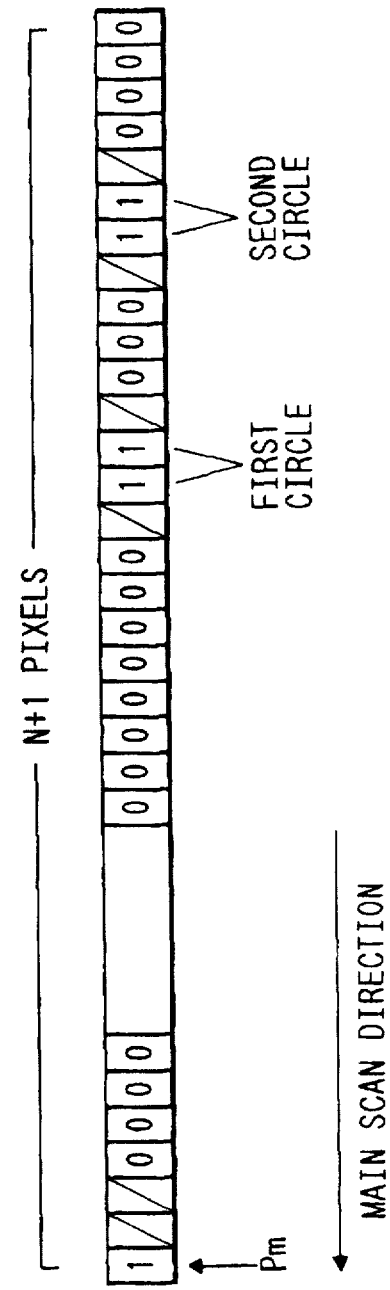
FIG. 71 is a view showing an example of a comparison pattern of a first pattern detection circuit.

FIG. 71 shows an example of a comparison pattern of the first pattern detection circuit.

Figure 72:
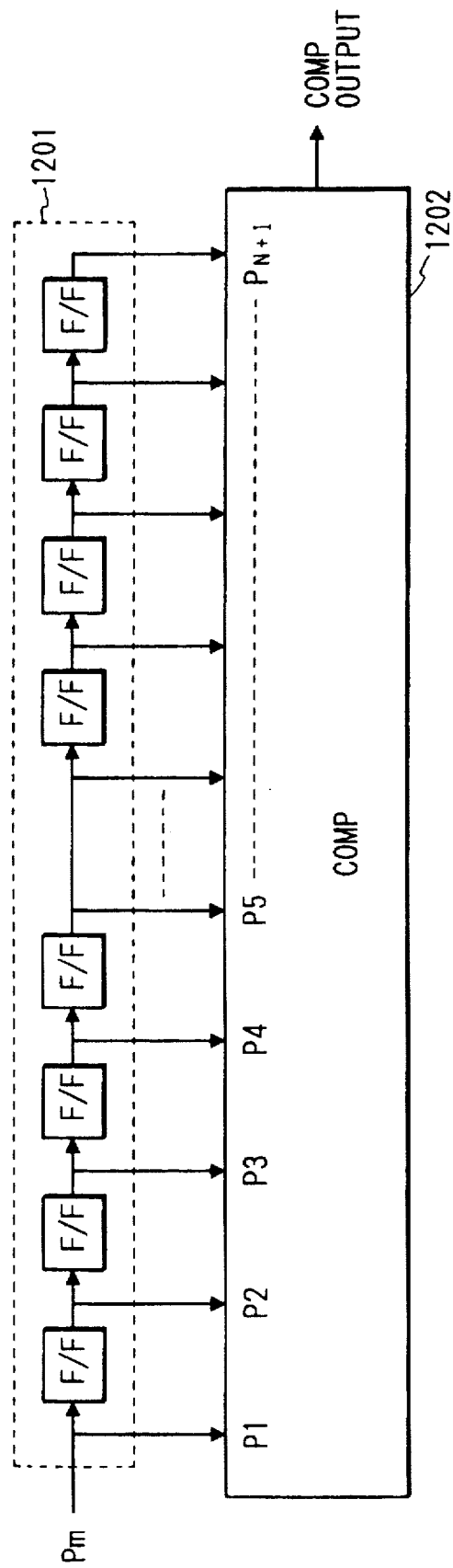
FIG. 72 is a block diagram showing details of a second pattern detection circuit 2905 of the discrimination unit.

The second pattern detection circuit 2905 comprises, as shown in FIG. 72, a shift register 1201 consisting of N numbers of D flip-flops and a pattern comparator 1202. A sampling operation of the second pattern detection circuit 2905 is carried out in response to a CLOCK signal (not shown) for each pixel in synchronism with a sampling gate signal supplied from the judgment control unit 2906.

The remark pixel data supplied from the area delay circuit 2902 are successively stored in the shift register 1101 in synchronism with the sampling gate signal. (N+1) data are supplied to the comparator 1202 at the simultaneous timing.

Figure 73:
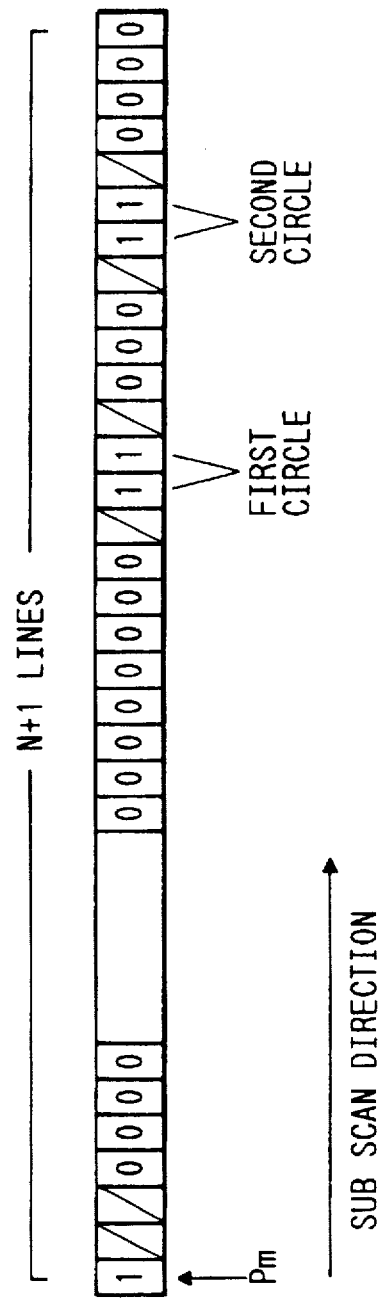
FIG. 73 is a view corresponding to FIG. 71 except that illustrated is an example of a comparison pattern of a second pattern detection circuit.

The comparator 1202 compares a predetermined iterative pattern with the pixel direction (the sub scan direction) already read on the same line started from the remark pixel data (Pm) in the same manner as in the case of the first pattern judgment circuit 2904. The comparator 1202 produces a comparison result of "1" when they coincide with each other. The timing of this output is simultaneous with the timing of producing the judgment result. The output of the comparator 1202 is used as a C input to the judgment control unit 2906. An example of a comparison pattern of the second pattern detection circuit is shown in FIG. 73.

The judgment control unit 2906 produces a judgment signal of "1" when it judges that the pattern shown in FIG. 67 is present in the original image according to the judgment results obtained by the central pixel judgment circuit 2903, the first pattern judgment circuit 2904 and the second pattern judgment circuit 2905.

The judgment signal is supplied to a clock terminal of a flip-flop 3022. The judgment signal is used for setting "1" to the flip-flop 3022 that has already been cleared by the CPU 3018 before initiation of the reading operation.

The CPU 3018 continuously monitors the output of the flip-flop 3022. When "1" is set to the flip-flop 3022, i.e., when it is determined by the discrimination unit 3 that the pattern shown in FIG. 67 is present in the original image, the CPU 3018 controls the selector 3017 to supply the port output rather than the reading signal to the printer unit 200, thereby preventing the specific original from being copied.

An algorithm of the judgment control unit 2906 used in this embodiment is described below with reference to FIG. 74.

When an operator begins the copying operation, the judgment control unit 2906 intializes the internal flip-flops or the counters at step S101. Subsequently, the judgment control unit 2906 monitors the states of an A input terminal and a B input terminal at step S102. When either one of the A and B input terminal is not "1", the judgment control unit 2906 proceeds to step S107. On the other hand, if both the A and B input terminals are "1" indicating that the central pixel judgment circuit 2903 and the first pattern judgment circuit 2904 detect the predetermined pattern, the judgment control unit 2906 supplies the sampling gate signal to the second pattern judgment circuit 2905 at step S103. The judgment control unit 2906 thus stores the data at a position corresponding to the remark pixel in the shift register 1202. In this event, the judgment control unit 2906 carries out repeatedly the same operation of the step S103 until the sampling line numbers are counted and the data for N lines are stored in the shift data 1202 at step S104. When the data for the N lines are stored in the shift register 1202, the judgment control unit 2906 monitors at step S105 a state of a C input terminal. If the input indicates "0", the judgment control unit 2906 carries out the step S107. On the other hand, if the input indicates "1" due to the detection of the predetermined pattern, the judgment control unit 2906 produces the judgment signal of "1" at step S106 to set the flip-flop 3022. The operations of steps S102 through S106 are repeated at step S107 until the reading operation is completed.

Figure 74:
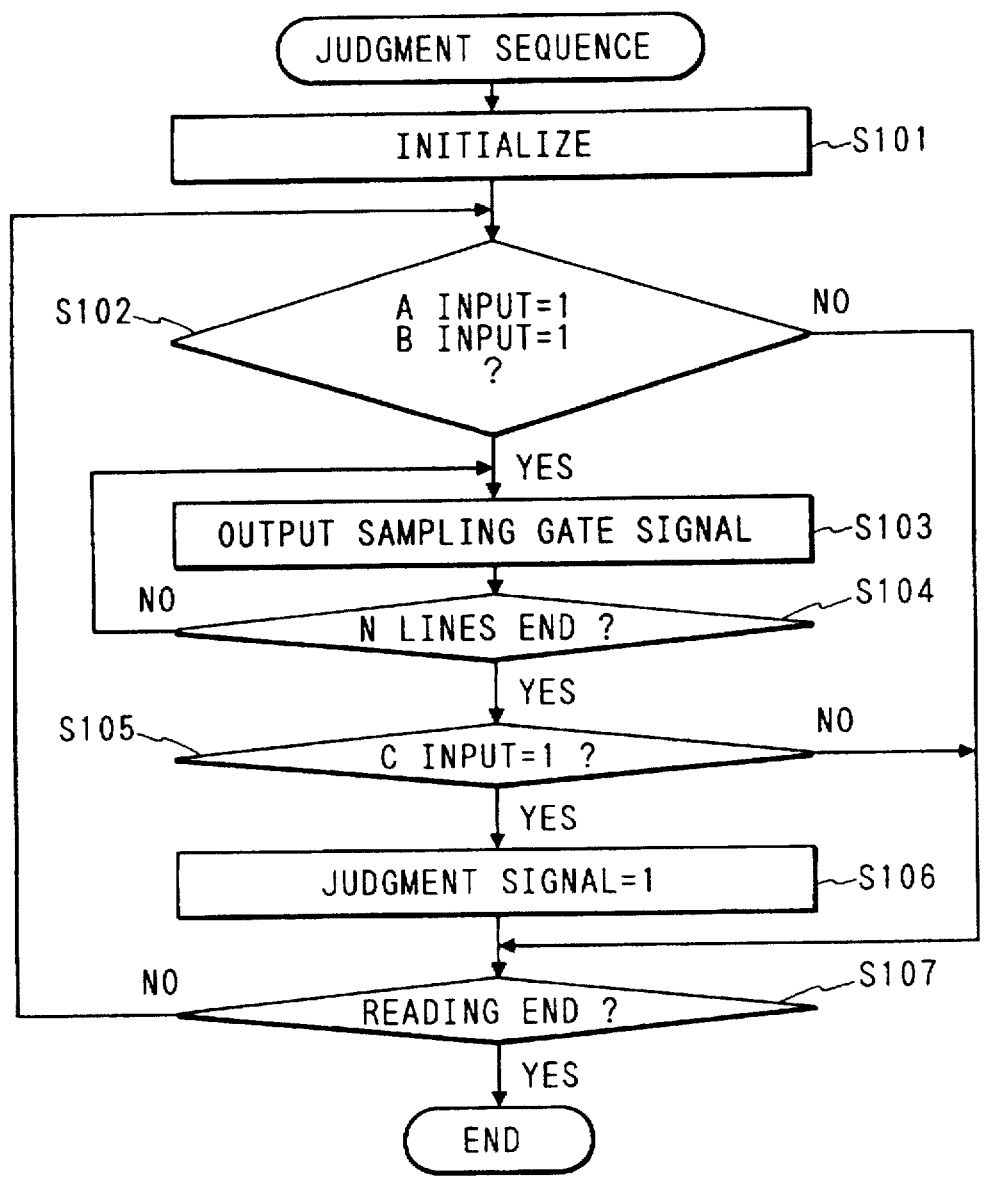
FIG. 74 is a flow chart showing a judgment algorithm carried out by a judgment control unit according to the fifteenth embodiment of the present invention.
Figure 75:
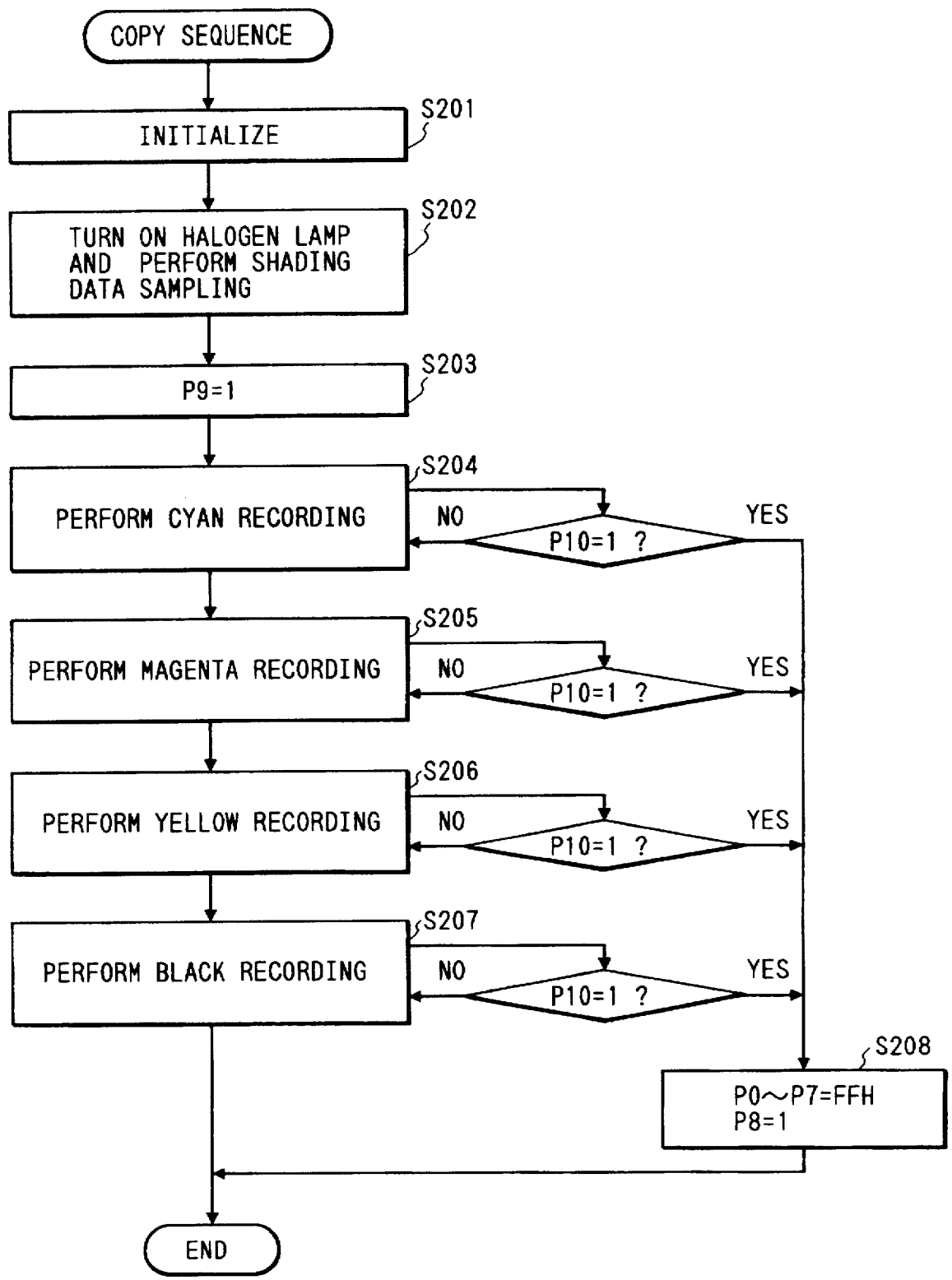
FIG. 75 is a flow chart illustrating a control algorithm carried out by the CPU.

Next, described with FIG. 74 is a normal copying operation and the associated control operation carried out by the CPU 3018 upon discrimination of the specific pattern. When an operator put the original 204 on the platen 203 and initiates the copying operation through an operation unit (not shown), the CPU 3018 initiates at step S1 each component and part of the apparatus. At step S202, the CPU 3018 controls a motor (not shown) to move the reflection mirror 206 beneath the standard white plate 211. The halogen lamp 205 is then turned on to sample the shading data for the IR, R, G and B signals. Subsequently, at step S203, the CPU 3018 sets the port output P into "1" to release the clear condition of the flip-flop 3022.

Next, the scanning operation is repeated four times as the printer unit 200 records four colors of M, C, Y and BK to complete one copy of the original. At the same time, presence of the specific pattern is detected and the recording operation is controlled in accordance with the detection result.

At step S204, the CPU 3018 sets processing conditions for recording cyan and operates the optical system to scan the original and supply the C data to the printer 200. After completion of the scanning operation, the optical system is turned back to an initial position of scanning. The CPU 3018 periodically monitors the port 10 during the scanning operation to determine whether the input signal indicates "1". If the input to the P10 represents "1", outputs of P0 through P7 are set into FFH at step S208 based on the decision that the specific original is to be copied. In addition, an output of P8 is set into "1" to supply the printer 200 a set-solid signal of FFH, whereby prohibiting further copying operation to avoid counterfeit of the specific original. Likewise, the recording control is also made for magenta, yellow and black through steps S205 to S207, during which the CPU periodically checks the P10. If the P10 is "1" the CPU supplies the set-solid FFH data to the printer 200 at the step S208.

A way for prohibiting a normal copying operation may be, other than a set-solid, a batching processing, interruption of image forming means, turning off the power or the like.

<Sixteenth Embodiment>

Figure 76B:
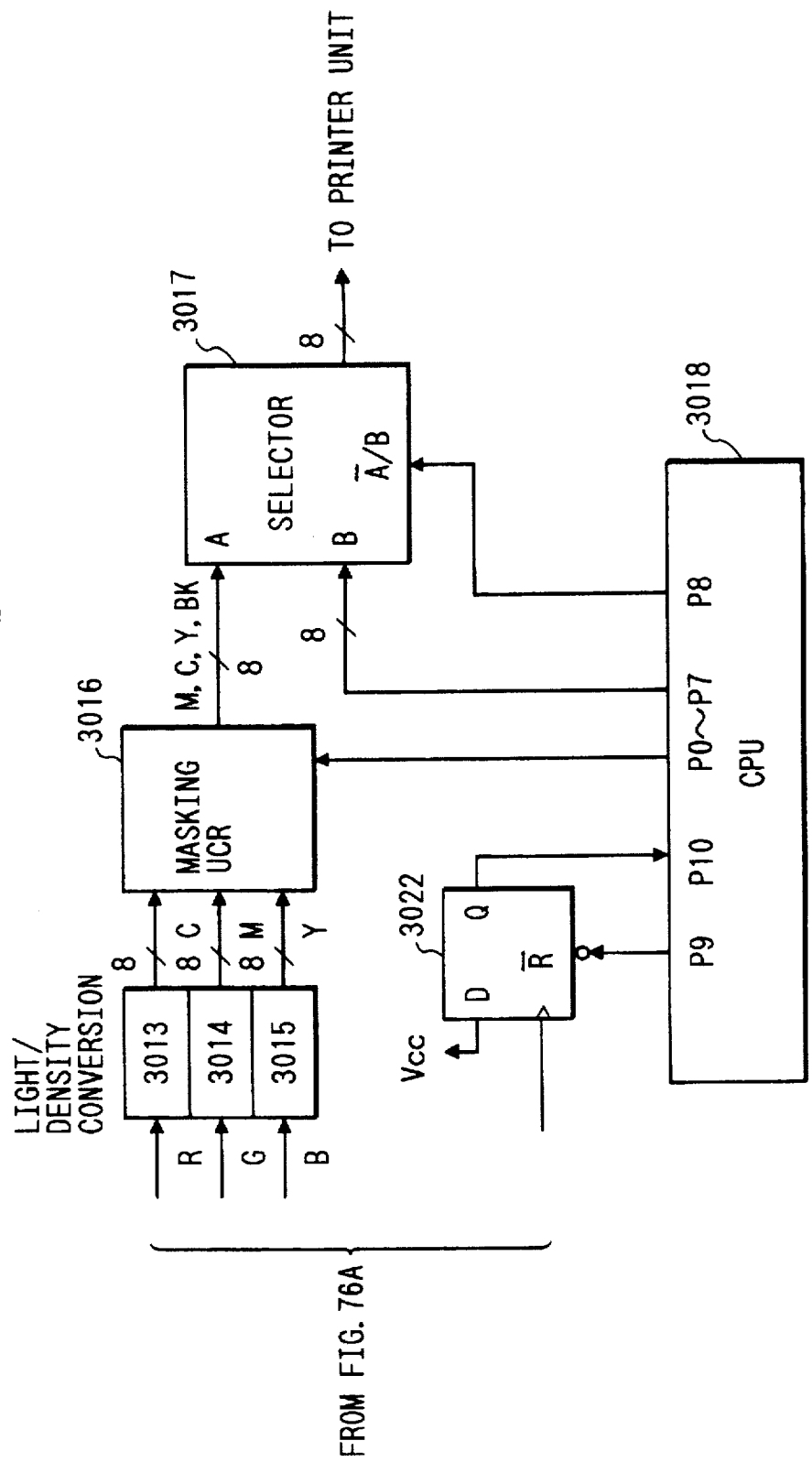
FIG. 76 is comprised of FIGS. 76A and 76B showing block diagrams of an image signal controlling unit of an image scanner unit according to a sixteenth embodiment of the present invention.

FIGS. 76A and 76B show another exemplified structures of the image scanner unit 201 according to the present invention.

In this structure, the discrimination unit 3 is supplied with image data of R, G and B visible regions along with the IR data as the input data. The discrimination unit 3 according to this sixteenth embodiment is described with reference to FIG. 77.

In this figure, the reference numerals 2901 through 2905 are similar to those described in the fifteenth embodiment. Thus, detailed description thereof is omitted here. Each data of R, G and B from a filter position correction circuit 3025 is supplied to a color tint judgment circuit 2910. The color tint judgment circuit 2910 judges whether the color tint of each pixel coincides with a predetermined color tint. If coincident, the color tint judgment circuit 2910 produces "1" as a judgment result. This judgment result is supplied to a synchronization delay circuit 2911. The judgment result is subjected to a predetermined delay by using a line memory and a shift register (both are not shown) in the synchronization delay circuit 2911. The delayed signal is supplied to a D terminal of the judgment control unit 2912 at the same timing when the judgment outputs are supplied from the central pixel judgment circuit 2903 and the first pattern detection circuit 2904. Accordingly, the color tint judgment circuit 2910 judges the color tint of the remark pixel Pm in the central pixel judgment circuit 2903.

Figure 78:
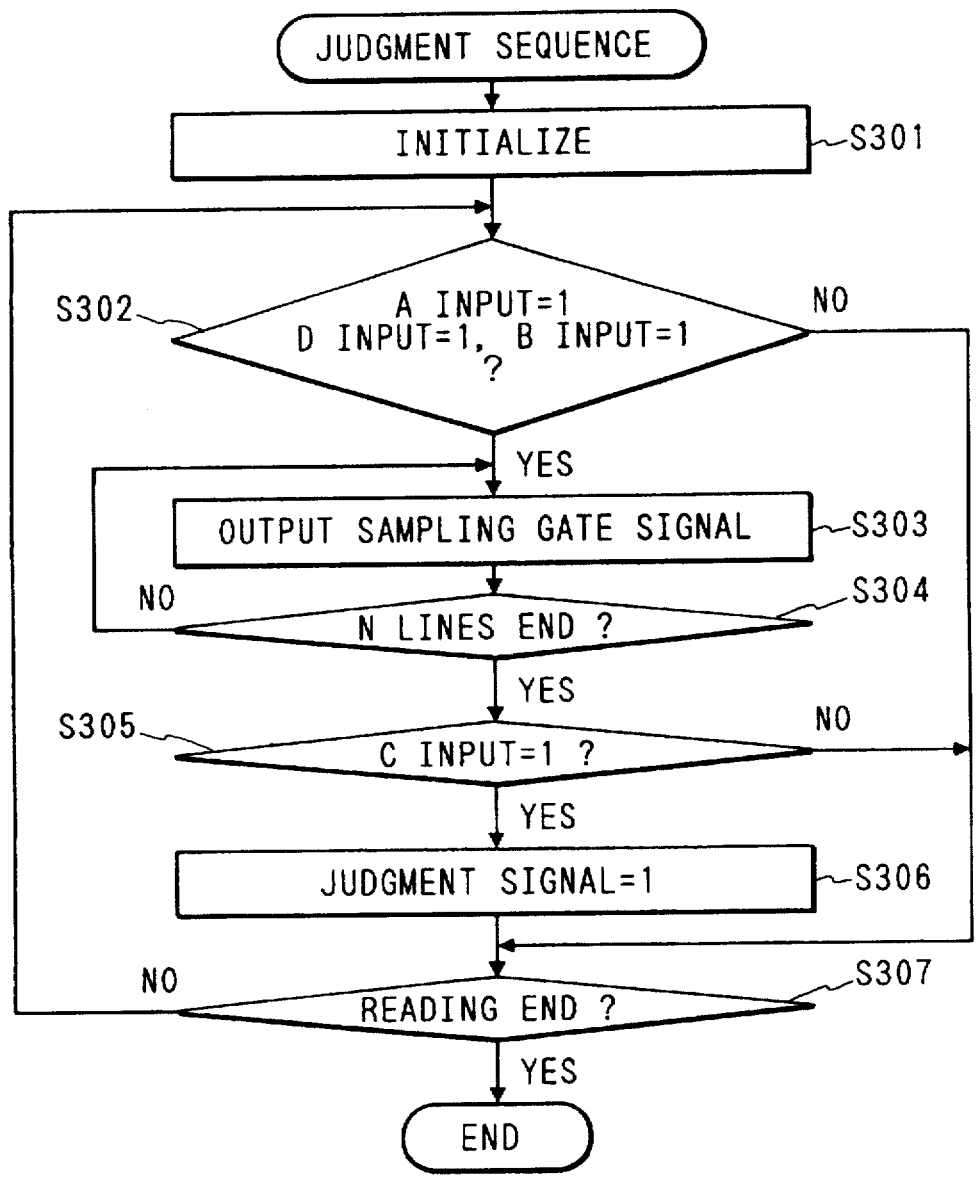
FIG. 78 is a flow chart showing a judgment algorithm carried out by the judgment control unit.

FIG. 78 is a flow chart showing a judgment algorithm carried out by the judgment control unit 2912. This flow chart is similar to the one shown in FIG. 74 and described in the fifteenth embodiment except that the condition of the D input terminal is also considered at step S302. More particularly, in the algorithm carried out by the judgment control unit 2912 according to this sixteenth embodiment, the discrimination of the specific original from others can be achieved more readily by using the color tint of the pattern (b) shown in FIG. 67. Accordingly, the specific original can be discriminated from others even when the specific pattern (a) is relatively simple in configuration. This is achieved by means of using the ink for printing the pattern (b) that the ink has the different tint from the inks used in the original.

<Seventeenth Embodiment>

Figure 79:
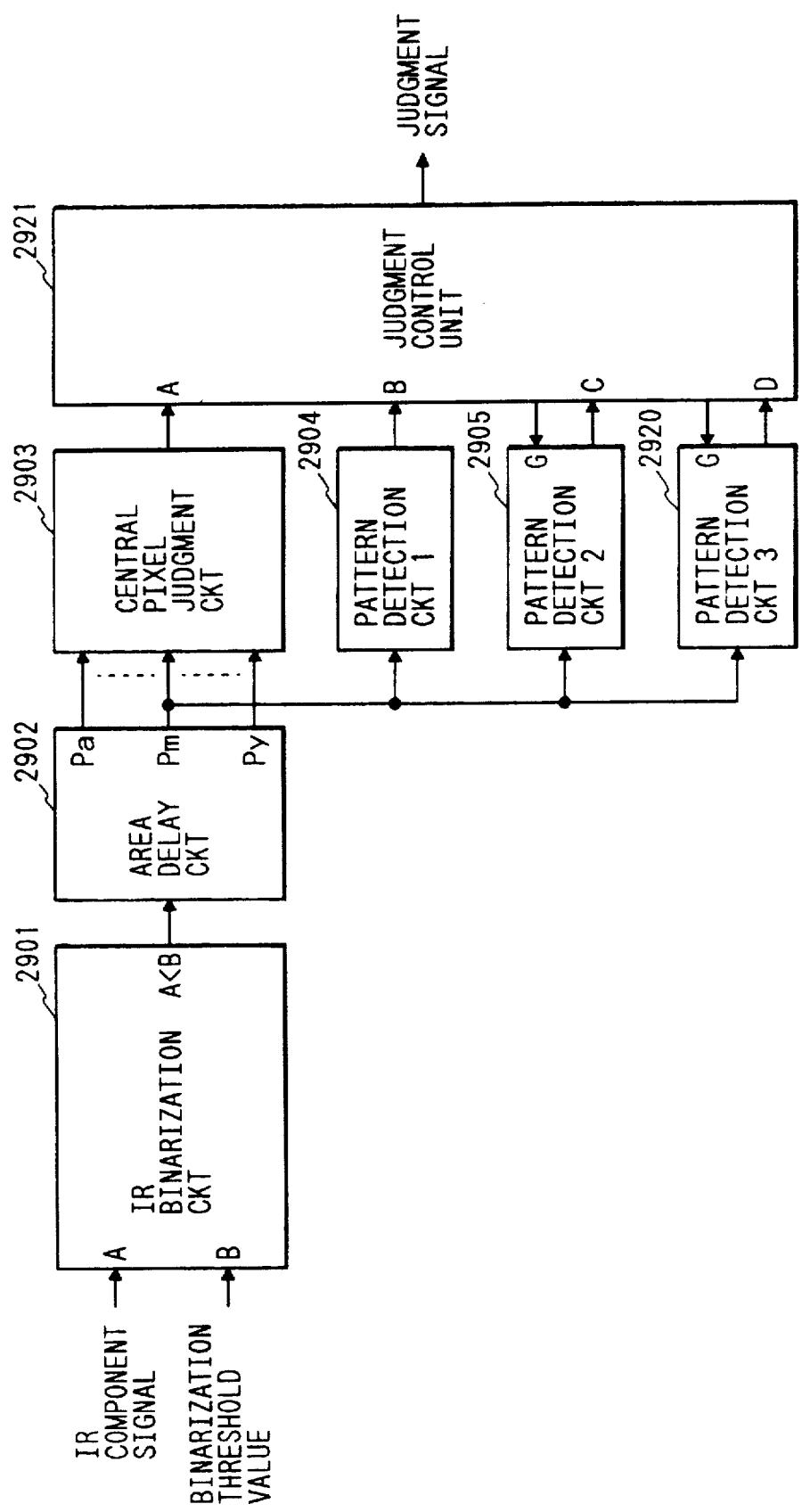
FIG. 79 is a block diagram showing a discrimination unit according to a seventeenth embodiment of the present invention.

FIG. 79 shows an exemplified structure of the discrimination unit 3 according to a seventeenth embodiment of the present invention. In this embodiment, a third pattern detection circuit 2920 is provided for compares the patterns with predetermined iterative patterns in the main scan direction opposing to that in the first pattern detection circuit 2904 from the remark pixel position in the central pixel detection circuit 2903 as the origin. When the comparison result indicates matching, the third pattern detection circuit 2920 produces an output of "1". This output is supplied as the D input to the judgment control unit 2921. The third pattern detection circuit 2920 according to this embodiment is equivalent in circuit structure to the circuit shown in FIG. 72. The third pattern detection circuit 2920 carries out shift operation for each pixel as a unit in synchronism with a shift gate signal supplied from the judgment control unit 2321. Thus, in this circuit, (N+1) data following the remark pixel Pm are used for carrying out pattern comparison.

Figure 80:
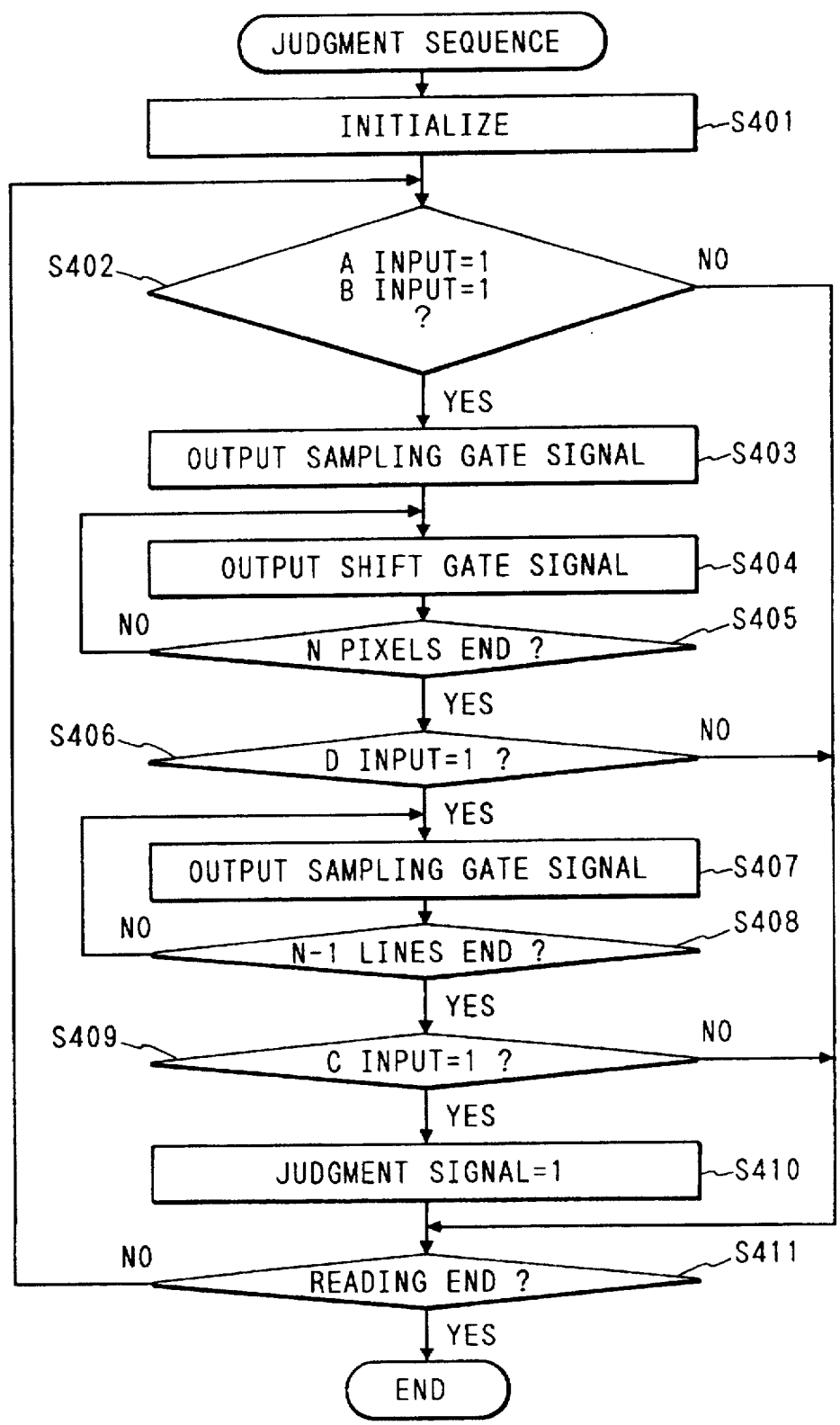
FIG. 80 is a flow chart showing a judgment algorithm carried out by the judgment control unit.

The algorithm carried out by the judgment unit 2921 used in this embodiment is described with reference to FIG. 80.

When an operator begins the copying operation, the judgment control unit 2921 initializes the internal flip-flops or the counters at step S401. Subsequently, the judgment control unit 2921 monitors the states of an A input terminal and a B input terminal at step S402. When either one of the A and B input terminal is not "1", the judgment control unit 2906 proceeds to step S411. On the other hand, if both the A and B input terminals are "1" indicating that the central pixel judgment circuit 2903 and the first pattern judgment circuit 2904 detect the predetermined pattern, a sampling gate signal is supplied at step S403 to the second pattern judgment circuit 2905, thereby taking the data at the position of the remark pixels. In addition, at step S404, the judgment control unit 2921 takes the data at the remark pixel position by means of supplying the shift gate signal to the remark image pixel. In this event, the judgment control unit 2921 carries out repeatedly the same operation of the step S404 until the sampling line numbers are counted and the data for N lines are stored in the shift data 1202 at step S405. When the data for the N pixels are stored in the shift register, the judgment control unit 2921 monitors at step S406 a state of the D input terminal. If the input indicates "0", the judgment control unit 2921 carries out the step S411. On the other hand, if the input indicates "1" due to the detection of the predetermined pattern, the judgment control unit 2921 carries out step S407. Then the judgment control unit 2921 counts the number of sampling lines. This step is repeatedly carried out until the data for (N−1) lines are stored. When the data for (N−1) lines are obtained, the judgment control unit 2921 monitors at step S409 a state of the C input terminal. If the input indicates "0", the judgment control unit 2921 carries out the step S411. On the other hand, if the input indicates "1" due to the detection of the predetermined pattern, the judgment control unit 2921 produces the judgment signal of "1" at step S410 to set the flip-flop 3022. The operations of steps S402 through S410 are repeated at the step S411 until the reading operation is completed.

According to the present invention, the pattern (a) is detected in three direction orthogonal to each other from the detection position of the pattern (b) shown in FIG. 67 as the origin. As a result, the accuracy of discrimination of the specific original from the others can be improved further.

<Modification>

In the above mentioned three embodiments, the comparator is used in each pattern detection circuit to compare the input data with the predetermined pattern. However, the input data in one direction from the remark pixel as the origin may be stored and used as a reference pattern for comparing the same with the input data in the different direction(s). This also allows the equivalent effects to those obtained in the above embodiments.

While the aforementioned embodiments have thus been described in conjunction with the concentric circle patterns formed with the infrared absorbing ink, a pattern of which color tint differs from that of the original may be used.

Further, the present invention is not limited to the above mentioned embodiments. Instead, it can be equally achieved by using other circuit components expected to be exhibit similar functions and effects.

As mentioned above, according to the aforementioned image processing apparatus, it is possible to discriminate the specific original from others by using a simple structure with a high accuracy. This technique can be applied to, for example, counter-measure effectively against the abused attempts to counterfeit the banknotes, valuable securities and so on.

<Eighteenth Embodiment>

Figure 83B:
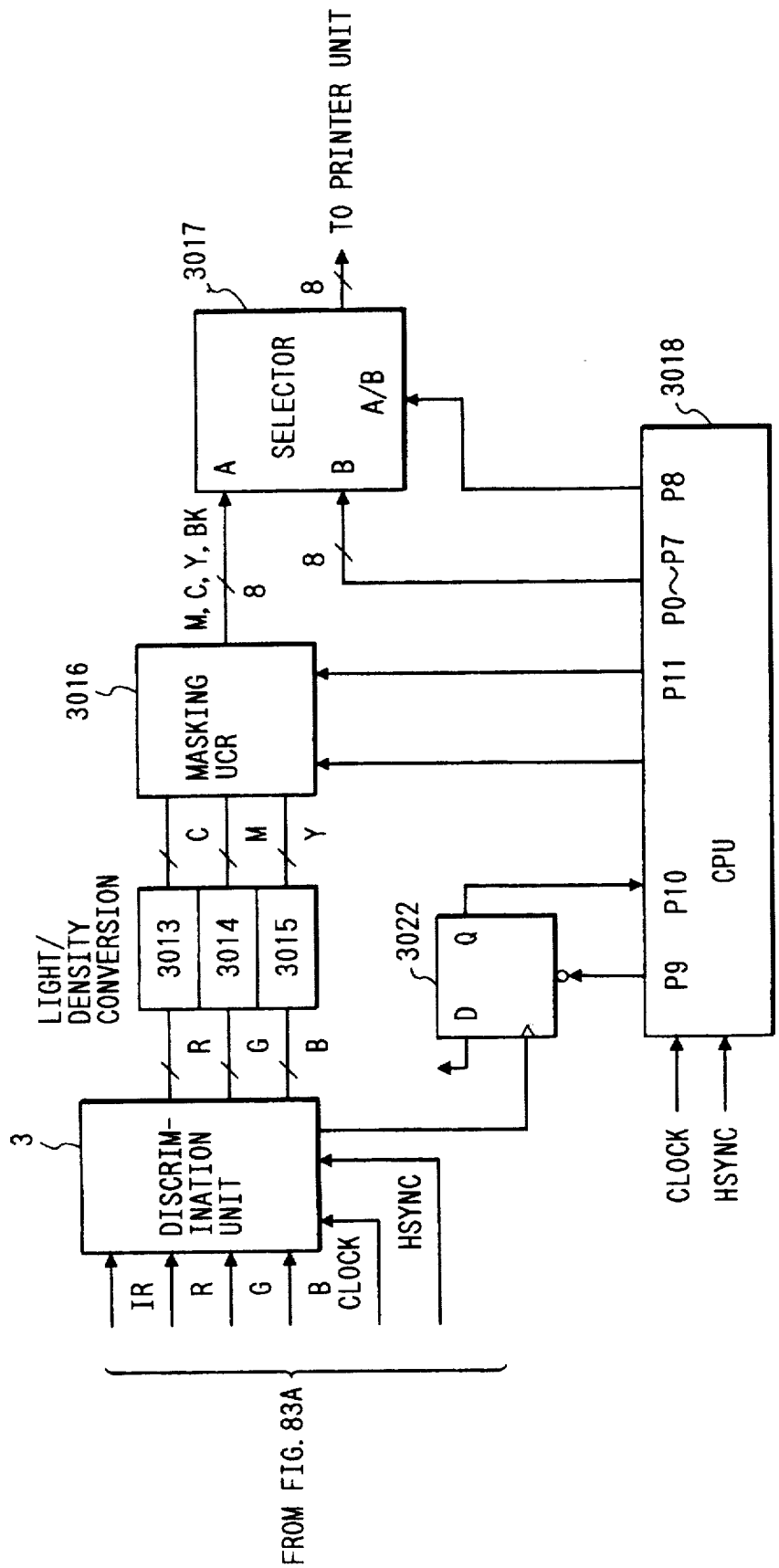
FIG. 83 is comprised of FIGS. 83A and 83B showing block diagrams of an image signal control unit according to an eighteenth embodiment of the present invention.

FIGS. 83A and 83B are block diagrams for use in describing flow of the image signals in the image scanner unit 201. Each of the image signals is supplied from the CCD 210 to an analog signal processing unit 3001. The analog signal processing unit 3001 changes the magnitude of the image signal with a gain constant. The offset is also adjusted in the analog signal processing unit 3001. The image signals for the respective colors (including IR) are then supplied from the analog signal processing unit 3001 to respective A/D converters 3002 through 3005. Each of the A/D converters 3002 through 3005 converts the analog image signal into a digital image signal of 8 bits. The digital image signal is supplied to corresponding one of shading correction units 3006 through 3009 where it is subjected to known shading correction using a reading signal obtained for the standard white plate 211.

A clock generator 3019 generates a clock signal at a speed corresponding to data of one pixel carried by the digital image signal. The clock signal is supplied to a line counter (a main scan address counter) 3020 that counts the number of clock signals to produce a pixel address output for one line. A decoder 3021 decodes a main scan address supplied from the main scan address counter 3020 to generate a CCD driving signal, a VE signal and a line synchronization signal HSYNC. The CCD driving signal may be shift pulses or reset pulses for every one line while the VE signal indicates a valid section in a one line reading signal supplied from the CCD.

As shown in FIGS. 19A and 19B, the line sensors 210-1, 210-2, 210-3 and 210-4 in the CCD 210 are spaced from each other at a predetermined distance. Accordingly, line delay elements 3010, 3011 and 3012 are provided for correcting the spatial displacement. More specifically, the image signals obtained from the IR, R and G sensors 210-1, 210-2 and 210-3 proceed the image signal out of the B sensor 210-4 in the sub scan direction. With this respect, the line delay elements 3010, 3011 and 3012 line-delay the IR, R and G signal in the sub scan direction relative to the B signal.

Light-to-density conversion units 3013, 3014, 3015 are composed of look-up table ROMs and convert luminance signals of R, G and B into density signals of C, M and Y. A masking and undercolor removal (UCR) circuit 3016 generates, from input signals Y, M and C representing three primary colors, output signals of Y, M, C, and BK with a predetermined number of bits (for example, 8 bits), at each scanning operation carried out by the image scanner unit 201. Since the masking and UCR circuit 3016 used is the one well known in the art, a detailed description thereof is omitted.

A discrimination unit 3 detects a specific pattern on the original, which is a feature of the present invention.

A CPU 3018 carries out sequence control involving, for example, control to the original reading optical systems and ON/OFF control of the original illumination lamp 205. The CPU 3018 produces a pixel section signal VSYNC in the sub scan direction. The CPU 3018 also serves to control a selector 3017 in response to a result of judgment supplied from the discrimination unit 3 such that a port output rather than the reading signal is supplied to the printer. In this way, the specific pattern formed of invisible portion of the specific original is converted into the visible information for the purpose of reproduction.

An image pattern (discrimination mark) to be detected by the apparatus according to the present invention is described with reference to FIG. 82.

Figure 82:
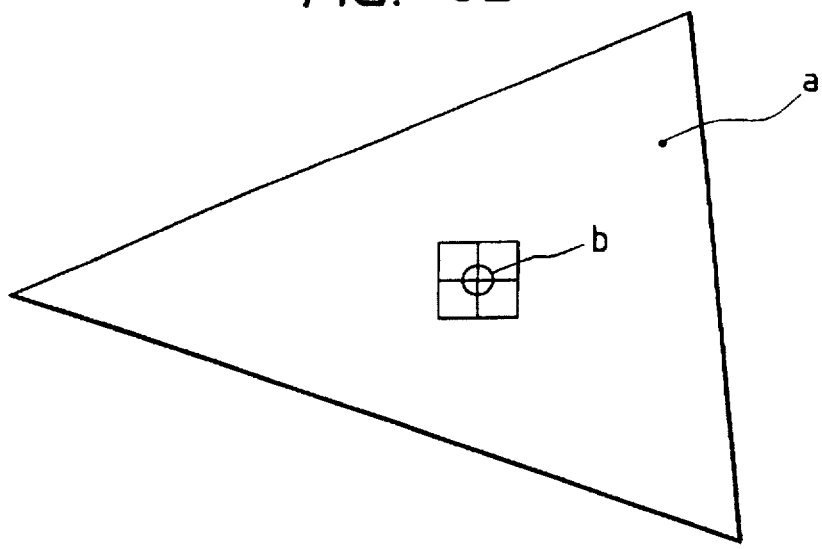
FIG. 82 is a view showing a specific original discrimination pattern.

FIG. 82 shows an example of a pattern formed by using a transparent ink loading infrared absorbing pigments having the characteristic shown in FIG. 21. More particularly, a small square pattern b having the sides of approximately 120 μm in each is printed with the transparent ink on a triangular pattern printed with the ink that has no infrared absorbing characteristic.

The small square pattern is almost invisible in the visible region as apparent from the FIG. 21. However, the apparatus can readily discriminate these patterns from the background in the infrared region. The pattern b exemplified here is formed as a square having sides of approximately 120 μm in each. This square corresponds to four pixels when being scanned with the resolution of 400 dpi.

The pattern is not limited to this illustrative embodiment.

Details of the discrimination unit 3 according to this embodiment are similar to those described with reference to FIG. 5.

The judgment result thereof is supplied to a latch circuit 3022 (FIGS. 83A and 83B). An output of the latch circuit 3022 is supplied to an input port P10 of the CPU 3018. In response to this, the CPU 3018 recognizes detection of the specific original discrimination pattern. The CPU 3018 clears the latch 3022 for the subsequent pattern by means of a signal supplied from a port P9 thereof before starting a copy sequence.

Figure 81:
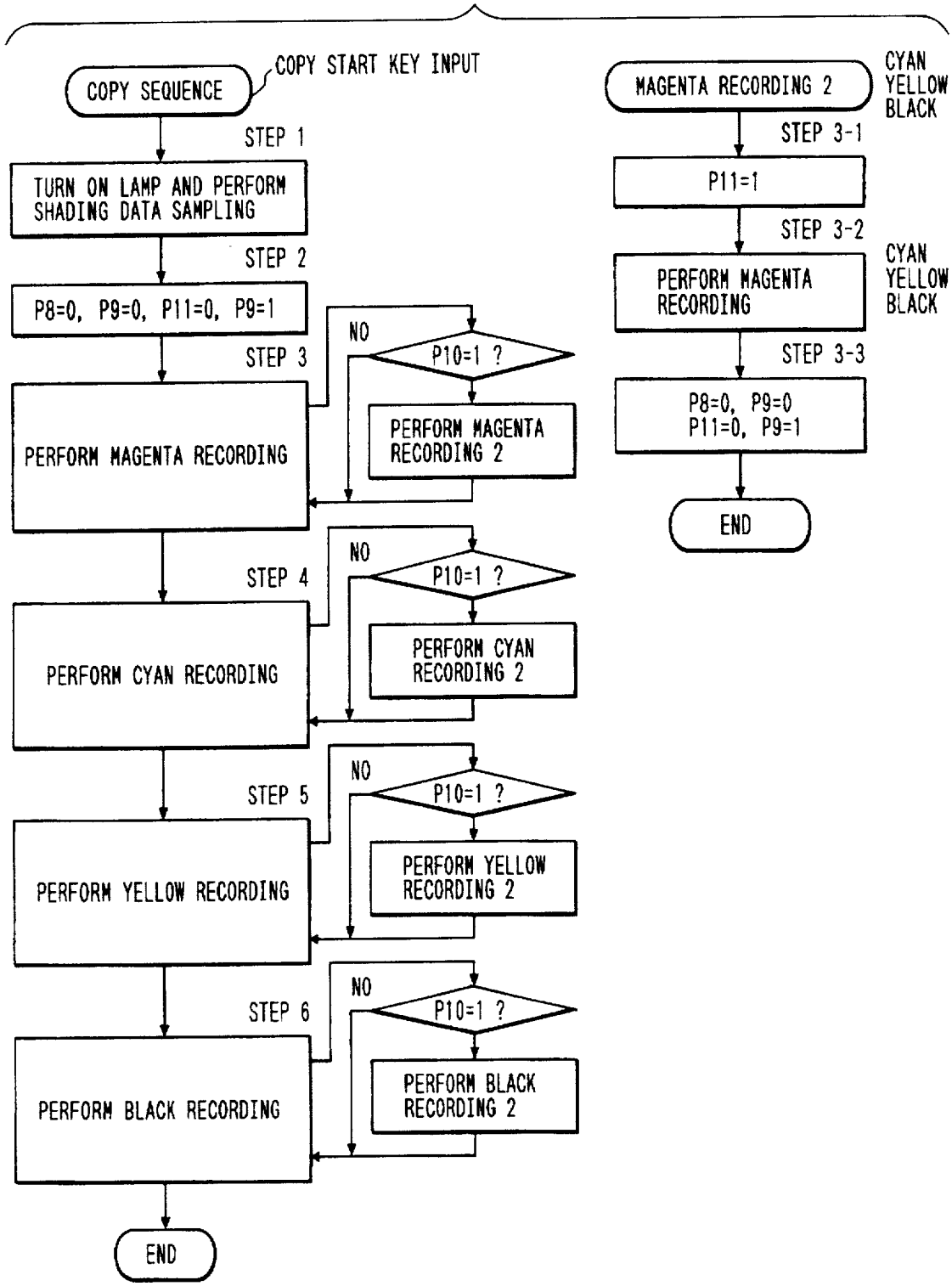
FIG. 81 is a flow chart showing a control flow carried out by the CPU according to the eighteenth embodiment.

FIG. 81 is a control flow carried out by the CPU 3018 for a normal copying operation and a specific original discrimination pattern judging operation associated therewith.

When an operator put the original 204 on the platen 203 and initiates the copying operation through an operation unit (not shown), the CPU 3018 controls a motor (not shown) to move the reflection mirror 206 beneath the standard white plate 211.

The halogen lamp 205 is then turned on to illuminate the standard white plate 211. The shading correction units 3006 through 3009 sample the shading data for the IR, R, G and B signals (step 1).

Subsequently, the port output P is set into "0" to clear the output of the latch 3022 into "0" and, in turn, clear the P8 output into "0". An input A of the selector 3017 is selected such that the image signals masked and subjected to the undercolor removal (UCR) are supplied to the printer. The output P9 is set to "1" to stop the clear operation of the latch 3022 (step 2).

Next, the scanning operation is repeated four times as the printer unit 200 records four colors of M, C, Y and BK to complete one copy of the original. At the same time, presence of the identification mark is detected and the recording operation is controlled in accordance with the detection result.

The CPU 3018 sets, for recording magenta, processing conditions for magenta into the masking UCR processing unit 3016. Subsequently, the CPU operates the optical system to supply a signal indicating magenta to the printer 200. After completion of the scanning operation, the optical system is turned back to an initial position of scanning (step 3).

During reading the original, the CPU 3018 determines that the specific original is to be copied according to the interruption due to the input "1" of the port 10. Accordingly, the CPU 3018 sets a port 11 into "1" (step 3-1). Then, the CPU 3018 sets the P9 output from "1" to "0". The masking UCR processing unit 3016 modifies the setting of the processing conditions for magenta and supplies to the printer unit an FF signal of magenta for 5 clocks (step 3-2).

Next, "0" is supplied to P8 and P11 to be ready for the subsequent pattern detection and sets to a normal UCR processing.

Likewise, the recording control is also made for cyan, yellow and black through steps 4 to 6, during which the CPU periodically checks the P10. If the P10 is "1" the CPU 3018 determines that the specific original is to be copied. Thus, the CPU 3018 carries out processing of cyan recording 2, yellow recording 2 and black recording 2. As a result, the data where the masking UCR processing is modified is supplied to the printer.

Figure 85B:
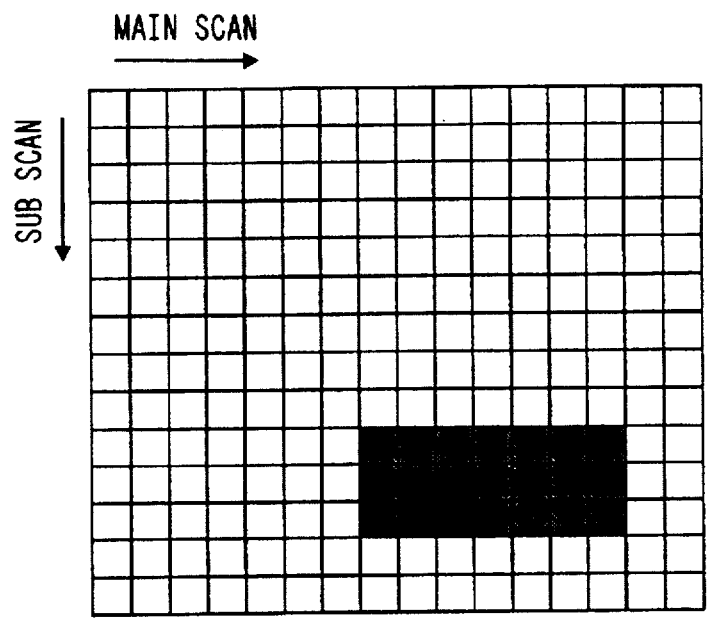
FIGS. 85A and 85B are views showing specific pattern and exemplified output thereof.
Figure 85A:
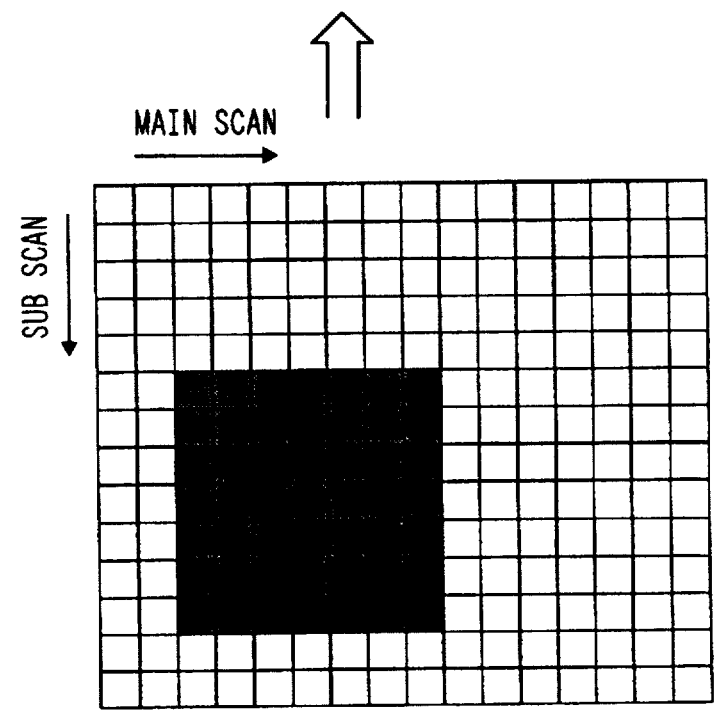

FIGS. 85A and 85B illustrates a specific pattern and exemplified output thereof, respectively.

<Nineteenth Embodiment>

Referring to FIGS. 81 to 83B, described is a control flow carried out by the CPU 3018 for a normal copying operation and a specific original discrimination pattern judging operation associated therewith.

When an operator put the original 204 on the platen 203 and initiates the copying operation through an operation unit (not shown), the CPU 3018 carries out the operation similar to those described in the eighteenth embodiment. During copying operation, the CPU 3018 determines the presence of the specific mark. Subsequently, the CPU 3018 sets the P11 output to the masking UCR unit 3016 into "1" and thus the masking UCR unit 3016 supplies to the selector 3017 a reversed output of the data (image data) set in each printing operation of M, C, Y and BK. Then, the P9 output is set from "1" to "0". The CPU 3018 counts 5 clocks and makes the outputs of the P8 and P11 be "0", whereby a normal UCR processed output is supplied to the printer. Likewise, the recording control is also made for cyan, yellow and black, during which the CPU periodically checks the P10. If the P10 is "1" the CPU 3018 determines that the specific original is to be copied. Thus, the CPU 3018 carries out processing of cyan recording 2, yellow recording 2 and black recording 2. As a result, the data where the C, Y and BK are reversed is supplied to the printer.

<Twentieth Embodiment>

Figure 84:
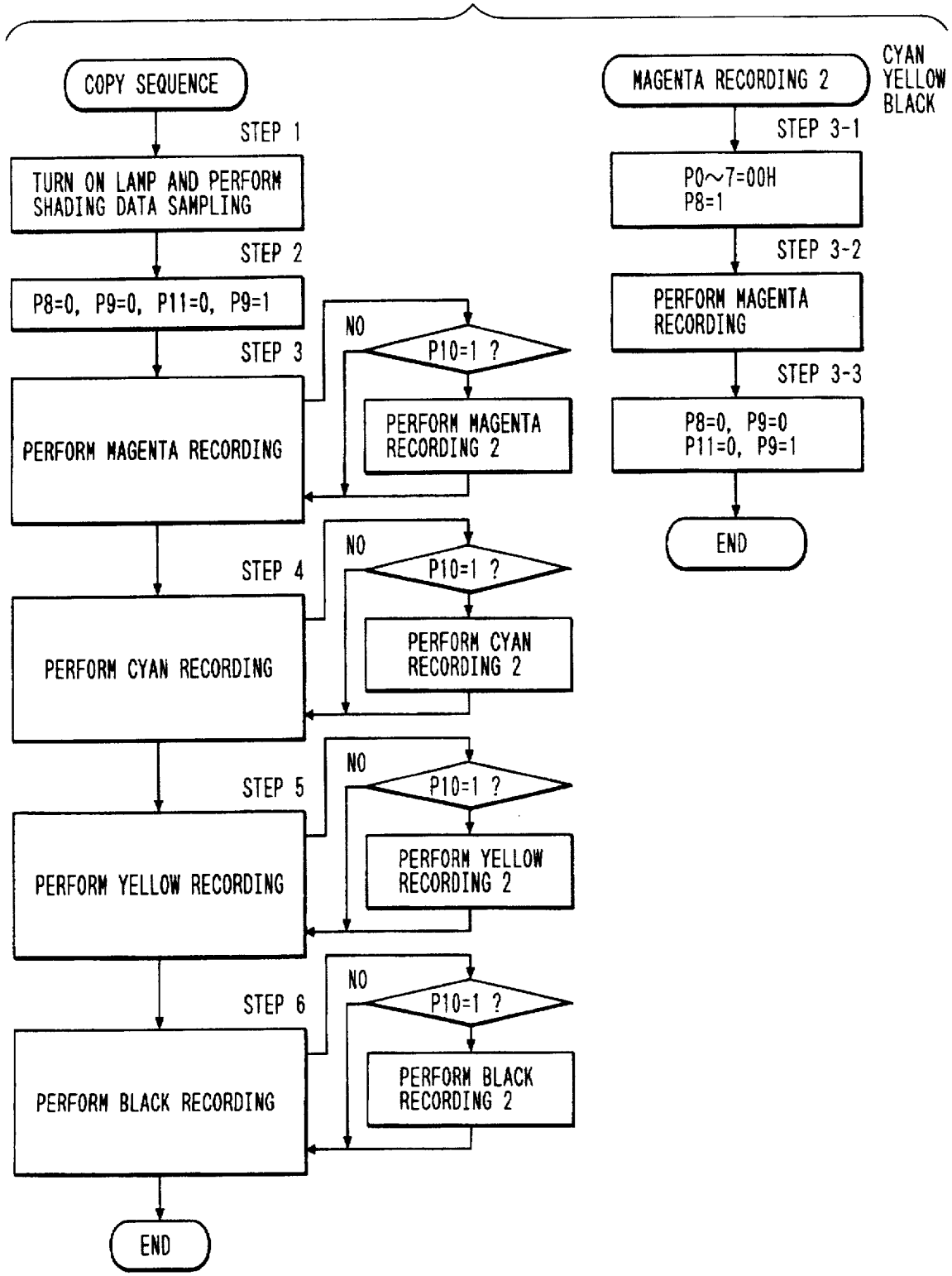
FIG. 84 is a flow chart showing a control flow carried out by the CPU according to a twelfth embodiment of the present invention.

Referring to FIG. 84, described is a control flow carried out by the CPU 3018 for a normal copying operation and a specific original discrimination pattern judging operation associated therewith. When an operator put the original 204 on the platen 203 and initiates the copying operation through an operation unit (not shown), the CPU 3018 carries out the operation similar to those described in the eighteenth embodiment. During copying operation, the CPU 3018 sets, at step S3-1, the outputs of P0 through P7 into 00H. In addition, the CPU 3018 sets the P8 output into "1", to produce an absence signal of 00H to the printer. Then, the P9 output is set from "1" to "0". The CPU 3018 counts 5 clocks and makes the outputs of the P8 and P11 be "0", whereby a normal UCR processed output is supplied to the printer. Likewise, the recording control is also made for cyan, yellow and black, during which the CPU periodically checks the P10. If the P10 is "1" the CPU 3018 determines that the specific original is to be copied. Thus, the CPU 3018 carries out processing of cyan recording 2, yellow recording 2 and black recording 2. As a result, the data of no recording is supplied to the printer.

<Twenty-first Embodiment>

Referring to FIG. 81, described is a control flow carried out by the CPU 3018 for a normal copying operation and a specific original discrimination pattern judging operation associated therewith. When an operator put the original 204 on the platen 203 and initiates the copying operation through an operation unit (not shown), the CPU 3018 carries out the operation similar to those described in the eighteenth embodiment. During copying operation, the CPU 3018 determines the presence of the specific mark. Subsequently, the CPU 3018 sets the P11 output to the masking UCR unit 3016 into "1" and thus the masking UCR unit 3016 supplies to the selector 3017 color information for discrimination mark according to the input color information in each printing operation of M, C, Y and BK. Then, the P9 output is set into "1", and further set from "1" to "0" The CPU 3018 counts 5 clocks and makes the outputs of the P8 and P11 be "0", whereby a normal UCR processed output is supplied to the printer.

Likewise, the recording control is also made for cyan, yellow and black, during which the CPU periodically checks the P10. If the P10 is "1" the CPU 3018 determines that the specific original is to be copied. Thus, the CPU 3018 carries out processing of cyan recording 2, yellow recording 2 and black recording 2. As a result, the data where the color tone of C, Y and BK are modulated is supplied to the printer.

<Modification>

In the above mentioned eighteenth through twenty-first embodiments, the discrimination unit 3 for reading the discrimination mark has so structured that the pixels for five lines are stored in the memory and produced after being delayed by 5 clocks. However, a discrimination mark generating point may be provided in the discrimination unit or in other component to arrange the same at the same image forming position as the discrimination mark reading unit, thereby the data are produced according to the data of the discrimination mark generating point.

As mentioned above, according to the present invention, it is possible to discriminate the specific mark visually rather than using a specific light source by means of converting the invisible information into the visible information upon detection of presence of the banknotes, revenue stamp and valuable securities on which the invisible specific mark is printed.

The idea provided in the above mentioned embodiments can be combined arbitrary.

It should be understood that the present invention is not limited to the particular illustrative embodiment shown and described above, and various changes and modifications may be made without departing from the spirit and scope of the appended claims.

What is claimed is:

1. An image processing apparatus comprising:

input means for inputting visible information and invisible information, in accordance with an image;

detecting means for detecting whether or not there is a line image whose color is visually unremarkable on said image, on the basis of the visible information; and discriminating means for discriminating the image having a predetermined pattern in accordance with the detection by said detecting means and the invisible information.

2. An apparatus according to claim 1, wherein the invisible information is infrared information.

3. An apparatus according to claim 1, wherein the visible information is a plurality of color component data.

4. An apparatus according to claim 1, wherein said input means comprises a plurality of linear sensors and each respective linear sensor inputs one of visible information and invisible information.

5. An apparatus according to claim 1, wherein said discriminating means comprises a plurality of memory means.

6. An image processing apparatus comprising:

input means for inputting visible information and invisible information, in accordance with an image;

deciding means for deciding an area rate of specific invisible information included in a predetermined unit area on said image and for generating a decision result; and discriminating means for discriminating said image having a predetermined pattern in accordance with the decision result generated by said deciding means.

7. An apparatus according to claim 6, wherein the invisible information is infrared information.

8. An apparatus according to claim 6, wherein the visible information is a plurality of color component data.

9. An apparatus according to claim 6, wherein said input means comprises a plurality of linear sensors and each respective linear sensor inputs one of visible information and invisible information.

10. An apparatus according to claim 6, wherein said discriminating means comprises a plurality of memory means.

11. An image processing apparatus comprising:

input means for inputting visible information and invisible information, in accordance with an image;

detecting means for detecting a predetermined periodic pattern based on the invisible information; and discriminating means for discriminating whether or not the image is a specific image, in accordance with the detection by said detecting means.

12. An apparatus according to claim 11, wherein the invisible information is infrared information.

13. An apparatus according to claim 11, wherein the visible information is a plurality of color component data.

14. An apparatus according to claim 11, wherein said input means comprising a plurality of linear sensors and each respective linear sensor inputs one of visible information and invisible information.

15. An apparatus according to claim 11, wherein said discriminating means comprises a plurality of memory means.

16. An image processing apparatus comprising:

input means for inputting a visible information signal and an invisible information signal, in accordance with an image;

first detecting means for detecting a presence of change of the visible information signal and an absence of change of the invisible information signal in a predetermined region;

second detecting means for detecting an absence of change of the visible information signal and an absence of change of the invisible information signal in the predetermined region; and discriminating means for discriminating the image having a predetermined pattern in accordance with the detection by said first and second detecting means.

17. An apparatus according to claim 16, wherein the invisible information is infrared information.

18. An apparatus according to claim 16, wherein the visible information is a plurality of color component data.

19. An apparatus according to claim 16, wherein said input means comprises a plurality of linear sensors and each respective linear sensor inputs one of visible information and invisible information.

20. An apparatus according to claim 16, wherein said discriminating means comprises a plurality of memory means.

* * * * *

UNITED STATES PATENT AND TRADEMARK OFFICE
CERTIFICATE OF CORRECTION

PATENT NO. : 5,731,880                    Page 1 of 6
DATED : March 24, 1998
INVENTOR(S) : YOICHI TAKARAGI, ET AL.

It is certified that error appears in the above-indentified patent and that said Letters Patent is hereby corrected as shown below:

Column 1

Line 48, "by" should be deleted.
　　Line 53, "of" should read --of a--.
　　Line 54, "of" (first occurrence) should be deleted.

Column 2

Line 16, "appeared" should read --appearing--.
　　Line 25, "reached" should read --reaching--.

Column 4

Line 58, "Further" should read --A further--.
　　Line 59, "visualize" should read --visualizing--.

Column 5

Line 25, "entire" should read --an entire--.

Column 7

Line 39, "area" should read --the area--.
　　Line 60, "ofthe" should read --of the--.

Column 8

Line 30, "digitzes" should read --digitizing--.

UNITED STATES PATENT AND TRADEMARK OFFICE
CERTIFICATE OF CORRECTION

PATENT NO. : 5,731,880

DATED : March 24, 1998

INVENTOR(S) : YOICHI TAKARAGI, ET AL.

It is certified that error appears in the above-indentified patent and that said Letters Patent is hereby corrected as shown below:

Column 9

Line 51, "optical" should read -- an optical--.
    Line 56, "in" should be deleted.

Column 10

Line 7, "(line" should read --(lines--.
    Line 35, "with" should read --with an--.
    Line 61, "are" should read --is--.

Column 11

Line 6, "less affects" should read --has less affect--.
    Line 24, "by" should read --by the--.

Column 13

Line 8, "should" should read --should be--
    Line 31, "entire" should read --the entire--.
    Line 47, "to" should read --the--.

Column 14

Line 51, "noises" should read --noise--.
    Line 61, "line" should read --a line--.

UNITED STATES PATENT AND TRADEMARK OFFICE
CERTIFICATE OF CORRECTION

PATENT NO. : 5,731,880

DATED : March 24, 1998

INVENTOR(S) : YOICHI TAKARAGI, ET AL.

It is certified that error appears in the above-indentified patent and that said Letters Patent is hereby corrected as shown below:

Column 15

Line 21, "put" should read --puts--.

Column 16

Line 22, "much" should read --a lot--.
    Line 24, "material" should read --material, it--.

Column 17

Line 14, "circle" should read --a circle--.

Column 19

Line 28, "flip flops" should read --flipflops--.
    Line 35, "is" should read --it is--.
    Line 44, "to eight" should read --the eight--.
    Line 63, "put" should read --puts--.

Column 21

Line 10, "an" should read --a--.
    Line 27, "twenty four" should read --twenty-four--.

Column 22

Line 18, "that" should read --for--.
    Line 39, "have" should read --have been--.
    Line 41, "feature" should read --features--.
    Line 64, "less affects" should read --has less affect--.

UNITED STATES PATENT AND TRADEMARK OFFICE
CERTIFICATE OF CORRECTION

PATENT NO. : 5,731,880

DATED : March 24, 1998

INVENTOR(S) : YOICHI TAKARAGI, ET AL.

It is certified that error appears in the above-indentified patent and that said Letters Patent is hereby corrected as shown below:

Column 23

Line 27, "sand" should read --and--.
    Line 31, "describe" should read --described--.
    Line 48, "$C_R$" should read --$C_G$--;
    Line 50, "$C_R$" should read --$C_B$--.

Column 24

Line 36, "and" should read --and the--.
    Line 55, "during" should read --during a time when--.

Column 25

Line 2, "during" should read --during a time when--.
    Line 64, "an" should be deleted.

Column 27

Line 5, "printed is" should read --printed are--.
    Line 11, "width" should read --widths--.

Column 28

Line 5, "passing" should read --passes--.

UNITED STATES PATENT AND TRADEMARK OFFICE
CERTIFICATE OF CORRECTION

PATENT NO. : 5,731,880   Page 5 of 6
DATED : March 24, 1998
INVENTOR(S) : YOICHI TAKARAGI, ET AL.

It is certified that error appears in the above-indentified patent and that said Letters Patent is hereby corrected as shown below:

Column 30

Line 40, "showing" should read --shows--.
    Line 41, "a" should be deleted; "ink loading" should read --ink-loading--; and "infrared" should read --infrared- --.
    Line 52, "to" (2nd occurrences) should read -- of --.

Column 31

Line 4, "To" should read --The--.
    Line 14, "produces" should read --produced--.

Column 32

Line 34, " terminal" should read --terminals--.
    Line 60, "put" should read --puts--.

Column 33

Line 31, "structures" should read --structure--.

Column 34

Line 9, "compares" should read --comparing--.
    Line 31, "terminal" should read --terminals--.

UNITED STATES PATENT AND TRADEMARK OFFICE
CERTIFICATE OF CORRECTION

PATENT NO. : 5,731,880

DATED : March 24, 1998

INVENTOR(S) : YOICHI TAKARAGI, ET AL.

It is certified that error appears in the above-indentified patent and that said Letters Patent is hereby corrected as shown below:

<u>Column 35</u>

Line 16, "be" should be deleted.

<u>Column 36</u>

Line 25, "a transparent ink loading infrared absorbing" should read --transparent ink-loading infrared-absorbing--.

Line 52, "put" should read --puts--.

Signed and Sealed this

Fourteenth Day of March, 2000

Attest:

Q. TODD DICKINSON

Attesting Officer

Commissioner of Patents and Trademarks